US008195188B2

(12) United States Patent
Fomukong et al.

(10) Patent No.: US 8,195,188 B2
(45) Date of Patent: *Jun. 5, 2012

(54) LOCATION REPORTING SATELLITE PAGING SYSTEM WITH OPTIONAL BLOCKING OF LOCATION REPORTING

(75) Inventors: Mundi Fomukong, Los Angeles, CA (US); Denzil Willoughby Chesney, Los Angeles, CA (US)

(73) Assignee: Enovsys LLC, Beverly Hills, CA (US)

( * ) Notice: Subject to any disclaimer, the term of this patent is extended or adjusted under 35 U.S.C. 154(b) by 270 days.

This patent is subject to a terminal disclaimer.

(21) Appl. No.: 10/414,348

(22) Filed: Apr. 15, 2003

(65) Prior Publication Data
US 2003/0194993 A1 Oct. 16, 2003

Related U.S. Application Data

(63) Continuation of application No. 09/265,236, filed on Mar. 8, 1999, now Pat. No. 6,560,461, which is a continuation-in-part of application No. 08/905,674, filed on Aug. 4, 1997, now Pat. No. 5,918,159.

(51) Int. Cl.
*H04W 24/00* (2009.01)
(52) U.S. Cl. ............... 455/456.1; 455/404.1; 455/404.2; 455/411; 455/456.2; 455/457
(58) Field of Classification Search ........... 455/414.1, 455/414.2, 412.3, 414.3
See application file for complete search history.

(56) References Cited

U.S. PATENT DOCUMENTS

| 3,947,807 A | 3/1976 | Tyler |
| 3,979,731 A | 9/1976 | Naplatanov |
| 3,984,807 A | 10/1976 | Haemmig |
| 4,109,247 A | 8/1978 | Kaplan |
| 4,112,421 A | 9/1978 | Freeny, Jr. |
| 4,177,466 A | 12/1979 | Reagan |
| 4,188,618 A | 2/1980 | Weisbart |
| 4,209,787 A | 6/1980 | Freeny, Jr. |
| 4,217,588 A | 8/1980 | Freeny, Jr. |
| 4,220,946 A | 9/1980 | Henriot |

(Continued)

FOREIGN PATENT DOCUMENTS
AU 525251 10/1982
(Continued)

OTHER PUBLICATIONS

M. Spreitzer et al; "Architectural Considerations for Scalable, Secure, Mobile Computing with Location Information.", Distributed Computing Systems, 1994, Proceedings of the 14th International Conference in Pozman, Poland, Jun. 21-24, 1994, Los Alamitos, CA USA, IEEE Comput Society (Jun. 21, 1994 .(see sections 4.2,4.3,4.4.2).

(Continued)

Primary Examiner — Dai A Phuong

(57) ABSTRACT

A location reporting paging communication system comprising space satellites, ground stations and a remote receiving unit adapted to resolve a global position from signals transmitted from a communication transmitter. The subscriber in possession of the remote receiving unit updates the paging network with global positioning information. A caller paging a subscriber in possession of the remote receiving unit may request the global location of the remote receiving unit. The paging network could divulge or block such information from a caller depending on the requirements of the subscriber.

29 Claims, 4 Drawing Sheets

U.S. PATENT DOCUMENTS

| | | |
|---|---|---|
| 4,229,737 A | 10/1980 | Heldwein |
| 4,232,266 A | 11/1980 | Acampora |
| 4,259,741 A | 3/1981 | Kawai |
| 4,285,064 A | 8/1981 | Hodge |
| 4,297,672 A | 10/1981 | Fruchey et al. |
| 4,303,904 A | 12/1981 | Chasek |
| 4,313,035 A | 1/1982 | Jordan |
| 4,315,262 A | 2/1982 | Acampora |
| 4,319,352 A | 3/1982 | Gupta |
| 4,338,587 A | 7/1982 | Chiappetti |
| 4,347,501 A | 8/1982 | Akerberg |
| 4,350,969 A | 9/1982 | Greer |
| 4,356,484 A | 10/1982 | Eckhardt |
| 4,359,733 A | 11/1982 | O'Neill |
| 4,381,509 A | 4/1983 | Rotman |
| 4,393,493 A | 7/1983 | Edwards |
| 4,398,192 A | 8/1983 | Moore |
| 4,399,330 A | 8/1983 | Kuenzel |
| 4,423,416 A | 12/1983 | Bailey |
| 4,424,514 A | 1/1984 | Fennell |
| 4,425,639 A | 1/1984 | Acampora |
| 4,427,980 A | 1/1984 | Fennell |
| 4,431,991 A | 2/1984 | Bailey |
| 4,435,711 A | 3/1984 | Ho |
| 4,491,947 A | 1/1985 | Frank |
| 4,507,662 A | 3/1985 | Rothenberg |
| 4,510,595 A | 4/1985 | Glance |
| 4,512,033 A | 4/1985 | Schrock |
| 4,517,561 A | 5/1985 | Burke |
| 4,518,961 A | 5/1985 | Davis |
| 4,531,129 A | 7/1985 | Bonebright |
| 4,577,060 A | 3/1986 | Webb |
| 4,577,316 A | 3/1986 | Schiff |
| 4,581,736 A | 4/1986 | Dobyns |
| 4,601,011 A | 7/1986 | Grynberg |
| 4,626,858 A | 12/1986 | Copeland |
| 4,628,506 A | 12/1986 | Sperlich |
| 4,642,425 A | 2/1987 | Guinn, Jr. |
| 4,644,351 A | 2/1987 | Zabarsky |
| 4,648,123 A | 3/1987 | Schrock |
| 4,651,156 A | 3/1987 | Martinez |
| 4,652,884 A | 3/1987 | Starker |
| 4,654,860 A | 3/1987 | Ouimet |
| 4,661,972 A | 4/1987 | Kai |
| 4,667,202 A | 5/1987 | Kammerlander |
| 4,672,655 A | 6/1987 | Koch |
| 4,672,656 A | 6/1987 | Pfeiffer |
| 4,677,653 A | 6/1987 | Weiner |
| 4,680,785 A | 7/1987 | Akiyama |
| 4,684,949 A | 8/1987 | Kalafus |
| 4,689,625 A | 8/1987 | Barmat |
| 4,691,341 A | 9/1987 | Knoble |
| 4,691,882 A | 9/1987 | Young |
| 4,697,187 A | 9/1987 | Ohno |
| 4,697,281 A | 9/1987 | O'Sullivan |
| 4,700,374 A | 10/1987 | Bini |
| 4,701,760 A | 10/1987 | Raoux |
| 4,706,239 A | 11/1987 | Ito |
| 4,713,661 A | 12/1987 | Boone |
| 4,723,264 A | 2/1988 | Sasuta |
| 4,730,305 A | 3/1988 | Acampora |
| 4,742,514 A | 5/1988 | Goode |
| 4,744,083 A | 5/1988 | O'Neill |
| 4,748,622 A | 5/1988 | Muratani |
| 4,752,967 A | 6/1988 | Bustamante |
| 4,754,450 A | 6/1988 | Lynk, Jr. |
| 4,757,267 A | 7/1988 | Riskin |
| 4,763,129 A | 8/1988 | Perrotta |
| 4,774,705 A | 9/1988 | Eaves, Jr. |
| 4,776,035 A | 10/1988 | Duggan |
| 4,791,572 A | 12/1988 | Green, III |
| 4,797,948 A | 1/1989 | Milliorn |
| 4,804,937 A | 2/1989 | Barbiaux |
| 4,809,006 A | 2/1989 | Dar |
| H610 H | 3/1989 | Focarile |
| 4,812,852 A | 3/1989 | Bent |
| 4,818,998 A | 4/1989 | Apsell |
| 4,819,227 A | 4/1989 | Rosen |
| 4,823,341 A | 4/1989 | Rosen |
| 4,825,216 A | 4/1989 | DuFort |
| 4,827,268 A | 5/1989 | Rosen |
| 4,831,539 A | 5/1989 | Hagenbuch |
| 4,831,619 A | 5/1989 | Rosen |
| 4,833,701 A | 5/1989 | Comroe |
| 4,837,556 A | 6/1989 | Matsushita |
| 4,839,656 A | 6/1989 | O'Neill |
| 4,839,835 A | 6/1989 | Hagenbuch |
| 4,845,504 A | 7/1989 | Roberts |
| 4,845,648 A | 7/1989 | Hagenbuch |
| 4,853,688 A | 8/1989 | Andros |
| 4,857,915 A | 8/1989 | Andros |
| 4,864,306 A | 9/1989 | Wiita |
| 4,866,431 A | 9/1989 | Andros |
| 4,868,558 A | 9/1989 | Andros |
| 4,868,562 A | 9/1989 | Andros |
| 5,005,014 A | 4/1991 | Jasinski |
| 5,047,763 A | 9/1991 | Kuznicki |
| 5,109,544 A | 4/1992 | Mittel |
| 5,111,209 A | 5/1992 | Toriyama |
| 5,121,115 A | 6/1992 | Andros |
| 5,124,697 A | 6/1992 | Moore |
| 5,144,648 A | 9/1992 | Bhagat |
| 5,151,920 A | 9/1992 | Haagh |
| 5,151,921 A | 9/1992 | Hashimoto |
| 5,159,608 A | 10/1992 | Falconer |
| 5,160,935 A | 11/1992 | Inamiya |
| 5,185,762 A | 2/1993 | Schilling |
| 5,187,675 A | 2/1993 | Dent |
| 5,193,102 A | 3/1993 | Meidan |
| 5,202,829 A | 4/1993 | Geier |
| 5,204,874 A | 4/1993 | Falconer |
| 5,210,770 A | 5/1993 | Rice |
| 5,216,692 A | 6/1993 | Ling |
| 5,216,693 A | 6/1993 | Nakamura |
| 5,218,708 A | 6/1993 | Kanbayashi |
| 5,220,366 A | 6/1993 | King |
| 5,223,844 A | 6/1993 | Mansell |
| 5,224,120 A | 6/1993 | Schilling |
| 5,224,121 A | 6/1993 | Schorman |
| 5,224,122 A | 6/1993 | Bruckert |
| 5,228,054 A | 7/1993 | Rueth |
| 5,228,056 A | 7/1993 | Schilling |
| 5,231,646 A | 7/1993 | Heath |
| 5,235,615 A | 8/1993 | Omura |
| 5,237,586 A | 8/1993 | Bottomley |
| 5,239,669 A | 8/1993 | Mason |
| 5,241,563 A | 8/1993 | Paik |
| 5,247,702 A | 9/1993 | Su |
| 5,252,964 A | 10/1993 | Tan |
| 5,257,028 A | 10/1993 | Keydel |
| 5,257,397 A | 10/1993 | Barzegar |
| 5,258,995 A | 11/1993 | Su |
| 5,263,045 A | 11/1993 | Schilling |
| 5,268,930 A | 12/1993 | Sendyk |
| 5,268,933 A | 12/1993 | Averbuch |
| 5,276,704 A | 1/1994 | Dixon |
| 5,278,863 A | 1/1994 | Briskman |
| 5,280,472 A | 1/1994 | Gilhousen |
| 5,280,498 A | 1/1994 | Tymes |
| 5,282,222 A | 1/1994 | Fattouche |
| 5,285,469 A | 2/1994 | Vanderpool |
| 5,285,472 A | 2/1994 | Leonard |
| 5,285,496 A | 2/1994 | Frank |
| 5,291,516 A | 3/1994 | Dixon |
| 5,293,418 A | 3/1994 | Fukawa |
| 5,295,152 A | 3/1994 | Gudmundson |
| 5,295,153 A | 3/1994 | Gudmundson |
| 5,295,157 A | 3/1994 | Suzuki |
| 5,297,143 A | 3/1994 | Fridrich |
| 5,297,161 A | 3/1994 | Ling |
| 5,299,226 A | 3/1994 | Schilling |
| 5,303,286 A | 4/1994 | Wiedeman |
| 5,305,349 A | 4/1994 | Dent |
| 5,337,041 A | 8/1994 | Friedman |
| 5,349,632 A | 9/1994 | Nagashima |
| 5,388,147 A | 2/1995 | Grimes |
| 5,408,528 A | 4/1995 | Carlson |

| | | | | | | |
|---|---|---|---|---|---|---|
| 5,430,759 A | 7/1995 | Yokev | | 5,794,151 A | 8/1998 | McDonald |
| 5,444,671 A | 8/1995 | Tschannen | | 5,797,091 A | 8/1998 | Clise |
| 5,467,388 A * | 11/1995 | Redd et al. ............... 379/210.02 | | 5,797,134 A | 8/1998 | McMillan |
| 5,479,408 A | 12/1995 | Will | | 5,802,453 A | 9/1998 | Kuroki |
| 5,485,163 A | 1/1996 | Singer | | 5,802,468 A | 9/1998 | Gallant |
| 5,491,645 A | 2/1996 | Kennedy | | 5,805,055 A | 9/1998 | Colizza |
| 5,499,032 A | 3/1996 | Kelley | | 5,806,005 A | 9/1998 | Hull |
| 5,499,266 A | 3/1996 | Yokev | | 5,809,059 A | 9/1998 | Souissi |
| 5,511,233 A | 4/1996 | Otten | | 5,809,396 A | 9/1998 | Armbruster |
| 5,512,884 A | 4/1996 | Hesse | | 5,812,086 A | 9/1998 | Bertiger |
| 5,517,618 A | 5/1996 | Wada | | 5,815,800 A | 9/1998 | Su |
| 5,519,718 A | 5/1996 | Yokev | | RE35,916 E | 10/1998 | Dennison |
| 5,530,438 A | 6/1996 | Bickham | | 5,831,545 A | 11/1998 | Murray |
| 5,530,452 A | 6/1996 | Yokev | | 5,832,187 A | 11/1998 | Pedersen |
| 5,532,690 A | 7/1996 | Hertel | | 5,835,907 A | 11/1998 | Newman |
| 5,543,803 A | 8/1996 | Serfling | | 5,838,237 A | 11/1998 | Revell |
| 5,550,551 A | 8/1996 | Alesio | | 5,842,125 A | 11/1998 | Modzelesky |
| 5,550,743 A | 8/1996 | Kyrtsos | | 5,845,079 A | 12/1998 | Wada |
| 5,551,063 A | 8/1996 | Brandon | | 5,850,602 A | 12/1998 | Tisdale |
| 5,552,795 A | 9/1996 | Tayloe | | 5,859,576 A | 1/1999 | Winandy |
| 5,583,517 A | 12/1996 | Yokev | | 5,862,480 A | 1/1999 | Wild |
| 5,592,173 A | 1/1997 | Lau | | 5,862,501 A | 1/1999 | Talbot |
| 5,592,180 A | 1/1997 | Yokev | | 5,864,546 A | 1/1999 | Campanella |
| 5,594,425 A | 1/1997 | Ladner | | 5,864,764 A | 1/1999 | Thro |
| 5,596,330 A | 1/1997 | Yokev | | H1782 H | 2/1999 | Wicks |
| 5,603,079 A | 2/1997 | Olds | | 5,867,490 A | 2/1999 | Campanella |
| 5,606,307 A | 2/1997 | Kuan | | 5,870,390 A | 2/1999 | Campanella |
| 5,615,110 A | 3/1997 | Wong | | 5,870,426 A | 2/1999 | Yokev |
| 5,617,101 A | 4/1997 | Maine | | 5,875,182 A | 2/1999 | Hatzipapafotiou |
| 5,625,351 A | 4/1997 | Willard | | 5,883,580 A | 3/1999 | Briancon |
| 5,625,668 A | 4/1997 | Loomis | | 5,883,594 A | 3/1999 | Lau |
| 5,629,693 A | 5/1997 | Janky | | 5,884,172 A | 3/1999 | Sawyer |
| 5,629,855 A | 5/1997 | Kyrtsos | | 5,886,635 A | 3/1999 | Landa |
| 5,630,206 A | 5/1997 | Urban | | 5,889,473 A | 3/1999 | Wicks |
| 5,630,207 A | 5/1997 | Gitlin | | 5,889,492 A | 3/1999 | Kurby |
| 5,636,245 A | 6/1997 | Ernst | | 5,894,591 A | 4/1999 | Tamayo |
| 5,646,630 A | 7/1997 | Sheynblat | | 5,895,436 A | 4/1999 | Savoie |
| 5,646,632 A | 7/1997 | Khan | | 5,897,605 A | 4/1999 | Kohli |
| 5,650,770 A | 7/1997 | Schlager | | 5,898,680 A | 4/1999 | Johnstone |
| 5,654,717 A | 8/1997 | Nichols | | 5,901,171 A | 5/1999 | Kohli |
| 5,659,601 A | 8/1997 | Cheslog | | 5,903,618 A | 5/1999 | Miyake |
| 5,661,652 A | 8/1997 | Sprague | | 5,903,837 A | 5/1999 | Wiedeman |
| 5,666,107 A | 9/1997 | Lockhart | | 5,903,845 A | 5/1999 | Buhrmann |
| 5,666,661 A | 9/1997 | Grube | | 5,907,809 A | 5/1999 | Molnar |
| 5,669,061 A | 9/1997 | Schipper | | 5,913,170 A | 6/1999 | Wortham |
| 5,671,247 A | 9/1997 | Souissi | | 5,917,405 A | 6/1999 | Joao |
| 5,687,215 A | 11/1997 | Timm | | 5,918,159 A * | 6/1999 | Fomukong et al. .......... 340/7.21 |
| 5,689,245 A | 11/1997 | Noreen | | 5,918,176 A | 6/1999 | Arrington, Jr. |
| 5,689,270 A | 11/1997 | Kelley | | 5,918,180 A | 6/1999 | Dimino |
| 5,699,244 A | 12/1997 | Clark, Jr. | | 5,924,034 A | 7/1999 | Dupuy |
| 5,705,980 A | 1/1998 | Shapiro | | 5,926,108 A | 7/1999 | Wicks |
| 5,706,014 A | 1/1998 | Abbasi | | 5,926,133 A | 7/1999 | Green, Jr. |
| 5,708,964 A | 1/1998 | Meger | | 5,926,467 A | 7/1999 | Hershey |
| 5,724,660 A | 3/1998 | Kauser | | 5,926,745 A | 7/1999 | Threadgill |
| 5,726,660 A | 3/1998 | Purdy | | 5,929,752 A | 7/1999 | Janky |
| 5,726,663 A | 3/1998 | Moyer | | 5,929,753 A | 7/1999 | Montague |
| 5,726,893 A | 3/1998 | Schuchman | | 5,930,713 A | 7/1999 | Nguyen |
| 5,729,196 A | 3/1998 | Aljadeff | | 5,933,098 A | 8/1999 | Haxton |
| 5,729,457 A | 3/1998 | Seymour | | 5,933,431 A | 8/1999 | Ko |
| 5,731,785 A * | 3/1998 | Lemelson et al. ....... 342/357.31 | | 5,936,571 A | 8/1999 | Desjardins |
| 5,732,387 A | 3/1998 | Armbruster | | 5,937,332 A | 8/1999 | Karabinis |
| 5,734,981 A | 3/1998 | Kennedy, III | | 5,938,706 A | 8/1999 | Feldman |
| 5,737,731 A | 4/1998 | Lester | | 5,940,764 A | 8/1999 | Mikami |
| 5,742,233 A | 4/1998 | Hoffman | | 5,943,621 A * | 8/1999 | Ho et al. .................... 455/456.3 |
| 5,742,509 A | 4/1998 | Goldberg | | 5,943,689 A | 8/1999 | Tamer |
| 5,748,084 A | 5/1998 | Isikoff | | 5,946,603 A | 8/1999 | Ibanez-Meier |
| 5,748,148 A | 5/1998 | Heiser | | 5,946,611 A | 8/1999 | Dennison |
| 5,751,246 A | 5/1998 | Hertel | | 5,946,626 A * | 8/1999 | Foladare et al. ........... 455/456.1 |
| 5,754,136 A | 5/1998 | Kojima | | 5,950,137 A | 9/1999 | Kim |
| 5,760,705 A | 6/1998 | Glessner | | 5,953,672 A | 9/1999 | Lengdell |
| 5,771,455 A | 6/1998 | Kennedy, III | | 5,955,965 A | 9/1999 | Calandruccio |
| 5,774,829 A | 6/1998 | Cisneros | | 5,956,656 A | 9/1999 | Yamazaki |
| 5,781,151 A | 7/1998 | Stratton | | 5,959,529 A | 9/1999 | Kail, IV |
| 5,784,028 A | 7/1998 | Corman | | 5,959,545 A | 9/1999 | Lhamon |
| 5,787,347 A | 7/1998 | Yu | | 5,963,129 A | 10/1999 | Warner |
| 5,790,073 A | 8/1998 | Tayloe | | 5,963,130 A | 10/1999 | Schlager |
| 5,790,938 A | 8/1998 | Talarmo | | 5,963,846 A | 10/1999 | Kurby |
| 5,790,956 A | 8/1998 | Lo | | 5,966,093 A | 10/1999 | Chapman |
| 5,790,973 A | 8/1998 | Blaker | | 5,966,651 A | 10/1999 | Sibecas |

| Patent No. | Date | Name |
|---|---|---|
| 5,966,658 A | 10/1999 | Kennedy, III |
| 5,969,595 A | 10/1999 | Schipper |
| 5,973,613 A | 10/1999 | Reis |
| 5,973,643 A | 10/1999 | Hawkes |
| 5,982,322 A | 11/1999 | Bickley |
| 5,982,323 A | 11/1999 | Czichy |
| 5,982,324 A | 11/1999 | Watters |
| 5,982,325 A | 11/1999 | Thornton |
| 5,983,161 A | 11/1999 | Lemelson |
| 5,990,785 A | 11/1999 | Suda |
| 5,990,826 A | 11/1999 | Mitchell |
| 5,995,495 A | 11/1999 | Sampson |
| 5,995,804 A | 11/1999 | Rootsey |
| 5,999,088 A | 12/1999 | Sibbitt |
| 5,999,124 A | 12/1999 | Sheynblat |
| 5,999,125 A | 12/1999 | Kurby |
| 5,999,797 A | 12/1999 | Zancho |
| 5,999,880 A | 12/1999 | Okada |
| 6,002,936 A | 12/1999 | Roel-Ng et al. |
| 6,005,517 A | 12/1999 | Friedrichs |
| 6,006,159 A | 12/1999 | Schmier et al. |
| 6,009,330 A | 12/1999 | Kennedy, III |
| 6,011,510 A | 1/2000 | Yee |
| 6,014,080 A | 1/2000 | Layson, Jr. |
| 6,016,322 A | 1/2000 | Goldman |
| 6,018,313 A | 1/2000 | Engelmayer |
| 6,018,573 A | 1/2000 | Tanaka |
| 6,018,652 A | 1/2000 | Frager |
| 6,018,657 A | 1/2000 | Kennedy, III |
| 6,018,704 A | 1/2000 | Kohli |
| 6,021,330 A | 2/2000 | Vannucci |
| 6,023,219 A | 2/2000 | Lee |
| 6,023,245 A | 2/2000 | Gomez |
| 6,023,606 A | 2/2000 | Monte |
| 6,025,774 A | 2/2000 | Forbes |
| 6,028,514 A | 2/2000 | Lemelson |
| 6,028,537 A | 2/2000 | Suman |
| 6,029,066 A | 2/2000 | Despres |
| 6,031,467 A | 2/2000 | Hymel |
| 6,031,489 A | 2/2000 | Wyrwas |
| 6,035,202 A | 3/2000 | Camp, Jr. |
| 6,038,444 A | 3/2000 | Schipper |
| 6,038,445 A | 3/2000 | Alperovich |
| 6,038,451 A | 3/2000 | Syed |
| 6,041,280 A | 3/2000 | Kohli |
| 6,044,261 A | 3/2000 | Kazmi |
| 6,044,265 A | 3/2000 | Roach, Jr. |
| 6,046,687 A | 4/2000 | Janky |
| 6,047,017 A | 4/2000 | Cahn |
| 6,047,161 A | 4/2000 | Sowles |
| 6,047,183 A | 4/2000 | Kingdon |
| 6,049,711 A | 4/2000 | Ben-Yehezkel |
| 6,052,646 A | 4/2000 | Kirkhart |
| 6,054,928 A | 4/2000 | Lemelson |
| 6,054,934 A | 4/2000 | Cho |
| 6,055,426 A | 4/2000 | Beasley |
| 6,055,434 A | 4/2000 | Seraj |
| 6,058,307 A | 5/2000 | Garner |
| 6,059,843 A | 5/2000 | Kirkhart |
| 6,061,021 A | 5/2000 | Zibell |
| 6,061,389 A | 5/2000 | Ishifuji |
| 6,061,565 A | 5/2000 | Innes |
| 6,064,943 A | 5/2000 | Clark, Jr. |
| 6,064,970 A | 5/2000 | McMillan |
| 6,067,007 A | 5/2000 | Gioia |
| 6,067,031 A | 5/2000 | Janky |
| 6,069,570 A | 5/2000 | Herring |
| 6,070,085 A | 5/2000 | Bender |
| 6,072,429 A | 6/2000 | Crothall |
| 6,072,768 A | 6/2000 | Wiedeman |
| 6,073,004 A | 6/2000 | Balachandran |
| 6,073,012 A | 6/2000 | Vanden Heuvel |
| 6,075,458 A | 6/2000 | Ladner |
| 6,076,099 A | 6/2000 | Chen |
| 6,078,818 A | 6/2000 | Kingdon |
| 6,084,510 A | 7/2000 | Lemelson |
| 6,084,544 A | 7/2000 | Camp, Jr. |
| 6,085,090 A | 7/2000 | Yee |
| 6,085,148 A | 7/2000 | Jamison |
| 6,087,983 A | 7/2000 | Ho |
| 6,091,358 A | 7/2000 | Maniscalco |
| 6,091,956 A | 7/2000 | Hollenberg |
| 6,091,957 A | 7/2000 | Larkins |
| 6,091,959 A | 7/2000 | Souissi |
| 6,092,008 A | 7/2000 | Bateman |
| 6,094,168 A | 7/2000 | Duffett-Smith |
| 6,104,925 A | 8/2000 | Grube |
| 6,105,060 A | 8/2000 | Rothblatt |
| 6,108,319 A | 8/2000 | Campanella |
| 6,108,563 A | 8/2000 | Shishino |
| 6,112,083 A | 8/2000 | Sweet |
| 6,112,085 A | 8/2000 | Garner |
| 6,114,991 A | 9/2000 | Richton |
| 6,115,366 A | 9/2000 | Campanella |
| 6,115,371 A | 9/2000 | Berstis |
| 6,115,605 A | 9/2000 | Siccardo |
| 6,115,754 A | 9/2000 | Landgren |
| 6,118,977 A | 9/2000 | Vannucci |
| 6,119,014 A | 9/2000 | Alperovich |
| 6,125,325 A | 9/2000 | Kohli |
| 6,128,487 A | 10/2000 | Wiedeman |
| 6,133,853 A | 10/2000 | Obradovich |
| 6,133,871 A | 10/2000 | Krasner |
| 6,134,454 A | 10/2000 | Foladare |
| 6,137,425 A | 10/2000 | Oster |
| 6,138,003 A | 10/2000 | Kingdon |
| 6,138,026 A | 10/2000 | Irvin |
| 6,140,956 A | 10/2000 | Hillman |
| 6,144,336 A | 11/2000 | Preston |
| 6,144,927 A | 11/2000 | Grill |
| 6,147,644 A | 11/2000 | Castles |
| 6,148,196 A | 11/2000 | Baumann |
| 6,148,212 A | 11/2000 | Park |
| 6,148,261 A | 11/2000 | Obradovich |
| 6,150,921 A | 11/2000 | Werb |
| 6,151,505 A | 11/2000 | Larkins |
| 6,154,172 A | 11/2000 | Piccionelli |
| 6,154,656 A | 11/2000 | Camp, Jr. |
| 6,154,745 A | 11/2000 | Kari |
| 6,157,841 A | 12/2000 | Bolduc |
| 6,157,896 A | 12/2000 | Castles |
| 6,160,994 A | 12/2000 | Wiedeman |
| 6,161,005 A | 12/2000 | Pinzon |
| 6,161,015 A | 12/2000 | Birchler |
| 6,166,626 A | 12/2000 | Janky |
| 6,167,235 A | 12/2000 | Sibecas |
| 6,167,266 A | 12/2000 | Havinis |
| 6,169,497 B1 | 1/2001 | Robert |
| 6,169,881 B1 | 1/2001 | Astrom |
| 6,169,902 B1 | 1/2001 | Kawamoto |
| 6,173,157 B1 | 1/2001 | Godoroja |
| 6,175,308 B1 | 1/2001 | Tallman |
| 6,178,326 B1 | 1/2001 | Kalliokulju |
| 6,184,801 B1 | 2/2001 | Janky |
| 6,184,802 B1 | 2/2001 | Lamb |
| 6,185,265 B1 | 2/2001 | Campanella |
| 6,185,409 B1 | 2/2001 | Threadgill |
| 6,185,427 B1 | 2/2001 | Krasner |
| 6,188,353 B1 | 2/2001 | Mitchell |
| 6,188,911 B1 | 2/2001 | Wallentin |
| 6,195,022 B1 | 2/2001 | Yamakita |
| 6,195,039 B1 | 2/2001 | Glass, Jr. |
| 6,195,555 B1 | 2/2001 | Dent |
| 6,195,557 B1 | 2/2001 | Havinis |
| 6,198,390 B1 | 3/2001 | Schlager |
| 6,198,765 B1 | 3/2001 | Cahn |
| 6,198,930 B1 | 3/2001 | Schipper |
| 6,199,045 B1 | 3/2001 | Giniger |
| 6,201,499 B1 | 3/2001 | Hawkes |
| 6,201,798 B1 | 3/2001 | Campanella |
| 6,201,957 B1 | 3/2001 | Son |
| 6,204,813 B1 | 3/2001 | Wadell |
| 6,211,907 B1 | 4/2001 | Scaman |
| 6,219,385 B1 | 4/2001 | Weinberg |
| 6,219,556 B1 | 4/2001 | Lee |
| 6,223,044 B1 | 4/2001 | Schultz |
| 6,225,901 B1 | 5/2001 | Kail, IV |
| 6,226,511 B1 * | 5/2001 | Jacobs et al. .................. 455/411 |

| Patent | Type | Date | Name |
|---|---|---|---|
| 6,226,522 | B1 | 5/2001 | Higuchi |
| 6,226,589 | B1 | 5/2001 | Maeda |
| 6,226,622 | B1 | 5/2001 | Dabbiere |
| 6,230,097 | B1 | 5/2001 | Dance |
| 6,233,432 | B1 | 5/2001 | Inukai |
| 6,233,463 | B1 | 5/2001 | Wiedeman |
| 6,233,506 | B1 | 5/2001 | Obradovich |
| 6,236,359 | B1 | 5/2001 | Watters |
| 6,236,365 | B1 | 5/2001 | LeBlanc |
| 6,236,858 | B1 | 5/2001 | Griffith |
| 6,236,937 | B1 | 5/2001 | Kohli |
| 6,240,295 | B1 | 5/2001 | Kennedy, III |
| 6,243,587 | B1 | 6/2001 | Dent |
| 6,249,217 | B1 | 6/2001 | Forbes |
| 6,249,245 | B1 | 6/2001 | Watters |
| 6,249,246 | B1 | 6/2001 | Bode |
| 6,249,252 | B1 | 6/2001 | Dupray |
| 6,249,514 | B1 | 6/2001 | Campanella |
| 6,249,542 | B1 | 6/2001 | Kohli |
| 6,253,069 | B1 | 6/2001 | Mankovitz |
| 6,255,942 | B1 | 7/2001 | Knudsen |
| 6,255,988 | B1 | 7/2001 | Bischoff |
| 6,256,475 | B1 | 7/2001 | Vannucci |
| 6,256,503 | B1 | 7/2001 | Stephens |
| 6,256,504 | B1 | 7/2001 | Tell |
| 6,262,764 | B1 | 7/2001 | Perterson |
| 6,266,014 | B1 | 7/2001 | Fattouche |
| 6,266,617 | B1 | 7/2001 | Evans |
| 6,268,804 | B1 | 7/2001 | Janky |
| 6,269,250 | B1 | 7/2001 | Bender |
| 6,271,788 | B1 | 8/2001 | Longaker |
| 6,272,338 | B1 | 8/2001 | Modzelesky |
| 6,272,339 | B1 | 8/2001 | Wiedeman |
| 6,272,341 | B1 | 8/2001 | Threadgill |
| 6,275,164 | B1 | 8/2001 | MacConnell |
| 6,275,773 | B1 | 8/2001 | Lemelson |
| 6,281,837 | B1 | 8/2001 | Richton |
| 6,282,231 | B1 | 8/2001 | Norman |
| 6,282,495 | B1 | 8/2001 | Kirkhart |
| 6,285,281 | B1 | 9/2001 | Gatto |
| 6,289,279 | B1 | 9/2001 | Ito |
| 6,289,331 | B1 | 9/2001 | Pedersen |
| 6,292,749 | B2 | 9/2001 | Kohli |
| 6,295,449 | B1 | 9/2001 | Westerlage |
| 6,295,454 | B1 | 9/2001 | Havinis |
| 6,297,768 | B1 | 10/2001 | Allen, Jr. |
| 6,298,243 | B1 | 10/2001 | Basile |
| 6,298,306 | B1 | 10/2001 | Suarez |
| 6,300,902 | B1 | 10/2001 | Eslambolchi |
| 6,304,216 | B1 | 10/2001 | Gronemeyer |
| 6,304,746 | B1 | 10/2001 | Fascenda |
| 6,304,757 | B1 | 10/2001 | Larsson |
| 6,310,944 | B1 | 10/2001 | Brisebois |
| 6,311,128 | B1 | 10/2001 | Prum |
| 6,314,290 | B1 | 11/2001 | Joshi |
| 6,320,535 | B1 | 11/2001 | Hillman |
| 6,321,090 | B1 | 11/2001 | Soliman |
| 6,321,092 | B1 | 11/2001 | Fitch |
| 6,324,404 | B1 | 11/2001 | Dennison |
| 6,327,471 | B1 | 12/2001 | Song |
| 6,327,570 | B1 | 12/2001 | Stevens |
| 6,330,454 | B1 | 12/2001 | Verdonk |
| 6,331,825 | B1 | 12/2001 | Ladner |
| 6,333,922 | B1 | 12/2001 | Campanella |
| 6,342,854 | B1 | 1/2002 | Duffett-Smith |
| 6,343,205 | B1 | 1/2002 | Threadgill |
| 6,345,181 | B1 | 2/2002 | Janhonen |
| 6,347,216 | B1 | 2/2002 | Marko |
| 6,347,281 | B1 | 2/2002 | Litzsinger |
| 6,348,744 | B1 | 2/2002 | Levesque |
| 6,351,641 | B2 | 2/2002 | Verkama |
| 6,353,738 | B1 | 3/2002 | Joshi |
| 6,353,781 | B1 | 3/2002 | Spivak |
| 6,360,102 | B1 | 3/2002 | Havinis |
| 6,366,780 | B1 | 4/2002 | Obhan |
| 6,371,416 | B1 | 4/2002 | Hawthorne |
| 6,374,169 | B1 | 4/2002 | Demay |
| 6,377,795 | B1 | 4/2002 | Bach |
| 6,381,324 | B1 | 4/2002 | Shaffer |
| 6,381,464 | B1 | 4/2002 | Vannucci |
| 6,385,312 | B1 | 5/2002 | Shaffer |
| 6,388,579 | B1 | 5/2002 | Adcox |
| 6,388,612 | B1 | 5/2002 | Neher |
| 6,388,617 | B1 | 5/2002 | Flood |
| 6,389,298 | B1 | 5/2002 | Abramovici |
| 6,393,046 | B1 | 5/2002 | Kohli |
| 6,397,040 | B1 | 5/2002 | Titmuss |
| 6,397,133 | B1 | 5/2002 | van der Pol |
| 6,400,314 | B1 | 6/2002 | Krasner |
| 6,400,753 | B1 | 6/2002 | Kohli |
| 6,400,943 | B1 | 6/2002 | Montoya |
| 6,401,032 | B1 | 6/2002 | Jamison |
| 6,405,213 | B1 | 6/2002 | Layson |
| 6,411,806 | B1 | 6/2002 | Garner |
| 6,418,319 | B1 | 7/2002 | Dent |
| 6,421,009 | B2 | 7/2002 | Suprunov |
| 6,421,609 | B2 | 7/2002 | Kohli |
| 6,424,831 | B1 | 7/2002 | Schiff |
| 6,424,840 | B1 | 7/2002 | Fitch |
| 6,430,496 | B1 | 8/2002 | Smith |
| 6,434,381 | B1 | 8/2002 | Moore |
| 6,437,696 | B1 | 8/2002 | Lemelson |
| 6,438,465 | B2 | 8/2002 | Obradovich |
| 6,441,752 | B1 | 8/2002 | Fomukong |
| 6,442,391 | B1 | 8/2002 | Johansson |
| 6,442,485 | B2 | 8/2002 | Evans |
| D462,284 | S | 9/2002 | Womack |
| 6,448,895 | B1 | 9/2002 | Ekkel |
| 6,448,925 | B1 | 9/2002 | Shridhara |
| 6,456,621 | B1 | 9/2002 | Wada |
| 6,456,840 | B1 | 9/2002 | Uda |
| 6,462,671 | B2 | 10/2002 | Bushner |
| 6,463,272 | B1 | 10/2002 | Wallace |
| 6,463,288 | B1 | 10/2002 | Havinis |
| 6,466,569 | B1 | 10/2002 | Wright |
| 6,466,612 | B2 | 10/2002 | Kohli |
| 6,466,788 | B1 | 10/2002 | Carlsson |
| 6,472,976 | B1 | 10/2002 | Wohl |
| 6,473,031 | B1 | 10/2002 | Harris |
| 6,476,763 | B2 | 11/2002 | Allen, Jr. |
| 6,477,370 | B1 | 11/2002 | Sigler |
| 6,477,581 | B1 | 11/2002 | Carpenter |
| 6,477,667 | B1 | 11/2002 | Levi |
| 6,480,147 | B2 | 11/2002 | Durst |
| 6,483,427 | B1 | 11/2002 | Werb |
| 6,483,456 | B2 | 11/2002 | Huisken |
| 6,484,029 | B2 | 11/2002 | Hughes |
| 6,484,035 | B2 | 11/2002 | Allen, Jr. |
| 6,487,500 | B2 | 11/2002 | Lemelson |
| 6,493,338 | B1 | 12/2002 | Preston |
| 6,496,145 | B2 | 12/2002 | Gronemeyer |
| 6,496,702 | B1 | 12/2002 | Lockhart |
| 6,498,565 | B2 | 12/2002 | Boulay |
| 6,504,491 | B1 | 1/2003 | Christians |
| 6,504,634 | B1 | 1/2003 | Chan |
| 6,505,100 | B1 | 1/2003 | Stuempfle |
| 6,509,830 | B1 | 1/2003 | Elliott |
| 6,510,380 | B1 | 1/2003 | Curatolo |
| 6,515,595 | B1 | 2/2003 | Obradovich |
| 6,515,619 | B1 | 2/2003 | McKay, Jr. |
| 6,516,065 | B1 | 2/2003 | Joshi |
| 6,516,190 | B1 | 2/2003 | Linkola |
| 6,518,889 | B2 | 2/2003 | Schlager |
| 6,519,277 | B2 | 2/2003 | Eidson |
| 6,519,463 | B2 | 2/2003 | Tendler |
| 6,522,265 | B1 | 2/2003 | Hillman |
| 6,522,682 | B1 | 2/2003 | Kohli |
| 6,522,889 | B1 | 2/2003 | Aarnio |
| 6,525,768 | B2 | 2/2003 | Obradovich |
| 6,526,335 | B1 | 2/2003 | Treyz |
| 6,529,159 | B1 | 3/2003 | Fan |
| 6,529,165 | B1 | 3/2003 | Duffett-Smith |
| 6,529,731 | B2 | 3/2003 | Modzelesky |
| 6,529,824 | B1 | 3/2003 | Obradovich |
| 6,531,982 | B1 | 3/2003 | White |
| 6,532,360 | B1 | 3/2003 | Shaffer |
| 6,535,125 | B2 | 3/2003 | Trivett |
| 6,539,230 | B2 | 3/2003 | Yen |

| Patent No. | Date | Name |
|---|---|---|
| 6,542,076 B1 | 4/2003 | Joao |
| 6,542,077 B2 | 4/2003 | Joao |
| 6,542,480 B1 | 4/2003 | Campanella |
| 6,542,716 B1 | 4/2003 | Dent |
| 6,542,739 B1 | 4/2003 | Garner |
| 6,542,795 B2 | 4/2003 | Obradovich |
| 6,545,995 B1 | 4/2003 | Kinnunen |
| 6,546,360 B1 | 4/2003 | Gilbert |
| 6,549,130 B1 | 4/2003 | Joao |
| 6,552,654 B1 | 4/2003 | Gharb |
| 6,553,009 B2 | 4/2003 | Artzi |
| 6,553,236 B1 | 4/2003 | Dunko |
| 6,553,336 B1 | 4/2003 | Johnson |
| 6,556,819 B2 | 4/2003 | Irvin |
| 6,556,831 B1 | 4/2003 | Buppelmann |
| 6,556,981 B2 | 4/2003 | Pedersen |
| 6,559,620 B2 | 5/2003 | Zhou |
| 6,560,461 B1 | 5/2003 | Fomukong |
| 6,560,604 B1 | 5/2003 | Fascenda |
| 6,563,427 B2 | 5/2003 | Bero |
| 6,564,037 B1 | 5/2003 | Sweatman |
| 6,567,116 B1 | 5/2003 | Aman |
| 6,567,670 B1 | 5/2003 | Petersson |
| 6,570,975 B2 | 5/2003 | Shaffer |
| 6,571,168 B1 | 5/2003 | Murphy |
| 6,571,286 B2 | 5/2003 | Fisher |
| 6,574,558 B2 | 6/2003 | Kohli |
| 6,577,271 B1 | 6/2003 | Gronemeyer |
| 6,580,664 B2 | 6/2003 | Magnusson |
| 6,584,312 B1 | 6/2003 | Morin |
| 6,584,331 B2 | 6/2003 | Ranta |
| 6,587,046 B2 | 7/2003 | Joao |
| 6,587,634 B2 | 7/2003 | Maltz |
| 6,590,525 B1 | 7/2003 | Yule |
| 6,590,534 B1 | 7/2003 | Kroll |
| 6,591,112 B1 | 7/2003 | Siccardo |
| 6,593,851 B1 | 7/2003 | Bornstein |
| 6,594,043 B1 | 7/2003 | Bloom |
| 6,594,500 B2 | 7/2003 | Bender |
| 6,597,890 B1 | 7/2003 | Sibecas |
| 6,600,444 B2 | 7/2003 | Desjardins |
| 6,605,114 B1 | 8/2003 | Yan |
| 6,606,349 B1 | 8/2003 | Kudhrethaya |
| 6,606,556 B2 | 8/2003 | Curatolo |
| 6,608,559 B1 | 8/2003 | Lemelson |
| 6,608,892 B2 | 8/2003 | Shaffer |
| 6,611,686 B1 | 8/2003 | Smith |
| 6,611,688 B1 | 8/2003 | Raith |
| 6,621,422 B2 | 9/2003 | Rubenstein |
| 6,624,609 B2 | 9/2003 | Allen |
| 6,628,928 B1 | 9/2003 | Crosby |
| 6,628,944 B1 | 9/2003 | Jeong |
| 6,633,814 B2 | 10/2003 | Kohli |
| 6,636,175 B2 | 10/2003 | Russell |
| 6,636,178 B2 | 10/2003 | Gronemeyer |
| 6,636,721 B2 | 10/2003 | Threadgill |
| 6,636,983 B1 | 10/2003 | Levi |
| 6,643,516 B1 | 11/2003 | Stewart |
| 6,647,257 B2 | 11/2003 | Owensby |
| 6,654,362 B1 | 11/2003 | Palamara |
| 6,657,549 B1 | 12/2003 | Avery |
| 6,657,587 B1 | 12/2003 | Mohan |
| 6,658,250 B1 | 12/2003 | Ganesan |
| 6,658,585 B1 | 12/2003 | Levi |
| 6,658,586 B1 | 12/2003 | Levi |
| 6,661,884 B2 | 12/2003 | Shaffer |
| 6,664,893 B1 | 12/2003 | Eveland |
| 6,665,385 B2 | 12/2003 | Rogers |
| 6,665,613 B2 | 12/2003 | Duvall |
| 6,668,173 B2 | 12/2003 | Greene |
| RE38,378 E | 1/2004 | Montague |
| 6,678,341 B1 | 1/2004 | Miyake |
| 6,680,919 B1 | 1/2004 | Rauhala |
| 6,681,121 B1 | 1/2004 | Preston |
| 6,690,681 B1 | 2/2004 | Preston |
| 6,693,953 B2 | 2/2004 | Cox |
| 6,694,136 B2 | 2/2004 | Uda |
| 6,694,177 B2 | 2/2004 | Eggers |
| 6,694,248 B2 | 2/2004 | Edwards |
| 6,696,922 B1 | 2/2004 | Smith et al. |
| 6,700,534 B2 | 3/2004 | Harris |
| 6,701,144 B2 | 3/2004 | Kirbas |
| 6,703,936 B2 | 3/2004 | Hill |
| 6,704,543 B1 | 3/2004 | Sharon |
| 6,707,424 B1 | 3/2004 | Snyder |
| 6,707,487 B1 | 3/2004 | Aman |
| 6,708,033 B1 | 3/2004 | Linkola |
| 6,710,738 B2 | 3/2004 | Allen, Jr. |
| 6,711,408 B1 | 3/2004 | Raith |
| 6,711,474 B1 | 3/2004 | Treyz |
| 6,711,500 B2 | 3/2004 | Chen |
| 6,714,158 B1 | 3/2004 | Underbrink |
| 6,714,759 B2 | 3/2004 | Perry |
| 6,716,101 B1 | 4/2004 | Meadows |
| 6,720,864 B1 | 4/2004 | Wong |
| 6,720,879 B2 | 4/2004 | Edwards |
| 6,725,049 B1 | 4/2004 | Williams |
| 6,735,444 B2 | 5/2004 | Wingren |
| 6,747,961 B1 | 6/2004 | Ahmed |
| 6,748,226 B1 | 6/2004 | Wortham |
| 6,750,818 B2 | 6/2004 | Thomas |
| 6,751,442 B1 | 6/2004 | Barrett |
| 6,751,467 B1 | 6/2004 | Cameron |
| 6,753,782 B2 | 6/2004 | Power |
| 6,756,917 B2 | 6/2004 | Gould |
| 6,756,918 B2 | 6/2004 | Fomukong |
| 6,756,938 B2 | 6/2004 | Zhao |
| 6,757,534 B2 | 6/2004 | Bach |
| 6,760,364 B2 | 7/2004 | Kohli |
| 6,763,232 B1 | 7/2004 | Odorfer |
| 6,765,497 B2 | 7/2004 | Ablay |
| 6,768,909 B1 | 7/2004 | Irvin |
| 6,771,971 B2 | 8/2004 | Smith |
| 6,778,136 B2 | 8/2004 | Gronemeyer |
| 6,782,253 B1 | 8/2004 | Shteyn |
| RE38,600 E | 9/2004 | Mankovitz |
| 6,788,655 B1 | 9/2004 | Underbrink |
| 6,788,735 B2 | 9/2004 | Kohli |
| 6,799,094 B1 | 9/2004 | Vaida |
| 6,801,137 B2 | 10/2004 | Eggers |
| 6,806,814 B1 | 10/2004 | Iverson |
| 6,807,158 B2 | 10/2004 | Krishnamurthy |
| 6,809,659 B2 | 10/2004 | Flick |
| 6,812,824 B1 | 11/2004 | Goldinger |
| 6,813,487 B1 | 11/2004 | Trommelen |
| 6,813,498 B1 | 11/2004 | Durga |
| 6,819,919 B1 | 11/2004 | Tanaka |
| 6,826,460 B2 | 11/2004 | Kittell |
| 6,828,908 B2 | 12/2004 | Clark |
| 6,828,936 B2 | 12/2004 | Odashima |
| 6,829,221 B1 | 12/2004 | Winckles |
| 6,833,787 B1 | 12/2004 | Levi |
| 6,834,164 B1 | 12/2004 | Chan |
| 6,836,658 B1 | 12/2004 | Sharon |
| 6,839,542 B2 | 1/2005 | Sibecas |
| 6,844,845 B1 | 1/2005 | Whiteside |
| 6,847,822 B1 | 1/2005 | Dennison |
| 6,847,892 B2 | 1/2005 | Zhou |
| 6,850,497 B1 | 2/2005 | Sigler |
| 6,850,600 B1 | 2/2005 | Boeckman |
| 6,853,711 B2 | 2/2005 | Brisebois |
| 6,853,849 B1 | 2/2005 | Tognazzini |
| 6,856,945 B2 | 2/2005 | Thomas |
| 6,859,134 B1 | 2/2005 | Heiman |
| 6,859,171 B2 | 2/2005 | Durst |
| 6,859,172 B2 | 2/2005 | Powers |
| 6,859,687 B2 | 2/2005 | Obradovich |
| 6,868,270 B2 | 3/2005 | Dent |
| 6,868,386 B1 | 3/2005 | Henderson |
| 6,871,215 B2 | 3/2005 | Smith |
| 6,876,853 B2 | 4/2005 | Hokkanen |
| 6,882,837 B2 | 4/2005 | Fernandez |
| 6,885,846 B1 | 4/2005 | Panasik |
| 6,886,060 B2 | 4/2005 | Wang |
| 6,888,811 B2 | 5/2005 | Eaton |
| 6,889,135 B2 | 5/2005 | Curatolo |
| 6,891,811 B1 | 5/2005 | Smith |
| 6,903,681 B2 | 6/2005 | Faris |

| | | | |
|---|---|---|---|
| 6,904,270 B1 | 6/2005 | Chan |
| 6,915,208 B2 | 7/2005 | Garin |
| 6,917,644 B2 | 7/2005 | Cahn |
| 6,920,124 B1 | 7/2005 | Lappe |
| 6,920,322 B2 | 7/2005 | Ikeda |
| 6,922,616 B2 | 7/2005 | Obradovich |
| 6,924,748 B2 | 8/2005 | Obradovich |
| 6,928,468 B2 | 8/2005 | Leermakers |
| 6,931,055 B1 | 8/2005 | Underbrink |
| 6,931,232 B1 | 8/2005 | Wolcott |
| 6,931,233 B1 | 8/2005 | Tso |
| 6,933,840 B2 | 8/2005 | Cariffe |
| 6,933,846 B2 | 8/2005 | Moldavsky |
| 6,940,403 B2 | 9/2005 | Kail |
| 6,941,129 B2 | 9/2005 | Marce |
| 6,943,703 B2 | 9/2005 | Rubenstein |
| 6,947,398 B1 | 9/2005 | Ahmed |
| 6,950,013 B2 | 9/2005 | Scaman |
| RE38,838 E | 10/2005 | Taylor, Jr. |
| 6,952,181 B2 | 10/2005 | Karr |
| 6,952,440 B1 | 10/2005 | Underbrink |
| 6,952,646 B2 | 10/2005 | Chang |
| 6,954,630 B2 | 10/2005 | Offer |
| 6,956,467 B1 | 10/2005 | Mercado |
| 6,957,107 B2 | 10/2005 | Rogers |
| 6,957,393 B2 | 10/2005 | Fano |
| 6,961,660 B2 | 11/2005 | Underbrink |
| 6,965,297 B1 | 11/2005 | Sandahl |
| 6,968,737 B2 | 11/2005 | Chen |
| 6,980,636 B2 | 12/2005 | Fleischer, III |
| 6,980,813 B2 | 12/2005 | Mohi |
| 6,983,146 B2 | 1/2006 | Spratt |
| 6,985,742 B1 | 1/2006 | Giniger |
| 6,985,746 B2 | 1/2006 | Gorsuch |
| 6,992,582 B2 | 1/2006 | Hill |
| 6,992,583 B2 | 1/2006 | Muramatsu |
| 6,998,959 B2 | 2/2006 | Lund |
| 6,999,716 B1 | 2/2006 | Andre |
| 6,999,779 B1 | 2/2006 | Hashimoto |
| 7,000,116 B2 | 2/2006 | Bates |
| 7,002,468 B2 | 2/2006 | Eveland |
| 7,002,516 B2 | 2/2006 | Gronemeyer |
| 7,003,278 B2 | 2/2006 | Beni |
| 7,003,322 B2 | 2/2006 | Judd |
| 7,006,835 B2 | 2/2006 | Otsuka |
| 7,009,555 B2 | 3/2006 | Tsujimoto |
| 7,010,308 B2 | 3/2006 | Hendrey |
| 7,020,103 B1 | 3/2006 | Refai |
| 7,020,104 B2 | 3/2006 | Bay |
| 7,020,217 B1 | 3/2006 | Parsons |
| 7,024,205 B1 | 4/2006 | Hose |
| 7,024,211 B1 | 4/2006 | Martin |
| 7,024,331 B2 | 4/2006 | Jones |
| 7,026,957 B2 | 4/2006 | Rubenstein |
| 7,027,773 B1 | 4/2006 | McMillin |
| 7,027,815 B2 | 4/2006 | Sendonaris |
| 7,031,272 B2 | 4/2006 | Campanella |
| 7,031,655 B2 | 4/2006 | Nomura |
| 7,031,711 B2 | 4/2006 | Soliman |
| 7,031,945 B1 | 4/2006 | Donner |
| 7,039,424 B2 | 5/2006 | Gorsuch |
| 7,040,538 B2 | 5/2006 | Patel |
| 7,043,204 B2 | 5/2006 | Reagor |
| 7,043,241 B1 | 5/2006 | Sladek |
| 7,043,270 B2 | 5/2006 | Judd |
| 7,046,120 B2 | 5/2006 | Lund |
| 7,047,024 B2 | 5/2006 | Shintai |
| 7,049,981 B2 | 5/2006 | Behr |
| 7,050,818 B2 | 5/2006 | Tendler |
| 7,053,824 B2 | 5/2006 | Abraham |
| 7,054,432 B2 | 5/2006 | Sabinson |
| 7,061,385 B2 | 6/2006 | Fong |
| 7,062,279 B2 | 6/2006 | Cedervall |
| 7,062,286 B2 | 6/2006 | Grivas |
| 7,062,362 B2 | 6/2006 | Obradovich |
| 7,062,778 B1 | 6/2006 | Pattersson |
| 7,065,886 B2 | 6/2006 | Segur |
| 7,068,994 B2 | 6/2006 | Van Camp |
| 7,069,018 B1 | 6/2006 | Granstam |
| 7,069,026 B2 | 6/2006 | McClure |
| 7,069,319 B2 | 6/2006 | Zellner |
| 7,076,257 B2 | 7/2006 | Kall |
| 7,079,551 B2 | 7/2006 | Shivnan |
| 7,080,402 B2 | 7/2006 | Bates |
| 7,085,555 B2 | 8/2006 | Zellner |
| 7,091,882 B2 | 8/2006 | Doyle |
| 7,092,367 B2 | 8/2006 | Kawai |
| 7,092,704 B2 | 8/2006 | Hosono |
| 7,104,851 B1 | 9/2006 | Gonring |
| 7,106,211 B2 | 9/2006 | Duvall |
| 7,107,038 B2 | 9/2006 | Fitch |
| 7,110,401 B2 | 9/2006 | Wada |
| 7,110,749 B2 | 9/2006 | Zellner |
| 7,110,772 B1 | 9/2006 | Wu |
| 7,110,773 B1 | 9/2006 | Wallace |
| 7,113,126 B2 | 9/2006 | Durst |
| 7,113,493 B1 | 9/2006 | Bush |
| 7,113,797 B2 | 9/2006 | Kelley |
| 7,113,864 B2 | 9/2006 | Smith |
| 7,116,704 B2 | 10/2006 | Norman |
| 7,116,911 B2 | 10/2006 | Bloom |
| 7,116,977 B1 | 10/2006 | Moton, Jr. |
| 7,120,449 B1 | 10/2006 | Muhonen |
| 7,120,921 B1 | 10/2006 | Ito |
| 7,127,264 B2 | 10/2006 | Hronek |
| 7,130,290 B2 | 10/2006 | Wada |
| 7,130,396 B2 | 10/2006 | Rogers |
| 7,130,584 B2 | 10/2006 | Hirvonen |
| 7,130,630 B1 | 10/2006 | Enzmann |
| 7,133,685 B2 | 11/2006 | Hose |
| 7,136,473 B2 | 11/2006 | Gruchala |
| 7,136,474 B2 | 11/2006 | Shaffer |
| 7,139,557 B2 | 11/2006 | Tang |
| 7,139,582 B2 | 11/2006 | Couronne |
| 7,148,802 B2 | 12/2006 | Abbruscato |
| 7,151,768 B2 | 12/2006 | Preston |
| 7,155,340 B2 | 12/2006 | Churan |
| 7,161,622 B2 | 1/2007 | Oinoue |
| 7,162,199 B1 | 1/2007 | Glickstein |
| 7,162,454 B1 | 1/2007 | Donner |
| 7,167,454 B2 | 1/2007 | Caldwell |
| 7,167,553 B2 | 1/2007 | Shaffer |
| 7,170,445 B2 | 1/2007 | Thiel |
| 7,170,518 B1 | 1/2007 | Millington |
| 7,171,187 B2 | 1/2007 | Haave |
| 7,171,221 B1 | 1/2007 | Amin |
| 7,180,427 B2 | 2/2007 | Meyer |
| 7,180,873 B1 | 2/2007 | Monte |
| 7,181,160 B2 | 2/2007 | Barrett |
| 7,181,225 B1 | 2/2007 | Moton, Jr. |
| 7,181,228 B2 | 2/2007 | Boesch |
| RE39,526 E | 3/2007 | Hull |
| 7,196,621 B2 | 3/2007 | Kochis |
| 7,199,726 B2 | 4/2007 | Fomukong |
| 7,200,183 B2 | 4/2007 | Olson |
| 7,200,387 B1 | 4/2007 | Ephraim |
| 7,203,300 B2 | 4/2007 | Shaffer |
| 7,203,302 B2 | 4/2007 | Sabinson |
| 7,203,665 B2 | 4/2007 | Donner |
| 7,203,752 B2 | 4/2007 | Rice |
| 7,206,305 B2 | 4/2007 | Preston |
| 7,206,849 B1 | 4/2007 | Gernert |
| 2004/0021573 A1 * | 2/2004 | Hoffman et al. ............ 340/573.1 |
| 2005/0091338 A1 * | 4/2005 | de la Huerga ................ 709/217 |
| 2006/0025158 A1 * | 2/2006 | Leblanc et al. ............ 455/456.2 |

FOREIGN PATENT DOCUMENTS

| | | |
|---|---|---|
| CA | 958772 | 12/1974 |
| CA | 1046669 | 1/1979 |
| CA | 1087251 | 10/1980 |
| CA | 1172847 | 8/1984 |
| CA | 122693 | 9/1987 |
| CA | 1277400 | 12/1990 |
| DE | 918726 | 10/1954 |
| DE | 1462183 | 9/1969 |
| DE | 2105441 | 8/1971 |
| DE | 2157821 | 5/1973 |
| DE | 2706266 | 8/1977 |

| | | | | | |
|---|---|---|---|---|---|
| DE | 2715956 | 10/1978 | FR | 2268407 | 11/1975 |
| DE | 2840136 | 3/1980 | FR | 2341986 | 9/1977 |
| DE | 3013950 | 10/1981 | FR | 2347836 | 11/1977 |
| DE | 3128578 | 2/1983 | FR | 246081 3 | 1/1981 |
| DE | 3142978 | 5/1983 | FR | 248761 0 | 1/1982 |
| DE | 3227547 | 2/1984 | FR | 2541 020 | 8/1984 |
| DE | 3322436 | 1/1985 | FR | 2541801 | 8/1984 |
| DE | 3329267 | 2/1985 | FR | 255461 8 | 5/1985 |
| DE | 34191 56 | 11/1985 | FR | 2596902 | 10/1987 |
| DE | 3513698 | 10/1986 | GB | 292182 | 6/1928 |
| DE | 3516357 | 11/1986 | GB | 553671 | 6/1943 |
| DE | 3621 990 | 1/1987 | GB | 786041 | 11/1957 |
| DE | 3528886 | 2/1987 | GB | 1287304 | 8/1972 |
| DE | 3716329 | 12/1988 | GB | 1425894 | 2/1976 |
| DE | 3932029 | 6/1990 | GB | 1524946 | 9/1978 |
| DE | 40021 76 | 8/1990 | GB | 1543910 | 4/1979 |
| DE | 0201126 | 10/2002 | GB | 2016770 | 9/1979 |
| EP | 0011444 | 5/1980 | GB | 2034995 | 6/1980 |
| EP | 0027188 | 4/1981 | GB | 2050767 | 1/1981 |
| EP | 0029201 | 5/1981 | GB | 1594931 | 8/1981 |
| EP | 0033149 | 7/1981 | GB | 2094089 | 9/1982 |
| EP | 0040954 | 12/1981 | GB | 2095516 | 9/1982 |
| EP | 50409 | 4/1982 | GB | 2110851 | 6/1983 |
| EP | 0084004 | 7/1983 | GB | 2116807 | 9/1983 |
| EP | 0103438 | 3/1984 | GB | 2118000 | 10/1983 |
| EP | 011972 | 6/1984 | GB | 2118002 | 10/1983 |
| EP | 0111444 | 6/1984 | GB | 2120507 | 11/1983 |
| EP | 0123562 | 10/1984 | GB | 2127643 | 4/1984 |
| EP | 0124788 | 11/1984 | GB | 2142143 | 1/1985 |
| EP | 01332235 | 2/1985 | GB | 2144565 | 3/1985 |
| EP | 0137865 | 4/1985 | GB | 2149616 | 6/1985 |
| EP | 0144665 | 6/1985 | GB | 2157131 | 10/1985 |
| EP | 0145171 | 6/1985 | GB | 2165127 | 4/1986 |
| EP | 0174540 | 3/1986 | GB | 2172775 | 9/1986 |
| EP | 0176956 | 4/1986 | GB | 2176639 | 12/1986 |
| EP | 199266 | 10/1986 | GB | 21 76970 | 1/1987 |
| EP | 0199266 | 10/1986 | GB | 2180425 | 3/1987 |
| EP | 0213929 | 3/1987 | GB | 2183966 | 6/1987 |
| EP | 0241565 | 10/1987 | GB | 2191054 | 12/1987 |
| EP | 242099 | 10/1987 | GB | 2193861 | 2/1988 |
| EP | 0242099 | 10/1987 | GB | 2207787 | 2/1989 |
| EP | 251457 | 1/1988 | GB | 2208985 | 4/1989 |
| EP | 251475 | 1/1988 | GB | 2214739 | 9/1989 |
| EP | 0253465 | 1/1988 | GB | 2222340 | 2/1990 |
| EP | 0260763 | 3/1988 | GB | 2232553 | 12/1990 |
| EP | 0263666 | 4/1988 | JP | 54-37519 | 3/1979 |
| EP | 0282041 | 9/1988 | JP | 58-48811 | 3/1983 |
| EP | 0286614 | 10/1988 | JP | 58-224452 | 12/1983 |
| EP | 0287827 | 10/1988 | JP | 60-261232 | 12/1985 |
| EP | 0290679 | 11/1988 | JP | 61-03542 | 1/1986 |
| EP | 0290725 | 11/1988 | JP | 62-195940 | 8/1987 |
| EP | 0295022 | 12/1988 | JP | 63-078680 | 4/1988 |
| EP | 0295678 | 12/1988 | JP | 63-218866 | 9/1988 |
| EP | 0300205 | 1/1989 | JP | 63-219828 | 9/1988 |
| EP | 0311919 | 4/1989 | JP | 63-219829 | 9/1988 |
| EP | 0318260 | 5/1989 | JP | 01 14016 | 1/1989 |
| EP | 331567 | 9/1989 | JP | 017553 | 1/1989 |
| EP | 0353849 | 2/1990 | JP | 0028675 | 1/1989 |
| EP | 0353995 | 2/1990 | JP | 0103834 | 1/1989 |
| EP | 0366378 | 2/1990 | JP | 0110110 | 1/1989 |
| EP | 0365885 | 5/1990 | JP | 0111143 | 1/1989 |
| EP | 0366342 | 5/1990 | JP | 0121383 | 1/1989 |
| EP | 0367935 | 5/1990 | JP | 0128861 | 1/1989 |
| EP | 0380075 | 8/1990 | JP | 0129609 | 1/1989 |
| EP | 0405372 | 1/1991 | JP | Z-Z10923 | 1/1989 |
| EP | 0407243 A1 | 1/1991 | JP | 1-044179 | 2/1989 |
| EP | 0447978 | 9/1991 | JP | 01381 14 | 2/1989 |
| EP | 0421698 A2 | 11/1991 | JP | 0033984 | 2/1989 |
| EP | 484662 | 5/1992 | JP | 0033985 | 2/1989 |
| EP | 0484918 A2 | 5/1992 | JP | 0034635 | 2/1989 |
| EP | 0510789 | 10/1992 | JP | 0038940 | 2/1989 |
| EP | 0426269 | 8/1995 | JP | 0040611 | 2/1989 |
| EP | 575678 | 1/1997 | JP | 0042807 | 2/1989 |
| EP | 510789 | 3/1997 | JP | 0137714 | 2/1989 |
| EP | 853041 | 7/1998 | JP | 0138113 | 2/1989 |
| EP | 1070194 | 1/2001 | JP | 0140042 | 2/1989 |
| EP | 0085013 | 10/2007 | JP | 0147585 | 2/1989 |
| FR | 21 85906 | 1/1974 | JP | 0147847 | 2/1989 |
| FR | 2248517 | 5/1975 | JP | 0148360 | 2/1989 |

| | | |
|---|---|---|
| JP | 01 75420 | 3/1989 |
| JP | 01 77039 | 3/1989 |
| JP | 01 86056 | 3/1989 |
| JP | 0068028 | 3/1989 |
| JP | 0078332 | 3/1989 |
| JP | 0161941 | 3/1989 |
| JP | 0164361 | 3/1989 |
| JP | 0167813 | 3/1989 |
| JP | 0098057 | 4/1989 |
| JP | 0189000 | 4/1989 |
| JP | 0191540 | 4/1989 |
| JP | 194029 | 4/1989 |
| JP | 194030 | 4/1989 |
| JP | 194031 | 4/1989 |
| JP | 0196179 | 4/1989 |
| JP | 1-175420 | 7/1989 |
| JP | 1-175420 A | 7/1989 |
| JP | 1-243787 | 9/1989 |
| JP | 021923 | 1/1990 |
| JP | 022622 | 1/1990 |
| JP | 0208931 | 1/1990 |
| JP | 241979 | 2/1990 |
| JP | 252972 | 2/1990 |
| JP | 2-266677 | 10/1990 |
| JP | 3-239091 | 10/1991 |
| JP | 3-291582 | 12/1991 |
| JP | 4-113727 | 4/1992 |
| WO | 8001030 | 5/1980 |
| WO | 8102961 | 10/1981 |
| WO | 8201268 | 4/1982 |
| WO | 8806830 | 9/1988 |
| WO | 8904031 | 5/1989 |
| WO | 8912835 | 12/1989 |
| WO | 9013186 | 11/1990 |
| WO | 91 00658 | 1/1991 |
| WO | 9100660 | 1/1991 |
| WO | 91 07037 | 5/1991 |
| WO | 9107020 | 5/1991 |
| WO | 9107030 | 5/1991 |
| WO | 9107036 | 5/1991 |
| WO | 9108621 | 6/1991 |
| WO | 9305490 | 3/1993 |

OTHER PUBLICATIONS

Federal Communications Commission; In the Matter of Revision of the Commission's Rules to Ensure Compatibility With Enhanced 911 Emergency Calling Systems; FCC—In the Matter of Revision—1996.pdf; Federal Communications Commission FCC 96-264.

Office of Technology Assessment, U.S Congress; Wireless Technologies and the National Information Infrastructure; Wireless Technologies National Info Infrastructure.pdf OTA-ITC-622 GPO stock #052-003-01421-1 Sep. 1995.

Kevin G. Hegebarth; ANI is the Key to Unlock Advanced Network Services; Hegebarth—ANI Is the Key.pdf Telephonu/Nov. 14, 1988.

Defendant Nextel; Nextel of California, Inc., et al.'S Memorandum of Points and Authorities in Support of Motion for Summary Judgment of Unenforceability and Invalidity Under 35 U.S.C. §102(f)for Incorrect Inventorship.

Plaintiff Enovsys; Plaintiff Enovsys' Memorandum of Points and Authorities in Opposition to Defendants Motion for Summary Judgment of Unenforceability and Invalidity Under 35 U.S.C. §102(f); 206-P'sopptoMSJofunenforce&invalid102f.pdf United States District Court Central District of California; Case No. CV 06-5306-RSWL (SHx).

Plaintiff Enovsys; Declaration of Mundi Fomukong in Opposition to Defendants Motion for Summary Judgment of Unenforceability and Invalidity Under 35 U.S.C. §102(f) for Incorrect Inventorship; 208-FomukongdeclinopptoMSJunenforce&invalid102f.pdf.

Plaintiff Enovsys; Declaration of Denzil Chesney in Opposition to Defendants Motion for Summary Judgment of Unenforceability and Invalidity Under 35 U.S.C. §102(f) for Incorrect Inventorship; 209-ChesneydeclinopptoMSJunenforce&invalid102f.pdf United States District Court Central District of California; Case No. CV 06-5306-RSWL (SHx).

Defendant Nextel; Nextel of California, Inc., et al.'S Reply Brief in Support of Motion for Summary Judgment of Unenforceability and Invalidity Under 35 U.S.C. §102(f)for Incorrect Inventorship; 224-1NextelCAreplyMSJincorrectinventor102f.pdf; United States District Court Central District of California; Case No. CV 06-5306-RSWL (SHx).

United States District Court Central District of California; Court Order for Defendant/Countercliamant Nextel of California, Inc., et al.'S Motion for Summary Judgment of Unenforceability and Invalidity Under 35 U.S.C. §102(f) for Incorrect Inventorship; 260-OrderreDefs'MSJInvalidity'unenforce102f.pdf.

Defendant Nextel; Nextel of California, Inc., et al.'S Memorandum of Points and Authorities in Support of Motion for Summary Judgment of Invalidity Under 35 U.S.C. §§102 and 103; 138-2Def'smotionforinvalidityunder102and103.pdf United States District Court Central District of California; Case No. CV 06-5306-RSWL (SHx).

Plaintiff Enovsys; Plaintiff Enovsys' Memorandum of Points and Authorities in Opposition to Defendants Motion for Summary Judgment of Invalidity Under Section 102 and 103; 199-P'sopptoMSJifinvaliditysect102&103.pdf United States District Court Central District of California; Case No. CV 06-5306-RSWL (SHx).

Plaintiff Enovsys; Declaration of Christopher Rose, Phd in Opposition to Defendants Motion for Summary Judgment of Invalidity Under Section 102 and 103; 201-1RoseDeclinopptoMSJofinvalidity102&103.pdfUnited States District Court Central District of California; Case No. CV 06-5306-RSWL (SHx).

Defendant Nextel; Nextel of California, Inc., et al.'S Reply Brief in Support of Motion for Summary Judgment of Invalidity Under 35 U.S.C. §§102 and 103; 227-NextelCAreplyMSJinvalidity102&103.pdf United States District Court Central District of California; Case No. CV 06-5306-RSWL (SHx).

Defendant Nextel; Nextel of California, Inc., et al.'S Supplemental Briefing in Support of Summary Judgment Motions and Opposition; 268-Nextelsuppmemoresumjudg102&103.pdf United States District Court Central District of California; Case No. CV 06-5306-RSWL (SHx).

Plaintiff Enovsys; Plaintiff Enovsys'Supplemental Memorandum of Points and Authorities Re Pending Summary Judgement Motions; 269-PlaintiffssuppmemoreMSJs.pdf United States District Court Central District of California; Case No. CV 06-5306-RSWL (SHx).

Plaintiff Enovsys; Plaintiff Enovsys' Notice of Motion and Motion for Partial Summary Judgement on Defendant's Affirmative Defense and Counterclaim That the Patents-In-Suit Are Invalid Under Section 102; 146-P'sMSJre102.pdf.

Defendant Nextel; Nextel of California, Inc., et al.'S Memorandum of Points and Authorities in Opposition to Enovsys' Motion for Partial Summary Judgment Re Invalidity Under Section 102; 197-NexteloppreparatialMSJreinvaliditysect102.pdf United States District Court Central District of California; Case No. CV 06-5306-RSWL (SHx).

Plaintiff Enovsys; Reply Brief in Support of Plaintiff Enovsys' Motion for Partial Summary Judgement on Defendants Affirmative Defense and Counterclaim That the Patents-In-Suit Are Invalid Under Section 102; 230-P'sreplypartialMSJ.pdf.

United States District Court Central District of California; Court Order on Motion for Summary Judgement of Invalidity under 35 USC 102 and 103; 286-orderresummaryjudgments.pdfUnited States District Court Central District of California; Case No. CV 06-5306-RSWL (SHx).

Plaintiff Enovsys; Plaintiff Enovsys'[Corrected] Opening Claim Construction Brief 152-correctclaimconstructionbrief.pdf; United States District Court Central District of California; Case No. CV 06-5306-RSWL (SHx).

Plaintiff Enovsys; Exhibit 3 to Declaration of Jeff Eichmann in Support of Plaintiff Enovsys' Opening Claim Construction Brief; 137-4(Exhibit3toClaimconstructionbrief).pdf; United States District Court Central District of California; Case No. CV 06-5306-RSWL (SHx).

Defendant Nextel; Nextel of California, Inc., et al.'S Brief in Support of Defendant'S Proposed Claim Construction 195-1Nextelproposedclaimconstruction.pdf; United States District Court Central District of California; Case No. CV 06-5306-RSWL (SHx).

Plaintiff Enovsys; Plaintiff Enovsys'Reply Claim Construction Brief; 228-P'sreplyreclaimconstruction.pdf; United States District Court Central District of California; Case No. CV 06-5306-RSWL (SHx).

Defendant Nextel; Nextel of California, Inc., et al.'S Sur-Reply in Support of Defendant'S Proposed Claim Construction 238-1Nextelsurreplyreclmconst.pdf; United States District Court Central District of California; Case No. CV 06-5306-RSWL (SHx).

United States District Court Central District of California; Court Order on Claim Construction 261-ClaimConstorder.pdf United States District Court Central District of California; Case No. CV 06-5306-RSWL (SHx).

B. Crow, Topography Experiment Topex, Jet Propulsion Laboratory Notebook, cover dated Jan. 82, plus: pp. 15-30, except p. 16; including p. 25: copy of drawing entitled Series Concept Simplified Block diagram (Terrestrial Applications), PFMIDJS.

B. H. Batson et al., Spread Spectrum Techniques for the Space Shuttle, IEEE NTC '79, Washington, Nov. 27-29, 1979, pp. 54.4.1 to 54.4.5.

Ballard, A. H., Rosette Constellations of Earth Satellites, IEEE, vol. AES-16, No. 5, pp. 656-673 (1980).

Ballard, et al, Cellular Mobile Radio as an Intelligent Network Application Electrical Communication vol. 63, M, 1989.

Before the FCC, Washington, D.C. 20554, Aries Constellation Low Earth Orbit Satellite System Proposal on Constellation Communications, Inc. Jun. 3, 1991, Appendix A, B, and C.

Bellanger et al, Digital Filtering by Popyphase Network: Application to Sample Rate Alteration and Filter Banks, IEEE Transaction on Acoustics Speech, and Signal Processing, vol. ASSP-24, No. 2, Apr. 1976.

Benedicto, J. et al., MAGSS-14: A Medium-Altitude Global Mobile Satellite System for Personal Communications at Lband, ESTEC (1992).

Beste, D. C., Design of Satellite Constellations for Optimal Continuous Coverage, IEEE Transactions on Aerospace and Electronic Systems, AES-14, No. 3, pp. 466-473 (1978).

Billstrom, A Public Automatic Mobil Telephone System, Ericsson Review, vol. 57, No. 1 (1980), pp. 26-35.

Binder et al. Crosslink Archhitectures for a Multiple Satellite System; IEEE, vol. 75, No. 1, Jan. 1987.

Binder et al., Crosslink architectures for a multiple satellite system, Proceedings of the IEEE, vol. 75, No. 1, Jan. 1987, pp. 74-81.

Bleazard, Introducing Satellite Communications 1986, pp. 68-71.

Bock et al., Establishment of Three Dimensional Geodetic Control by Interferometry With the GPS, Journal of Geophysical Research, vol. 90, #I39 Aug. 10, 1985.

Bohm, Dr. Ing. Manfred, Mobile Telephone for Everyone Through Digital Technology, Personal Communications Technology, (Nov. 1985), pp.

Borel et al, Texas Instrument Phase I GPS User Equipment, the Institute of Navigation: The Global Positioning System, pp. 87-102, 1980.

Bossler and Goad, Using the Global Positioning System (GPS) for Geodetic Positioning, Bulletin Geodesique, pp. 553-563, 1980.

Bossler, Goad and Bender, Using the Global Positioning System (GPS) for Geodetic Positioning, Bulletin Geodesique, vol. 54, 1980, pp. 553-563.

Bossler, Goad and Bender, Using the Global Positioning Systems (GPS) for Geodetic Positioning, Bulletin Geodesique, vol. 54, 1980, pp. 553-563.

Boyles et al., Cycloergodic Properties of Discrete-Parameter Nonstationary Stochastic Processes, IEEE Transactions on Information Theory, BPR 2000 Series Display Publication No. 68P81032C70-0, copyright 1982, by Motorola, Inc.

Bradford W. Parkinson, GPS Accuracy and Reliability Improved with Pseudolites, Microwave Systems News, Nov. 1984, pp. 85-86, 91-94, 97.

Bradford W. Parkinson, Navstar Global Positioning System, (GPS), 1976 National Telecommunications Conference, vol. III, Dallas, Tex, Nov. 29, Dec. 1, 1976, pp. 41.1-1 t041.1.

British Broadcasting Corporation, Independent Broadcasting Authority and British Radio Equipment Manufacturer's Association, Broadcast.

British Broadcasting Corporation, Independent Broadcasting Authority and British Radio Equipment Manufacturer's Association, Broadcast Teletext Specification, Sep. 1976, United Kingdom (27 pp.).

Brochure-Digital Audio 3-Meter Earth Station, Jun. 1982, (2 pages).

Brochure, DeLorme Mapping, XMap Professional for UNIX, 1993, six pages.

Brochure, LO JACK, Stolen Vehicle Police Recovery Network, Aug. 1993, 2 pages.

Brown, A GPS Receiver with Built-In Precision Pointing Capability, Texas Instruments Incorporated, paper presented at the IEEE Position Location and , Navigation Symposium (Plans 'SO), Las Vegas, Nevada, Mar. 20, 1990.

Buennagel et al., Series Project: Final Report on Research and Development Phase, 1979-1983, JPL Publication 8416, Mar. 1984, pp. 1-46.

Buennagel, MacDoran, Neilan, Spitzmesser & Young, Satellite Emission Range Inferred Earth Survey (Series) Project: Final Report on Research and Development Phase, 1979 to 1983, JPL Publication 84 16, Mar. 1, 1984.

Burke, T., Proceedings of the National Communications Forum, vol. 43, No. 2, Oct. 1989.

C. C. Counselman III, D. H. Steinbrecher, The Macrometer.TM.: A Compact Radio Interferometry Terminal for Geodesy With GPS, Proceedingsof the Third International Geodetic Symposium on Satellite Doppler Positioning, pp. 1165-1 172, Feb. 8-12, 1982.

C. Cox, Universal Digital Portable Radio Communications, Proc. of the IEEE, vol. 75, No. 4, Apr. 1987, pp. 436-477.

C. Goad, Visit with P. MacDoran, Aug. 6, 1981u, Memo to Capt. Bossler, sent to Dr. Counselman Aug. 12, 1981, 3 pages.

C. Goad, Visit with P. MacDoran, Aug. 6, 1981, Memo to Capt. Bossler, sent to Dr. Counselman, Aug. 12, 1981, 3 pp.

Car & Driver, Car 54, Where Are You, May 1994, pp. 105-115.

Carey and Welsh, Location and Control of Vehicles The SERT Journal V5, Jul. 1971, No. 4, pp. 87-92.

CDMA Cellular, The Next Generation, brochure, Qualcomm, Inc., undated but accompanied by transmittal letter dated Jan. 18, 1990.

Chaddock, A Proposed Architecture for a Mobile Telephone System Utilizing Multi-Beam Satellite Coverage 1984, IEEE.

Chang Kee, Parkinson & Axelrad, Wide Area Differential GPS, ION Sep. 1990.

Chao Low Cost RFILSI Technologies for Commercial GPS Receivers Microwave System Application Technology Conference, Mar. 1983.

Chapman Security Systems, Inc. (Bensenville, Ill.), Chapman 91 ICLS Product Catalogue, undated, 4 pages.

Charles C. Counselman III, Radio Astrometry, Annual Reviews of Astrometry and Astrophysics, vol. 14, 1976, pp. 197-214.

Antenna Performance Standards, FCC, Appendix D to FCC Docket 81-704, Sep. 1, 1978.

Antenna Theory and Design, Stutzman, et al., John Wiley & Sons, pp. 29-30, Jan. 1, 1981.

Antennas, Kraus, McGraw-Hill Book Company, pp. 343-346, Jan. 1, 1950.

Anti-Jamming Characteristics of GPSIGDM, Hemesath et al., National Telecommunications Conference, vol. III, pp. 41.6-1 to 41.6-5, Jan. 1, 1976.

Applicability of an Augmented GPS for Navigation in the National Airspace System, Schuchman et al. 8078 Proceedings of the IEEEE, 77 (1989).

Application for Developmental Cellular System, Illinois Bell Telephone Company, Fed. Commun. Comm. File 201 15-CD-P-76, 711975.

Applications of the Compact Disc in Car Information and Navigation Systems, by M. L. G. Thoone et al., Technical Papers Series 840156, Society of Automotive Engineers, 1984.

Applications of the Spread-Spectrum Signals from the NOVA Satellites, Prozeller, Proceedings of the National Aerospace Symposium, Springfield, pp. 93 100, Jan. 1, 1979.

Attention, Intentions, and the Structure of Discourse, by B. J. Grosz and C. L. Sidner (Computational Linguistics, 12 (3):175-204, 1986.

Automated Provision of Navigation Assistance to Drivers, by Matthew McGranaghan et al., The American cartographer 14(2):121-138, 1987.

Automatic Data Communications for Vehicles, J. Edwards et al.; Intrnt'l Conf. on Comm. Equip. and Systems, (Brighton, U.K.; Jun. 1976).

Aximuth Correlator for Synthetic Aperture Radar, Arens, NASA Tech. Briefs, pp. 22-23, Mar. 1, 1979.

Back Seat Driver: Voice Assisted Automobile Navigation, by J. R. Davis, Ph.D. Thesis, Massachusetts Institute of Technology, Sep. 1989.

Billing Systems: they aren't just for billing anymore, Cellular Business, v9, n12, p. 24, Nov. 1992.

BPR—2000, Display Radio Pager; Sales Brochure No. RB-05-05, Motorola Inc., 1983.

Call Delivery to Portable Telephones Away From Home Using the Local Exchange Network by Michael J. Beller pp. 0948-0953, 1991 IEEE.

Calling Number Delivery, Bell Communications Research, Inc., Nov. 1984.

CATV' supervixed by H. Myyagawa, the Society of Electronics and Communications Engineers of Japan, Ohm-sha, 1986.

CBS Radio Networks and Satellite Distribution in the 8O1s.

CD-ROM Assisted Navigation Systems, by O. Ono et al., Digest of Technical Papers, IEEE International Conference on Consumer Electronics, Rosemont, Ill., Jun. 8-10, 1988.

Cellular Land-Mobile Radio: Why Spread Spectrum?, Cooper et al., IEEE Communications Magazine, pp. 17-24, Mar. 1, 1979.

Cellular Networking: A Caller's Perspective by Keith W. Kaczmarek, pp. 1-6, 1989 IEEE.

Earnshaw, R. W. & Mars, P., Footprints for Mobile Communications, IEE 8th UK Teletraffic Symposium, Apr. 1991, pp. 22/1-2214.

Eckert, Klaus-Dieter et al., The Fully Cellular Radio Telephone System CD 900, Nordic Seminar on Digital Land Mobile Radiocommunication, (Feb. 5-7, 1985 Espoo, Finland), pp. 241-259.

Edward F. Prozeller, Application of the Spread—Spectrum Signals from the NOVA Satellites, Navigation Satellite Users: Proceedings of the NationalAerospace Symposium, Springfield, VA., Mar. 6-8, 1979, pp. 93-100.

Edward F. Prozeller, Applications of the Spread-Spectrum Signals to the NOVA Satellites, Proceedings of the National Aerospace Symposium.

Edward G. Tiedmann, Jr., Irwin M. Jacobs, Allen B. Salmasi, and Thomas J. Bernard, The OmniTRaCS Mobile Satellite Communications and Positioning System, Vehicle Electronics in the 90's: Proceedings of the International Congress on Transportation.

Edwin B. Parker, Micro Earth Stations as Personal Computer Accessories, Proceedings of the IEEE, vol. 72, No. 1 1, Nov. 1984, pp. 1526-1531.

Edwin B. Parker, Micro Earth Stations Make Business Satcom Affordable, Microwave Systems News, Nov. 1982.

Electroluminescent Typewriter; Hamburger N.E.C.; vol. 15, pp. 575-584; 1959.

Electronic International, Paging System Broadcasts Nationwide on FM Radio Channel, Jan. 4, 1979.

Enrico Del Re, An Integrated Satellite-Cellular Land Mobile System for Europe, University of Florence, Department of Electronics Engineering, Italy, Sep. 21, 1989.

Enrico Del Re, An Integrted Satellite-Cellular Land Mobile System for Europe, University of Florence, Department of Electronics Engineering, Italy, Sep. 21, 1989.

Erwin Kreyszig, Advanced Engineering Mathematics; (John Wiley & Sons 1979; Section 4.7, pp. 186-1 go).

Erwin Kreyszig, Advanced Engineering Mathematics; (John Wiley & Sons, 1979; Section 4.7, pp. 186-1 go).

ETSI, Recommendation GSM 04.08-Mobile Radio Interface Layer 3 Specification, Apr. 15, 1989, pp. 41-45, 192, 193 & 208.

European Patent Office Search Report.

European Search Report EP 92 30 6071 dated Jul. 28, 1993.

European Search Report for application No. EP89305373.

European Search Report.

Experience Gathered During the Development, and Operation, of a Nationwide Mobile Digital Communications System; Rudiger C. Lodde; 32nd IEEE Vehicular Technology Conference; May 1982; pp. 384-391.

F. Baumgartner et al., Code Division Multiple Access, IEEE Communications Magazine (Feb. 1990), pp. 26-32.

F. W: Sarles, Jr. et al., The Lincoln Expertimental Satellites Les 8 and 9, IEEE Eascon-77, Arlington, VA., Sep. 26-28, 1977, pp. 221 .?A-21 .1 U.

Greenspan, R. L., A.Y. Ng, J. M. Przyjemski, & J. D. Veale, Accuracy of Relative Positioning by Interferometry with Reconstructed Carrier GPS: Experimental Results, Proceedings of the Third International Geodetic Symposium on Satellite Doppler.

Group W Satellite Communications, Westinghouse Broadcasting Co., Inc , 7609 Sat-A-Dat Decoder/Controller (2 pp.).

Group W. Satellite Communications, Westinghouse Broadcasting Co., Inc., 7609 Sat-A-Dat Decoder/Controller (2 pp.).

H. Alavi et al., Downstream Power Control for a Spread Spectrum Cellular Mobile Radio Sytem, IEEE Global Telecommunications Conference Globecom '82 Record, (Miami, Fla., Nov. 29-Dec. 2, 1982), vol. 1, pp. A3.5.1-A3.5.5.

H. Blasbalg, A Comparison of Pseudo—Noise and Conventional Modulation for Multiple—Access Satellite Communications, IBM Journal, Jul. 1965, pp. 241-255.

H. J. Kochevar, Spread Spectrum Multiple Access Communications Experiment Through a Satellite, IEEE Transactions on Communications, vol. COM-25, No. 8, A u ~1.9 77, pp. 853-855.

Unwanted Calls? Turn on Pager Phone, USA Today, Dec. 28, 1990, p. 88.

User Equipment for the NAVSTAR Global Positioning System, Jacobson, National Telecommunications Conference, Conf. Record, vol. 3, pp. 41.4-1 to 41.4-5, Nov. 1, 1976.

VSAT Networks—An Overview, Maggenti, et al., Int. Journal of Satellite Communications, vol. 5, pp. 219-225, Jan. 1, 1987.

Wide Bandwidth Communications L. S. Schwatz SpaceIAeronautics, Dec. 1963. A L. McBride, Scientific-Atlanta's 3-Meter Digital Audio Terminal, Oct. 1980 (7 pages).

A Motorola publication entitled AnIPRC-112 Multi-Mission Transceiver, published by Motorola, Inc., Communications Division, Copyright 1991..A. E. E. Rogers, C. A. Knight, H. F. Hinteregger, A. R. Whitney, C. C. Counselman III, 1. I. Shapiro, S. A. Gourevitch and T. A. Clark, Geodesy by Radio Interferometry: Determination of a 1.24-km Base Line Vector with 5-mm Repeatability, J.

Aaron Weinberg et al., A Novel Concept for a Satellite—Based Maritime Search and Rescue Systems, IEEE Journal of Oceanic Engineering, vol. OE-2, No. 3, Jul. 1977, pp. 274-285.

Adams, W. S. et al., Circular Polar Constellations Providing Continuous Single or Multiple Coverage Above a Specified Latitude, The Journal.

Adams, W. S. et al., Circular Polar Constellations Providing Continuous Single or Multiple Coverage Above a Specified Latitude, The Journal of the Astronautical Sciences, vol. 35, No. 2, pp. 155-1 92 (1987).

Advanced Mobile Phone System; Instruction Manual No. 68P81039E25-A; Motorola, Inc. 1979; pp. ii, 1-5.

Advertising Flier for Motorola, PMR 2000, Copyright 1986.

Advertising Pamphlet for Motorola, Alphamate Message Entry Device, Copyright 1987.

Agaral New Recursive Digital Filter Structure Having Very Low Sensitivity and Round Noise, IEEE Transaction on Circuits and Systems, vol. CAS-27, No. 12, Dec. 1975.

Alan E. E. Rogers, Broad-Band Passive 90.degree. RC Hybrid with Low Component Sensitivity for Use in the Video Range of Frequencies, Proceedings of the IEEE, vol. 59, 1971, pp. 1617-1618.

Alan E. E. Rogers, Broad-Band Passive 90.degree. RC Hybrid with Low Component Sensivity for Use in the Video Range of Frequencies, Proceedings of the IEEE, vol. 59, 1971, pp. 1617-1618.

Alexander E. Braun, The GPS Promise Approaches Fulfillment, Journal of Electronic Defense, Nov. 1989, vol. 12, p. 52.

Alfred Leick, GPS Satellite Surveying, John Wiley & Sons, Inc. New York 1990.

American Astronautical Society Publication, Advances in the Astronautical Sciences, vol. 9 (1961).

American Online, Commissions Launches Investigations into Global Mobile Satellite Systems, European Commission Press Release. American Online, Business Wire.

An article entitled Analytic Design of Satellite Constellations for Zonal Earth Coverage using Inclined Circular Orbits by L. Rider, The.

An article entitled Circular Polar Constellations Providing Continuous Single or Multiple Coverage Above a Specified Latitude by W. S. Adams and L. Rider, The Journal of the Astronautical Sciences, vol. 35, No. 2, Apr.-Jun. 1987, pp.

An article entitled Combat Rescue. One Pass is All You Get. With PLS, One Pass is All You Need. PLS (Personnel Locator System), published.

An article entitled Packet Switching for Mobile Earth Stations Via Low-Orbit Satellite Network by Kenneth Brayer, Sr. Member IEEE, Proceedings of the IEEE, Nov. 1984, No. 11, New York, USA.

Anderson et al, Satellite-Aided Mobile Telephone System, Proc. of the Nat. Electr. Conf, vol. 33 (1979), pp. 432-437.

Andrew J. Viterbi, A Processing Satellite Transponder for Multiple Access by Low-Rate Mobile Users, Fourth International Conference on Digital Satellite Communications, Montreal, Canada, Oct. 23-25, 1978, pp. 166-174.

Andrew J. Viterbi, Spread Spectrum Communications—Myths and Realities, IEEE Communications Magazine, vol. 17, No. 3, May 1979, pp. 11-18.

Application of Ellipsat Corp. to FCC. Nov. 2, 1990.

Application of Motorola Satellite Communications, Inc. For Iridium a Low Earth Orbit Mobile Satellite System before the FCC, Washington, D.C. Dec. 1990, pp. 49-96.

Application of TRW Inc. for Authority to Construct a New Communications Satellite System Outset before the ECC, Washington, D.C. 20554, May 31, 1991 pp. 33-51.

Arthur Stephenson Digitizing Multiples RF Signals Requires an Optimum Sampling Rate, Electronics, Mar. 27, 1972, pp. 106-110.

Article (newspaper and date unknown), Firms Help in Fight Against Carjacking.

Article entitled, Principle of Operation of NAVSTAR and System Characteristics, Milliken et al, Global Positioning System by the Institute.

Article from Fishing Boat Magazine, No. 273, Feb. 1988, Fishing Boat Association.

Kuisma, Erkki, Performance Analysis of a Digital Mobile Radio System Based on Narrow Band TDMA, Second Nordic Seminar on Digital Land Mobile Radio Communication I, (DMR II) (Oct. 14-16, 1986) pp. 115-118.

L. Harold Spradley, Developing Petroleum Maps for the Future.

L. J. Milosevic, Integrated Navigation, Traffic Control, Collision Avoidance and Communication System, SINTAC-C2, pp. 253-268.

Lang, Thomas J. et al., Orbital Constellations Which Minimize Revisit Time, AAS 83-402, pp. 1076-1086 (1991).

Lang, Thomas J. et al., Orbital Constellations Which Minimize Revist Time, AAS 83-402, pp. 1070-1086 (1991).

Lang, Thomas J., Symmetric Circular Orbit Satellite Constellations for Continuous Global Coverage, AAS 87-499, pp. 11 11-1 132 (1991).

Leon J. Ricardi, Some Factors that Influence EHF Satcom Systems, EASCPN '79; Electronics and Aerospace Systems Conference, Arlington, Va., Oct. 9-11, 1979, pp. 617-622.

Leonard Jacobson, User Equipment for the Navstar Global Positioning System, pp. 41.4-1 to 41.4-5.

Leuenberger, Kurt J., Digital Radio Systems Examined—Part I, General State of the Art, Microwave Systems News and Communications Technology, vol. 16, No. 1, (Jan. 1986), pp. 81-92.

Lexis Nexis Patent Searches 1-3.

Lindenmeier et al Preiswert and reaktionsschnell, Funkschau, 26, (1986), pp. 42-45.

Lindenmeier et al, Leistungsfahigkeit von Mehrantennen-Diversity for den UKW-Rundfunk im Auto, Rundfunktechnische Mitteilungen, No. 5 (1987) pp. 221-228.

Livre de J. Peres et al., Les Systemes de Telecommunication par Satellite, Editions Masson, pp. 78-1 11. A.

Long Range Trackings of Crocodylus Porosus, M. J. Yerby, Handbook on Biotelemetry and Radio Tracking, 1979, pp. 765-776.

Lovell et al, An Experiment to Enable Commercial Mobile Satellite Service, Conference Record, Nat. Telesystems Conf, Nov. 1982, pp. 81.3.1-81.3.5.

Lovell, Knouse, Weber, an Experiment to Enable Commercial Mobile Satellite Service, The National Telesystems Conference.

Luck, D. G. C., System Organization for General Communication Via Medium Altitude Satellites, RCA Review, pp. 293-324 (1963).

M K. Simon, J. K. Omura, R. A. Scholtz & B. K. Levitt, Spread Spectrum Communications, vol. 1, pp. 1-39, Rockville, Md.: Computer Science.

M. K. Simon, J. K. Omura, R. A. Scholtz & B. K. Levitt, Spread Spectrum Communications, vol. 3, pp. 346-407, Rockville, Md.: Computer Science Press, 1985.

M. K. Simon, Spread Spectrum Communications, Computer Science Press (1985), vol. 1, pp. v-xvi, vol. 3, pp. 346-407.

M. Kauehrad & P. J. McLane, Spread Spectrum for Indoor Digital Radio, IEEE Commun. Mag. vol. 25, No. 6, pp. 32-40 Jun. 1987.

M. Kavehrad & G. E. Bodeep, Design and Experimental Results for a Direct-Sequence Spread-Spectrum Radio Using Differential Phase-Shift Keying.

Modulation for Indoor, Wireless Communications, IEEE Trans. Commun., SAC-5, No. 5, pp. 815-823, Jun.

M. Kavehrad and D. J. McLane, Spread Spectrum for Indoor Digital Radio, IEEE Commun. Mag., vol. 25, No. 6, pp. 32-40, Jun. 1987.

M. Kavehrad and G. E. Bodeep, Design and Experimental Results for a Direct-Sequence Spread-Spectrum Radio Using Differential Phase-Shift Keying Modulation for Indoor, Wireless Communications, IEEE Trans. Commun., SAC-5, No. 5, pp. 815-823, Jun.

M. Kavehrad, Performance of Nondiversity Receivers for Spread Spectrum in Indoor Wireless Communications, AT&T Technical J., vol. 64, No. 6, pp. 1181-1210, Jul.-Aug. 1985.

M. Kihara, Performance Aspects of Reference Clock Distribution for Evolving Digital Networks, IEEE Communications Magazine, Apr. 1989.

M. Kihira, Performance Aspects of Reference Clock Distribution for Revolving Digital Networks, IEEE Comm. Magazine, Apr. 1989, pp. 24-34.

M. L. Meeks, Editor, Methods of Experimental Physics, vol. 12 (Astrophysics), Part C (Radio Observations), 1976, pp. v-ix and as follows; Chapter 5.3 J.

M. Moran, Very Long Baseline Interferometer Systems, pp. 174-197. Chapter 5.5: J. M. Moran.

M. L. Meeks, Editor, Methods of Experimental Physics, vol. 12, (Astrophysics), Part C (Radio Observations), 1976, pp. v-ix and as follows: Chapter 5.3: J.

M. Moran, Very Long Baseline Interferometer Systems, pp. 174-197, Chapter 5.5: J. M. Moran.

BPR-2000, Display Radio Pager; Sales Brochure No. RB-05-05, Motorola Inc., 1983.

Multiple-Access Communications for Computer Nets, Schwartz, et al., Ch. 8 of Computer-Communication Networks, Prentice-Hall, Jan. 1, 1973.

Navigation Systems Using gps for Vehicles, by T. Itoh, et al., Technical Paper Series 861360, Society of Automotive Engineers, 1986.

NAVSTAR Global Positioning System (GPS), Parkinson, National Telecommunications Conference, Dallas, Conf. Rec. vol. 3, pp. 41.1-1 to 41.1-5, Nov. 29, 1976.

New Capabilities of the Definity Generic 2 Switch, Definity.TM. 75/85 Communications System, Generic 2, Issue 1, (Feb. 1989), AT&T Information Systems, Doc. #555-104-401, pp. 2-6 to 2-15.

New Radio Steals its Power from the Air, Popular Science, Apr. 1958, pp. 108-109.

New Sidelobe Envelopes for Small Aperture Earth Stations, Janky et al., IEEE Trans. On Broadcasting, vol. BC-22, No. 2, pp. 39-44, Jun. 1, 1976.

Nonlinear Estimation of PSK-Modulated Carrier Phase with Application to Burst Digital Transmission, Andrew J. Viterbi and Audrey M. Viterbi, IEEE Transactions on Information Theory, vol. IT-29, No. 4, (Jul. 1983), pp. 543-551.

On Board Computer System for Navigation, Orientation, and Route Optimization, by P. Haeussermann, Technical Paper Series 840483, Society of Automotive Engineers, 1984.

On the Capacity of a Cullular CDMA System, Klien Gilhousen, Irwin M. Jacobs, Roberto Padovani, Andrew Biterbi, Lindsay Weaver, Charles Wheately, IEEE Transactions on Vehicular Technology, vol. 40, No. 2 (May 1991), pp. 303-312.

On the System Design Aspects of Code Division Multiple Access (CDMA) Applied to Digital Cellular and Personal Communication Networks, Allen.

Operating Manual ST1 Model 5010 GPS Receiver, Stanford Telecommunications Inc. STI-O&M-8/0/B, Feb. 25, 1980, selected pages as follows: Title p., i vi, 1-1, 1-3, 2-1 through 2-5, 3-1 through 3-3, 6-1 through 6-9.

Charles R. Cahn, Spread Spectrum Applications and State-of-the-Art Equipments, pp. 5-6.

Chilly et al, Communication Receivers of Future, Journal Nov./Dec. 1975, pp. 16-21.

Chih-Kang Chen, W. Gardner; Signal-Selective Time-Difference-of-Arrival Estimation for Passive Location of Man-Made Signal Sources in Highly Corruptive Environments, Pt. II: Algorithms and Performance; May 1992; IEEE Transactions on Signal.

Clare, L. P. et al., Multiple Satellite Networks: Performance Evaluation Via Simulation, Milcom, vol. 2, No. 20, pp. 404-411 (1987).

Cline, J. K. et al., Quasicircular Ground Tracks for Geosynchronous Earth Satellites, J. Spacecraft, vol. 23, No. 2, pp. 144-148 (1986).

Cline, J. K. et al., Quasicircular Ground Tracks for Geosynchronous Earth Satellites,O J. Spacecraft, vol. 23, No. 2, pp. 144-148 (1986).

Colormax Electronic Corp., Colormax-Cable Captioning-16,000,000 Subs NEED IT! (3 pp.).

Colormax Electronic Corp., Colormax-Cable Captioning-16,000,000 Subs Need it!(3 pp.).

Commentary: ISDN Concept of Next Generation, Nikkei Electronics, No. 438, Jan. 11, 1989, pp. 121-137.

Comparison of Mobile Radio Transmission at 150, 450, 900 & 3700 Mc, W. Rae Young, Jr., In the Bell Systems Technical Journal, vol. 32, Nov. 1952, pp. 1068-1085.

Computer Network and Distributed Processing; James Martin; 1981; pp. 341 thru 343, 418 thru 421,431.

Counselman and Gourevitch, Miniature Interferometer Terminals for Earth Surveying: Ambiguity and Multipath With Global Positioning System, IEEE Transactions on Geoscience and Remote Sensing, vol. GE-19, No. 4, Oct. 1981, pp. 244-252.

Counselman and Gourevitch, Miniature Interferometer Terminals for Earth Surveying: Ambiguity and Multipath with Global Positioning Systems, IEEE Transactions on Geoscience and Remote Sensing, vol. GE-19, No. 4, Oct. 1981, pp. 244-252.

Counselman and Shapiro, Miniature Interferometer Terminals for Earth Surveying, Bulletin Geodesique, vol, 53, 1979, pp. 139-163.

Counselman and Shapiro, Miniature Interferometer Terminals for Earth Surveying, Bulletin Geodesique, vol. 53, 1979, pp. 139-163.

Counselman and Shapiro, Miniature Interferometer Terminals for Earth Surveying, Proceedings of the 9th GEOP Conference, an International Symposium on the Applications of Geodesy to Geodynamics, Oct. 2-5, 1978, Dept. of Geodetic Science Report No.

Counselman III, C. C. and I. I. Shapiro, Miniature Interferometer Terminals for Earth Surveying, Proc. of the 2nd Int'l. Geodetic Symp. on Satellite Doppler Positioning, vol. 2, pp. 1237-1286, 1979 (avail. from Appl. Res. Lab., Univ. of Texas.

Counselman III, C. C., D. H. Steinbrecher, The Macrometer.TM.: A Compact Radio Interferometry Terminal for Geodesy with GPS', Proceedings of the Third International Geodetic Symposium on Satellite Doppler Positioning, pp. 1165-1172, Feb. 8-12.

Counselman, Gourevitch, King, Herring, Shapiro, Greenspan, Rogers, Whitney and Cappallo, Accuracy of Baseline Determinations by Mites Assessed by Comparison with Tape, Theodolite, and Geodimeter Measurements, EOS, The Transactions of the American.

Counselman, Gourevitch, King, Herring, Shapiro, Greenspan, Rogers, Whitney and Cappallo, Accuracy of Baseline Determinations by Mites Assessed by Comparison with Tapes, Theodolite, and Geodimeter Measurements, EOS, The Transactions of the American.

Counselman, III, Charles C., Radio Astrometry, Annual Reviews of Astrometry and Astrophysics, vol. 14, 1976, pp. 197-214.

Dixon, Robert C., Spread Spectrum Systems 2nd Ed., John Wiley & Sons, New York, N.Y., 1984, chapters 1, 2 and 6.

Document entitled Teletext Acquisition and Control Circuit, Jun. 1980 (16 pp.).

Document entitled Teletext Timing Chain Circuit, Aug. 1978 (9 pp.).

Document entitled Teletext Video Processor, Dec. 1979 (9 pp.).

Dondl, Peter, Digital Network Oriented Mobile Radio Satellite System as an Integrated Part of the GSM Cellular Radio System in Europe.

Dondl, Peter, Digital Network Oriented Mobile Radio Satellite System as an Integrated Part of the GSM Radio System in Europe.

Donov, A High-Speed Random-Number Generator, Radio Electronics and Communication System, vol. 25, No. 4, pp. 88-90, 1982.

Draim, J. E. et al., Satellite Constellation for Optimal Northern Hemispere Coverage, Presentation at Ninth DARPA Strategic Space Symposium (1983).

Draim, J. E. et al., Satellite Constellations for Optimal Northern Hemisphere Coverage, Presentation at Ninth DARPA Strategic Space Symposium (1983).

Draim, J. E., A Common Period Four-Satellite Continuous Global Coverage Constellation, AIAA, pp. 1-9 (1986).

Draim, J. E., Three- and Four-Satellite Continuous-Coverage Constellations, AIM, AIAAIMS Astrodynamics Conference (1984).

Walker, Circular Orbit Patterns; "Providing continuous Whole Earth Coverage", Royal Aircraft Establishment Tech rep 7021 Nov. 1, 1970.

Walker, J. G., "Continuous Whole-Earth Coverage by Circular-Orbit Satellite Patterns," Technical Report 77044, Defense Technical Information Center (1977).

Walker, J. G., "Coverage Predictions and Selection Criteria for Satellite Constellations," Technical Report 821 16, Royal Aircraft Establishment (1982).

Walker, J. G., "Satellite Patterns for Continuous Multiple Whole-Earth Coverage," Royal Aircraft Establishment, pp. 119-122 (1977).

Walker, J. G., "Some Circular Orbit Patterns for Whole Earth Coverage," Technical Memo 149, Royal Aircraft Establishment (1970).

Walter R. Braun and William C. Lindsey, "Carrier Synchronization Techniques for Unbalanced QPSK Signals—Part 11", IEEE Transactions on Communications, vol. Com-26, No. 9, Sep. 1978, pp. 1334-1341.

Ward, Phil, "An Advanced Navstar GPS Geodetic Receiver", Proceedings of the Third International Geodetic Symposium on Satellite Doppler Positioning, vol. 2, pp. 1123-1142, Feb. 8-12, 1982.

Weaver, C. C F. et al. "The Implementation of Adaptive Decision Feedback Equalization of Multipath Distortion in Microwave Radio", IEEE GlobalCommunications Conference, pp. 1548-1552.

Wegener Communications, Inc., "Asynchronous Data Transmission System-Series 2100 Vidata" (2 pp.).

Weigel and Ratigan, "Using the Satellite Medium" Telecommunications, Oct. 1991.

Wesley Iversen, "Digital hf Radio Breaches Military Solid Analog Wall", Electronics, Jun. 28, 1984.

Westinghouse (Baltimore, Md.) "Vehicle Managemerit Systems", product catalogue, undated, 4 pages.

Wide Area Differential GPS, Changdon Kee, Bradford W. Parkinson; Navigation: Journal of the Institute of Navigation, vol. 38, No. 2, Summer 1991.

Wideband Antennas and Control Systems, Catalog 198411 985, pp. 52-55, 68, 69.

Wilbur L. Pritchard, Henri G. Suyderhoud, and Robert A. Nelson, "Satellite Transponders", Satellite Communication Systems Engineering, Prentice Hall (2d ed. 1993), pp. 400-402.

Y. Birk et al., "Code-Assignment Policies for Multi-Receiver Nodes in CDMA Packet Radio Networks", Proceedings of IEEE Infocom '86, (Sheraton BatHarbour, Miami, Fla., Apr. 8-10, 1986), pp. 415-423.

Yiu et al, "A Low Cost GPS Receiver for Land Navigation", Journal of the Institute of Navigation, Fall, 1982.

Yu-Shuan Yeh, D. Reudink; "Efficient Spectrum Utilization for Mobile Radio Systems Using Space Diversity;" Mar. 1982; IEEE Trafisactions on Communications vol. COM-30 No. 3.

Zenith Radio Corporation, "VIRTEXT" (7 pp.).

Zenith Radio Corporation, "Virtext.RTM." (7 pp.).

R. A. Scholtz, The Origins of Spread-Spectrum Communications, IEEE Trans. Commun. COM-30, No. 5, pp. 822-854, May 1982.

R. C. Dixon, Spread Spectrum Systems, John Wiley & Sons, 1976, pp. 6-7, 128-131, 138-145, 177, 205-209, 265-272, 276-277, 283-285.
R. DeSadaba, Personal Communications in the Intelligent Network, British Telecommunications Engineering, vol. 9, Aug. 1990, pp. 80-83.
R. F. Ormondroyd et al., Spread Spectrum Communication Systems for the Land Mobile Service, The School of Electrical Engineering University of Bath, pp. 273-287.
R. J. Anderle, Application of the NAVSTAR GPS Geodetic Receiver to Geodesy and Geophysics, Naval Surface Weapons Center Tech. Rept. No. 80-282, 27 pp. 1980.
R. L. Greenspan, A. Y. Ng, J. M. Przyjemski, & J. D. Veale, Accuracy of Relative Positioning by Interferometry with Reconstructed Carrier GPS: Experimental Results, Proceedings of the Third International Geodetic Symposium on Satellite Doppler.
R. L. Pickholtz, D. L. Schilling & L. B. Milstein Theory of Spread-Spectrum Communications-A Tutorial, IEEE Trans Commun., COM-30, No. 5, pp. 855-884, May 1982.
R. Price, Further Notes and Anecdotes on Spread-Spectrum Origins, IEEE Trans. Commun., COM-31, No. 1, pp. 85-97, Jan. 1983.
R. S. Padgett et al., Microprocessor—Controlled Spread—Spectrum Demodulation, Eascon '76, Sep. 26-29, 1976, pp. 58A-58G.
R. Vaughan; On Optimum Combining at the Mobile; Nov. 1988; IEEE Transactions on Vehicular Technology vol. 37, No. 4.
Radio Shack, 1988 Catalog, pp. 63 and 115.
Revue Technique Thompson-CFS by J. Lautier, entitled Reseau de radiocommunication numerique en Duplex Temporel (.sup.l), vol. 10, No. 3, dated.
Rider Analytic Design of Satellite Constellations . . . Journal of the Astronautical Sciences, vol. 3, No. 1, pp. 31, 52: Jan. 1986.
Rikki T. Lee, Radio Resourse, Keeping Track of AVL Technology, Jan./Feb. 1993.
Ritter, Stephen and McCoy, Jan, Automatic Vehicle Location—An Overview in IEEE Transactions on Vehicular Technology, vol. VT-26, No. 1, Feb.
Roald Steen, GPS-based Vehicle Location Boosts Productivity, Safety, Mobile Radio Technology, Aug. 1993, pp. 10, 12, 14, 16, 18, 20 and 22.
Robert A. Lovell, George H. Knouse, and William J. \Neber, An Experiment to Enable Commercial Mobile Satellite Service, IEEE National Telesystems Conference, Nov. 7-10, 1982, pp. B1.3.1-B1.3.5.
Robert P. Denaro, NAVSTAR Global Positioning System Offers Unprecedented Navigational Accuracy, Microwave Systems News, Nov. 1984, pp. 54, 58-59, 62, 65, 67-68, 70, 75-78, 83.
Robert S. Lawton et al., A Family of SHF Tactical Satellite Communication Ground Terminals, IEEE Transactions on Aerospace and Electronic Systems,vol. AES-6, No. 2, Mar. 1970, pp. 137-146.
Rockwell International, Collins Government Avionics Division, Feasibility Concept for a Translocation Survey GPS Receiver Design, Report No. 523-0771 152-001 11 R, final report prepared for the Department of Commerce, National Geodetic Survey, under.
Ron L. Hatch, The Synergism of GPS Code and Carrier Measurements, Proceedings of the Third International Geodetic Symposium on Satellite Doppler Positioning, pp. 1213-1231, Feb. 8-12, 1982.
Rudolph M. Kalafus et al, Recommendations of Special Committee 104 Differential NaystarlGPS Service, Feb. 20, 1985.
Schuchman Dither Signals and Their Effect on Quantization Noise, IEEE Transactions on Communication Technology, pp. 162-165, Dec. 1964.
Scientific-Atlanta, Inc., A Design Plan for: Digital Audio System, Feb. 1982.
Scientific-Atlanta, Inc., Satellite Distributed Digital Audio for Network Radio, Apr. 1982.
Seki et al., Detachable Unit Service in 800 MHz Band Cellular Radiotelephone System, IEEE Communications, Feb. 1986, vol. 24, No. 2, pp.
Service Manual for Grundig TV Receiver CUC 2400.
Seth Malgieri, RCR, Networks Licensed to Offer Vehicle Location, Mobile Data, Sep. 27, 1993.
Shuzo Kato, Shingo Ohmori and Yutaka Yasuda, Current and Future Mobile Satellite Communication Systems, IEICE Transactions, vol. E 74, No. 8,Aug. 1991, pp. 2201-2210.
Signetics Corp., Philips I. C. Product Line Summary, May 1981 , (pp. 1, 15 and 16).
Signetics Corp., Philips I.C. Product Line Summary, May 1981. (pp. 1, 15 and 16). Simon and Smith, Offset Quadrature Communications with Decision Feedback Carrier Synchronization, IEEE Transactions on Communications, vol. COM-22, No. 10, Oct. 1974, pp. 1576-1584.
Sklar, B., Digital Communications, (Prentice Hall 1988). p. 232.
Sklar, Bernard, Digital Communications: Fundamentals and Applications, Prentice Hall, Englewood Cliffs, N.J., 1988, Chapters 5 and 6, pp. 245-380.
Smith, William W., "Passive Location of Mobile Cellular Telephone Terminals," IEEE, 1991, pp. 221-225.
Space Handbook, "Satellite Ground Tracks," Air University, pp. 2-38 to 2-46.
Specification of the Radio Data System RDS for VHFIFM Sound Broadcasting, European Broadcasting Union, Tech. 3244-E, Mar. 1984, pp. 1-60.
Spilker, GPS Signal Structure and Performance Characteristics:, pp. 29-54.
Spilker, Jr.; J. J., "GPS Signal Structure and Performance Characteristics", Navigation, vol. 25, No. 2, 1978, pp. 121-146.
Spilker, Jr.; J. J., GPS Signal Structure and Performance Characteristics, Navigation, Jnl. of the Inst. of Navigation, vol. 25, No. 2, Summer 1978, pp. 121-146.
Steven Ritter and J. McCoy, "Automatic Vehicle Location-An Overview", IEEE Trans. on Veh. Tec., vol. VT-26, No. 1, Feb. 1977, pp. 7-9.
Steven Salamoff et al., Dynac: A Low-Cost DatalVoice Communications Network, pp. 166-169.
Stjernvall, Jan-Erik et al., "Performance of an Experimental FDrTDMA Digital Radio System", Second Nordic Seminar on Digital Land Mobile.
Radio communications, (DMR II), pp. 107-109.
STS Avionic Products Brochure, .COPYRGT. 1987.
SU 832506.
Supplementary European Search Report EP 91 90 8014, Nov. 9, 1992.
Swerup, Jan et al., "Digital Cellular", Personal Communications Technology, (May 1986), pp. 6-12.
Sync (catalog), pp. 2 and 3, Advertisement Titled "Now You Can Beat the Contestants on TVs Most Popular Game Show" 1988.
Systems Network Architecture—Concepts and Products; IBM; pp. 2-9 thru 2-1 1, 2-13 thru 2-19, 2-21 thru 2-25, 4-1 thru 4-5, A-1.
Systems Network Architecture—Technical Overview; IBM; 1982; pp. 4-13 thru 4-16.
T. Freygard, "Feasibility of International Transport Communications System", IEEE International Conference on Communications, IEEE Catalog No. 82CH1766-5, Conference Record, vol. 3 of 3, (1982) pp. 7H.4.1-7H.4.6.
T. H. Murray "The Evolution of DDS Networks: Part I", Telecommunications, Feb. 1989, pp. 39-47.
T. P. Yunck, An Introduction to Series-X, Jet Propulsion Laboratory, California Institute of Technology, NASA Contract NAS 7-1000, Nov. 1982.
Tares, et al., "Systems for Telecommunications by Satellite", 1978, pp. 78-79, (including translation from French to English).
Telcommunications and Radio Engineering, Part 2, Radio Engineering, vol. 33, No. 4 (1978); "The Future of Satellite Systems Development", Ainbinder et al; pp. 44-54.
Telocator Bulletin, News and Analysis for the Mobile Communications Industry, vol. 91, No. 3, Jun. 25, 1991.
Terrapin Corporation Paper (13 pages) Jan. 1993.
Terry L. Lyon, "How to Build Free-Power Radios", Popular Electronics, Oct. 1973, pp. 62-64.
The Control of Foreign Microprocessors by C. R. Drane, Proceedings of Digital Equipment Users Society, Jul. 1984.
The promotional brochure titled "Hawk 3000 from Trackmobile, Inc." contains a further discussion of the vehicle locating system disclosed in U.S. Pat. No. 4,891,650.

The Radio and Electronic Engineer, vol. 37, No. 2, Feb. 1969, Shaw, pp. 117-129.
Tierney "A Digital Frequency Synthesizer", IEEE Transaction on Audio and Ectroacoustics, vol. AU-19, No. 1.
Timo Allison et al, "A Geodetic Survey Receiver With Up to 12 L1 CIA Code Channels and 12 L2 Pseudo-P-Code Channels", presented at Third.
T-Net Related Inventions Summary of Patent Search, Louis Martinez, Oct. 8, 1986.. p. 31.
Exhibit A to Sprint Nextel Corp.'s Responses to Enovsys' Interrogatories (Nos. 1-5).
Tobagi, F. A Modeling and Performance Networks Proceedings of the IEEE, vol. 75, No. 1, pp. 135-155.
Tong et al., Wide Angle Limited Scan Array Antenna Technique Study, NTIS AD 780048, May 1974, pp. 1-6.
Trackmobile, Inc., updated Business Plan (as of Oct. 1, 1990) D. Sweeney, Stolen Vehicle Recovery, Cellular Business (Sep. 1990).
Trimble Navigation (Sunnyvale, Calif.,), "StarFinder GPS Intelligent Mobile Sensor", 1991, 2 pages.
Trimble Navigation, "Fleetvision Integrated Fleet Management System", undated, 9 pages.
Communications Satellite Developments: Systemsu-pp. 139-154, Gilbert E. Lavean et al., Progress in Astronautics and Aeronautics, vol. 41, Apr. 1974.
Communications Satellite Systems, Martin, Prentice Hall, Inc., pp. 142-147, 189, 358-359, 365-367, Jan. 1, 1978.
Communications, Jane's Spaceflight Directory, pp. 246-249.
Comparisons of Channel Assignment Strategies in Cellular Mobile Telephone Systems, M. Zhang, T. S. Yum, Proc. IEEE ICC'89, Jun. 1989, pp. 467-471.
Compatibility of Video and Data Signals . . . Channel, Gallois, et al., IEEE Trans. on Broadcasting, vol. BC-33, No. 3, pp. 70-76, Sep. 1, 1987.
Comsat Technical Review, vol. 8, No. 2, Forcina et al., Fall 1978, pp. 421-453, Sep. 1, 1978.
Cost-Effective Data Communications . . . Earth Stations, Parker, IEEE Journ. on Selected Areas in Communications, vol. SAC-3, No. 3, pp. 449-456, May 1, 1985.
Cryptology and the Origins of Spread Spectrum, Kahn, IEEE Spectrum, pp. 70-80, Sep. 1, 1984.
Current and Future Communication Satellite Technology, Morrow, Intern'l Astronautical Federation, 26th Congress, Lisbon, Sep. 21, 1975.
Customer Evaluation of Telephone Circuits with Delay, by George K. Helder, dated Jun. 9, 1966, pp. 1157-1191, The Bell System Technical Journal, Sep. 1966.
Data Encryption Standard, National Bureau of Standards, Federal Information Processing Standards Publication 46, Jan. 15, 1977.
Declaratory Order re Blanket Licensing of Earth Stations, FCC, FCC No. 3588, Apr. 9, 1986.
Defense Satellite Communications System, LaVean, Progress in Astronautics & Aeronautics, vol. 41, MIT Press, Jan. 1, 1975.
Digital Communications by Satellite, Spilker, Prentice Hall, Inc., pp. 190, 191, Jan. 1, 1977.
Digital Data Satellite Systems, Mcmanamon et al., International Conference on Communications, in Minneapolis, Jun. 17, 1974.
Digital Map Data Bases for Autonomous Vehicle Navigation Systems, by E. P. Neukirchner et al., IEEE Position and Location Symposium, pp. 320-324, 1986, IEEE 86CH2365-5.
Digital Map Dependent Functions of Automatic Vehicle Location Systems, by C. B. Harris et al., IEEE Position and Location Symposium,. pp. 79-87, 1988, IEEE CH2675-7.
Digital Maps on Compact Discs, by H. J. G. M. Benning, Technical Paper Series 860125, Society of Automobile Engineers, 1986.
Digital Network Oriented Mobile Radio Satellite System as an Integrated Part of GSM in Europe Peter Dondl; Federal Republic of Germany.
Digital Satellite Communications, Ha, Macmillan, 1986, Distributed by Howard W. Sam & Co.), pp. 11, 81, 529-562, Jan. 1, 1986.
DYNAC: A Low-Cost DataNoice Communications Network, Salamoff, et al., Telecommunications, pp. 71-76, Aug. 1, 1979.

Effects of Multipath Transmission on the Measured Propagation Delay of an FM Signal, IEEE Transactions on Vehicular Technology, vol. VT-18, No. 1 May 1969, pp. 44-52, by J. S. Engel.
Effects of Transmission Delay on Conversational Behavior on Echo-Free Telephone Circuits, by Paul T. Brady, dated Aug. 25, 1970, pp. 115-133, The Bell System Technical Journal, Jan. 1971.
Electro Gryo-Cator: New Inertial Navigation System for Use in Automobiles, by K. Tagami et al., Technical Paper Series 830659, Soc. of Automotive Engineers, 1983.
Electronically Steered Phased-Array Antenna for MSAT Fred Schmidt and Brian Cox, Ball Systems Group, Nov. 1988, pp. 41-43.
EMX Electronic Switching Equipment by Motorola.
Eva: An Electronic Traffic Pilot for Motorists, by O. Pilsak, Technical Papers Series 860346, Society of Automotive Engineers, 1986.
Evolution of Antenna Sidelobe Regulation, Uyttendaele, IEEE Transactions on Broadcasting, vol. BC-32, No. 4, pp. 85-88, Dec. 1, 1986.
Extending Low Cost Land Navigation Into Systems Information Distribution and Control, by S. K. Honey et al., IEEE Position and Locations Symposium, pp. 439-444, 1986, IEEE 86CH2365-5.
Extension of Satellite Services through Low Cost Earth Stations, Kiesling et al., AIAA 7th Satellite Communication Conference, Apr. 1, 1978.
Filter Center, Aviation Week & Space Technology, Aug. 12, 1985, p. 69.
Firm Unveils Cellular Bridge Infoworld by Jim Bartimo, Jul. 2, 1984, pp. 11-12.
Frequency Modulation Theory-Application to Microwave Links, Fagot et al., Pergamon Press, 1961, Jan. 1, 1961.
Front-to-Back Coupling Factor for Large Earth-Station Antennas, Wilkinson, Microwave Journal (U.S.A.), vol. 19, No. 7, pp. 47-49, Jul. 1, 1976.
General Purpose Packet Satellite Networks by Jacobs et al., pp. 1448-1467 Proc. of the IEEE, vol. 66, No. 11, Nov. 1978.
GPS ClearlAcquisition Code Spectral Properties, Holmes, National Telecommunications Conference, Conference Record vol. III, pp. 41.7-1 to 41.7-5.
High Capacity Mobile Telephone System Technical Report, (filed in F.C.C. Docket 18262), Dec. 1971, prepared by Bell Laboratories, pp. 3-13.
High-Capacity Mobile Telephone System Technical Report, Bell Laboratories, Dec. 1971, on file with the FCC.
Increased Capacity Using CDMA for Mobile Satellite Communication, K. Gilhousen et al., IEEE Journal on Selected Areas in Communications, vol. 8, No. 4, May 1990, pp. 503-514.
Information Transmission via Satellite, Herter et al., Springer-Verlag, pp. 36,37,44,57,58 62-71, Jan. 1, 1979.
Intelligent Telephone Washington Post; Jan. 14, 1993.
Intelstat V Standard 'C' Earth Station Performance Objectives Applied to a Possible Eastern United States Location, Eascon-77, Rec. of IEEE.
Interactive Networking with a Satellite, Olson et al., Data Communications, Apr. 1, 1986.
Iridium: Key to Worldwide Cellular Communications, Telecommunications, Oct. 1991, pp. 23-28.
H610, Focarice et al., Mar. 7, 1989, Cellular Pager.
Hatch, Ron L , The Synergism of GPS Code and Carrier Measurements, Proceedings of the Third International Geodetic Symposium on Satellite Doppler Positioning, pp. 1213-1231, Feb. 8-12, 1982.
Henson, Collierand Schneider, Geodetic Applications of the Texas Instruments TI 4100 GPS Navigator, Proceedings of the First International Symposium on Precise Positioning with the Global Positioning System—vol. 1, pp. 191-200, Apr. 15-19, 1985,.
Herman Blasbalg et al., Air-Ground, Groung—Air Communications Using Pseudo—Noise Through a Satellite, IEEE Transactions on Aerospace and Electronic Systems, vol. AES-4, No. 5, Sep. 1968, pp. 774-791.
Hewlett Packard Application Note No. 920 Harmonic Generation Using Stop Recovery Diodes and SRD Modules Hewlett Packard Microwave Semiconductor Division, Nov. 1968.
High Technology, Radio Pagers Expand Horizons, Mar. 1983, pp. 44-47.
Hitachi VT-S625 User Manual, pp. 18-19.

Huff, D. Cellular Networking: the Building of the Nationwide Cellular Network. Cellular Business (Aug. 1988).
1. I. Shapiro, Thoughts on Mighty Mites, Department of Earth and Planetary Sciences, Massachusetts Institute of Technology, memo to C. C. Counselman et al., 15 pp. Dec. 29, 1980.
IEEE 1983 National Telesystems Conference, Kiesling, pp. 315-320.
IEEE Transactions on Aerospace and Electronic Systems, vol. AESI 1, No. 1, pp. 2-15, Jan. 1975.
Inbound/Outbound Magazine, p. 70, Oct. 1989.
Instruction Manual for Motorola PMR 2000, Copyright 1987.
International Conference on Digital Satellite Communication, An Adaptive Multiple Access Satellite Communication System at.
International Conference on Communications, 1971, IEEE, McGregor et al., pp. 42-7 to 42-14.
International Conference on Communications, Jun. 10-14, 1979, Shimayama et al., pp. 16.3.1-16.3.8, FM SCPC System for Various Domestic Satellite Communications Earth Station.
International Conference on Communications, Jun. 14-16, 1971, Dunn, pp. 11-20 Toll-25 Telephony to Remote Communities in Canada Via Satellite.
International Conference on Communications, Jun. 14-16, 1976, Satoh et al., pp. 35-7 to 35-12, Maritime Satellite Communications Equipment of.
International Conference on Maritime and Aeronautical Satellite Communication and Navigation, Mar. 7-9, 1978. Hoskyns, pp. 52-56, Multiplexing, Multiple Access and Signalling in the Marots Maritime Mobile Satellite System.
International Telecommunications Union (ITU) Radio Regulations (1982) Appendix 30 of Annex 8 definition of beamwidth.
International Teletrac Systems, Have an Unfair Advantage Over Car Thieves, (advertising flyer), 1990, 3 pages.
International Teletrac Systems, How to Put Your Fleet on the Map, (advertising flyer), undated, 5 pages. 1R.E. Transactions on Aeronautical and Navigational Electronics, vol. Ane 3, No. 2, Jun. 1956, pp. 67-70.
Iridium—Miscellaneous materials related to public announcement Jun. 25, 1990 (Motorola, Inc.).
Irwin L. Lebow et al., Satellite Communications to Mobile Platfroms, Proceedings of the IEEE, vol. 59, No. 2, Feb. 1971, pp. 139-159.
Isberg Guided Radio Communication in Tunnels, Mines, Canyons and Buildings, Notice for Grid Calendar, May 15, 1979.
ITU Radio Regulations (1982), Part A, Chapter 1, Article 8, P60 definition of Earth Station.
J Winters; Optimum Combining in Digital Mobile Radio With Cochannel Interference; Aug. 1984; IEEE Transactions on Vehicular Technology vol.
J. J. Spilker, Dg~taCl ommunications by Satellite, (Prentice Hall, Englewood Cliffs, N.J.), pp. 303-310.
J. J. Spilker, Jr., GPS Signal Structure and Performance Characteristics, Navigation, vol. 25, No. 2, 1978, pp. 121-146.
J. J. Spilker, Jr., GPS Signal Structure and Performance Characteristics, Navigations, vol. 25, No. 2, 1978, pp. 121-146.
J. J. Spilker, Jr., Digital Communications by Satellite, Prentice-Hall, Englewood Cliffs, N.J., pp. 302-303, 1977.
J. J. Spilker, Jr., Digital Communications by Satellite, Prentice-Hall, Englewood Cliffs, N.J., pp. i and ii (title pages), vii-xi (Table of Contents), and 302-305 (BPSK Carrier Recovery), 1977.
Central Control Facility for a Satellite Communication System, Blasbalg, et al., IBM Tech. Disclosure Bulletin, vol. 10, No. 1, pp. 22-24, Jun. 1, 1967.
Characteristics and Applications of Multibeam Spacecraft Antennas, Progress in Astronautics & Aeronautics, vol. 33, pp. 503-531, Apr. 1972, W. G. Schmidt, et al.
Commercial U.S. Satellites, Bargellini, IEEE Spectrum, pp. 30-37, Oct. 1, 1979.
Communicating by Satellite, Laskin, Report of the 20th Century Fund Task Force of Intern'l Satellite Communications, Jan. 1, 1969.
Communication Satellite Processing Repeaters, Huang et al., Proc. IEEE, vol. 59, No. 2, 1971.
Communications Satellite . . . AMPA Experiment, Durrani et al., Journal of Spacecraft and Rockets, vol. 17, No. 1, pp. 15-19, Jan. 1, 1980.

Mark IV Terminal Final Report, Hughes Aircraft Report, Erdle, Apr. 1, 1965.
McGraw Hill Encyclopedia of Science and Technology, Encyclopedia, Jan. 1, 1977.
Memorandum Opinion and Order, FCC, FCC 84-487; 35150 CC Docket No. 81-704; Adopted: Oct. 17, 1984, Jan. 9, 1985.
Methods for Achieving High-Capacity Universal Service Satellites by Reudnink et al., pp. 8.2.1-8.2.6, NTC Conference Record, Birmingham, Ala., vol. 1, Dec. 3-6, 1978.
Methods of Radio Determination for Inmarsat, G. Frenkel, Mar. 1978, pp. 37-38, Maritime and Aeronautical Sattellite Communication and Navigation.
Micro Earth Stations As Personal Computer Accessories, Parker, Proceedings of the IEEE, vol. 72, No. 11, pp. 1526-1531, Nov. 1, 1984.
Microprocessor-Controlled Spread-Spectrum Demodulator, Padgett et al., EASCON '76, pp. 58A-58G, Jan. 1, 1976.
Military Satellite Communications, History and Status as of 1974, Vreeburg, National Aerospace Laboratory Report, Amsterdam, Dec. 3, 1974.
Modulation Techniques for Multiple Access to a Hard-Limiting Satellite Repeater, Schwartz, et al., Proceedings of the IEEE, vol. 54, No. 5, pp. 763-777, May 1, 1966.
Multiple Access to a Hard Limiting Communications Satellite Repeater, J. M. Aein, Spread Spectrum Techniques, Jan. 1, 1976.
Multiple-Access and Modulation Techniques in the Fixed Satellite Service, CCIR 708, CCIR Report 708 Recommendations and Reports of the CCIR, Jan. 1, 1978.
Operating Manual ST1 Model 5010 Gps Receiver, Stanford Telecommunications Inc., STI-0 & M-87076, Feb. 25, 1980, selected pp. as follows: Title page, i-iv, 1-1, 1-3, 2-1 through 2-5, 3-1 through 3-3, 6-1 through 6-9.
Optimum Satellite Home Receiving Antenna Size at C Band, Sion, IEEE Transactions on Broadcasting, vol. BC-33, No. 1, pp. 23-26, Mar. 1, 1987.
Personal Communication—Concept and Architecture—Takeshi, et al, pp. 1351-1357 1990 IEEE.
Personal Pocket Phones by John Free; Popular Science, Aug. 1990.
Personal Signaling, A New Telephone Servicew-Newton Monk, et al, in 1958 Ire Weston Convention Record, part 8, pp. 76-79, 82-83.
Pictorial Microwave Dictionary, Young, et al., Rider Publications, No. 188, pp. 10-1 1, Jan. 1, 1956.
Pioneer Venus Project, Differenced Long-Baseline Interferometry Experiment, Design Review Document, NASA Ames Research Center, Moffett Field, Calif., Jul. 1, 1977, 23 pp.
Pioneer Venus Project, Differenced Long-Baseline Interferometry Experiment, Design Reviews Document:, NASA Ames Research Center, Moffett Field, Jul. 1, 1977, 23 pages.
Portable Digital Radio Communications—An Approach to Tetherless Access, D. C. Cox, IEEE Communications Magazine, Jul. 1989, pp. 30-40, vol.
Portable Digital Radio Communications—An Approach to Tetherless Access, D. C. Cox, IEEE Communications Magazine, Jul. 1989, vol. 27, No. 7.
Proceedings of the IEEE, Apr. 1987 article entitled Universal Digital Portable Radio Communications, pp. 436-477.
Proposal for a GPS Geodetic Receiver, The Johns Hopkins University Applied Physics Laboratory, Apr. 1980.
Radio Position Measuring System by Nippon Denki K.K., Tsunetoshi Yano; Japanese Publication No. 55-103476 dated Jul. 8, 1980.
Radio Transmission into Buildings at 35 and 150 mc by L. P. Rice, In the Bell Systems Technical Journal, vol. 38, Jan. 1959, pp. 197-210.
Radio Wave Propagation and Antennas, An Introduction, Griffiths, Prentice-Hall, Inc., pp. 289-290, Jan. 1, 1987.
Radio determination Satellite Services and Standards, Rothblatt, Artech House, Norwood, MA, p. 36, Jan. 1, 1954.
Real Time, Billing World, Jul. Aug. 1995, pp. 39-40.
Reception via the Syncom . . . Parabolic Antenna, Leavitt, et al., U.S. Naval Research Lab. NRL Memo Report 1617, May 17, 1965.
RF Development for Mobile-Satellite Systems by W. Rafferty and K. Dessovky, MSN & CT, Nov. 1988; p. 28.

Roaming's Growth, Roscoe et al, pp. 48-57 Apr. 1989, Industry Research.
Satellite Capacity Allocation, Aein et al., Proceedings of the IEEE, vol. 65, No. 3, Mar. 1977, pp. 332-342.
Satellite Communication Systems Engineering, W. Pritchard et al., 1993 Prentice-Hall, Inc. p. 399-406.
Satellite Communication Systems Engineering, W. Pritchard et al., 1993 Prentice-Hall, Inc. pp. 399-406.
Satellite Communications Reference Data Handbook, Defense Communications Agency '84, pp. 4-24,-25;5-33,-35;6-64i7-46,-96, Aug. 1, 1984.
Satellite Communications Reference Data Handbook, Defense Communications Agency, pp. 1-10; 6-4,6-5;6-20;6-21;6-22;6-23, Jul. 1, 1972.
Satellite Communications to Mobile Platforms, Lebow et al., Proceedings of the IEEE, vol. 59, No. 2, Feb. 1, 1971.
Satellite Communications, Gagliardi, Lifetime Learning Publications, pp. 20-23, Jan. 1, 1984.
Satellite Micro Earth Stations—A Small Investment with Big Returns, Parker, Data Communications, pp. 97-104, Jan. 1, 1983.
P. F. MacDoran, Global Traffic Surveillance/Collision Avoidance System Using Series and GPS signals, National Aeronautics and Space Administration, New Technology Transmittal, NT Control No. NPO-15604, 10 pp., Apr. 23, 1981.
P. F. MacDoran, Navstar Global Positioning System (GPS) Adaptation to Transit Doppler Positioning Equipment, Jet Propulsion Laboratory Interoffice Memo 335-81-0228, 5 pp., Jul. 27, 1981.
P. F. MacDoran, Navstar Global Positioning System (GPS), Adaptation to Transit Doppler Posivoning Equipment National Aeronautics and Space Administration, New Technology Transmittal, NT Coritrol No. NPO-15791, 8 pp., Jul. 31, 1981.
P. F. MacDoran, Series Application to Emergency Locator Beacons, Jet Propulsion Laboratory Interoffice Memo 335-81-0428, 2 pp., Oct. 26, 1981. p. 26 Exhibit A to Sprint Nextel Corp.'s Responses to Enovsys' Interrogatories (Nos. 1-5).
P. F. MacDoran, Series-GPS Applications to Air Traffic SurveillancelCollision Avoidance, Jet Propulsion Laboratory Interoffice Memo 335-81-0048, 5 pp., Mar. 12, 1981.
P. L. Bender, A Proposal to the National Aeronautics and Space Administration for the Support of GPS Satellite Orbit Determination Using the Reconstructed Carrier Phase Method for Tracking, Quantum Physics Division, National Bureau of Standard.
P. L. Bender, A Proposal to the National Aeronautics and Space Administration for the Support of GPS Satellite Orbit Determination Using the Reconstructed Carrier Phase Method for Tracking, Quantum Physics Division, National Bureau of Standards.
P. S. Henry, B. S. Glance; A New Approach to High-Capacity Digital Mobile Radio; Oct. 1981; The Bell System Technical Journal, vol. 60, No. 8.
Parker, Satellite Micro Earth Stations—A Small Investment with Big Returns, Data Communications, vol. 12 (1983) No. 1, pp. 97-104.
Patent Abstracts of Japan vol. 13, No. 465, Oct. 20, 1989 (JP-A-11 81 687).
Patent Abstracts of Japan vol. 13, No. 552, Dec. 8, 1989 (JP-A-12 26 684).
Patent Abstracts of Japan, vol. 016, No. 136 (P-133) Jul. 4, 1992.
Patent Abstracts of Japan, vol. 10, No. 188 (P-473) 2244) Jul. 3, 1986 & JP-A-61 034 486.
Patent Abstracts of Japan, vol. 13, No. 306 (P-897), Jul. 13, 1989 JPA-A-1 079 679 Toyota Central Res & Dev Lab, Inc.) Mar. 24, 1989.
Patent Abstracts of Japan, vol. 9, No. 154 (E-325) Jun. 28, 1985 & JP-A60 033 745 (Nippon Denshin Denwa Kosha) Feb. 21, 1985.
Paul R. Drouilhet Jr., et al., A Bandspread Modulation—Demodulation System for Multiple Access Tactical Satellite Communication, EASCON '69 Record, pp. 126-132.
PCT US88103474 International Search Report.
Perreauh, Civilian Receivers Navigate by Satelite, MSN vol. 11, #I, Jan. 1981.
Perreault; Paul, Civilian Receivers Navigate by Satellite, MSN, Jan. 1981, vol. 11, No. 1, pp. 61-93.
Peter Dondl, Digital Network Oriented Mobile Radio Satellite System as an Integrated Part of the GSM Cellular Radio System in Europe, Deutsch BundespostlFernmeldetechnisches ZentralamtlDarmstadt, Fed. Rep. of Germany, Sep. 21, 1989.
Peter F. MacDoran, Satellite Emission Radio Interferometric Earth Surveying Series-GPS Geodetic System, Bulletin Geodesique, vol. 53, 1979, pp. 117-138.
Peter F. MacDoran, Satellite Emission Range Inferred Earth Surveying, Series-GPS, JPL, presented at Defense Mapping Agency meeting Feb. 9, 9981,13 PP.
Peter F. MacDoran, Satellite Emission Range Inferred Earth Surveying, Series—GPSU, JPL, presented at Defense Mapping Agency Meeting, Feb. 9, 1981,.I 3 PP.
Peter F. MacDoran, Series—Satellite Emission Radio Interferometric Earth Surveying, Third Annual NASA Geodynamics Program Review, Crustal Dynamics Project, Geodynamics Research, Jan. 26-29, 1981, Goddard Space Flight Center, p. 76 (plus) Three.
Peter F. MacDoran, Statements made at the 3rd International Geodetic Symposium on Satellite Doppler Positioning, Feb. 1982.
Peter L. Bender, National Bureau of Standards, Private Communication, 1978.
Petition of American Mobile Satellite Corporation Before the FCC, Washington, DC 20554, dated Jun. 3, 1991, pp. 1-15.
Phil Ward, An Advanced Navstar GPS Geodetic Receiver, Proceedings of the Third International Geodetic Symposium on Satellite Doppler Positioning, pp. 1213-1231, Feb. 8-12, 1982.
Philip J. Klass, Arinc Proposes Satellite-Based Surveillance, Data Link System, Aviation Week & Space Technology, Aug. 26, 1985, pp. 14-15.
Philip J. Klass, First Production GPS Receiver Delivered Ahead of Schedule, Aviation Week & Space Technology, Sep. 21, 1987, vol. 127, No. 12, p. 93.
Philip Konop, The Effect of Hard Limiting at the Input to a GPS Receiver in a High-Random-Noise and High-Jamming Environment, 1976 National.
Telecommunications Conference, vol. III, Dallas, Tex., Nov. 29-Dec. 1, 1976, pp. 41.5-1 to 41 5-5.
Philipp Hartl, Fernwirktechnik der Raumfahrt, (Telecontrol Technology in Astronautics), Springer-Verlag, 1977, pp. 155-161, (including translation from German to English).
Pierce, Omega, IEEE Transactions on Aerospace and Electronic Systems, vol. AES-1, No. 3, Dec. 1965, pp. 206-215.
Pierce, Omega, IEEE Transactions on Aerospace and Electronics Systems, vol. AES-1, No. 3, Dec. 1965, p. 206-215.
Popular Science, QuoTrek Over-The-Air Data at Your Fingertips, J. Schefter, pp. 70 &'following, (undated).
Price, R et al., A Communication Technique for Multipath Channels, Proc. IRE, vol. 46, (Mar. 1958), pp. 555-570.
Proakis Spread Spectrum Signals, Digital Communications, second edition; pp. 845-860.
Proceedings SPIE, Optical Systems for Space Applications, The Hague, Mar. 30-Apr. 1, 1987, pp. 232-238, SPIE—The International Society of Optical Engineers, Washington, US; R. Halm et al.: Transceiver in-flight checkout system.
Proceedings IEEE Infocom'86, 5th Annual Conference, Computer and Communications integration Design, Analysis, Management, Miami, Fla., 8-10.
Proceedings of the First Intl. Elect. Crime Countermeasures Conf., Edinburgh, Scotland, Motor Vehicle Antijack System, R. L French, Jul.
Proceedings SPIE, Optical Systems for Space Applications, The Hague, Mar. 30-Apr. 1, 1987, pp. 239-244, SPIE—The International Society for Optical Engineering, Washington,, US; A. F. Popescu et al.: Laboratory Model of a Bidirectional Diode.
Proposal to Design, Fabricate, Test, and Deliver a Navstar Global Positioning System Azimuth Determining System, Texas Instruments Incorporated, Feb. 10.
Qureshi, Shahid, Adaptive Equalization, IEEE Communications Magazine, (Mar. 1982), pp. 9-16.
R E. Anderson et al., "Satelline-Aided Mobile Telephone System", Proc. of the Nat. Electro. Conf., vol. 33 (1979) pp. 432-437.
R Price, P. E. Green, A Communication Technique for Multipath Channels, Proceedings of the IRE, Mar. 1958, pp. 555-570.

R. A. Preston, R. Ergas, H. F. Hinteregger, C. A. Knight, D. S. Robertson, I. I. Shapiro, A. R. Whitney, A. E. E. Rogers, and T. A. Clark, Interferometric.
Observations of an Artificial Satellite, Science, vol. 178, pp. 407-409, 1972.
R. A. Scholtz, Notes on Spread-Spectrum History, IEEE Trans. Commun. COM-31, No. 1, pp. 82-84, Jan. 1983.
Falconer, David D., Application of Passband Decision Feedback Equalization in Two-Dimensional Data Communication Systems, IEEE Transactions on Communications, (Oct. 1976), pp. 1159-1166.
FCC Application of Ellipsat Corporation dated Nov. 2, 1990.. FCC Application of Loral Cellular Systems, Corp. Jun. 3, 1991 pp. 94-187 GLOBALSTAR.
Fell, Geodetic Positioning Using a Global Positioning System of Satellites, Reports of the Department of Geodetic Science, Report No. 299, Ref. No. DMA PE63701B132011240, The Ohio State University Research Foundation, Ohio, Jun. 1980.
Foley, Iridium: Key to Worldwide Cellular Communications Telecommunications, Oct. 1991.
Foley, Iridium; Key to Worldwide Cellular Communications Telecommunications, Oct. 1991.
Forsker Hakon Nymoen, Bruk av PCM ved Satellitt—Kommunikasjon, Telektronikk, vol. 4, Apr. 1971, pp. 233-239, (including a translation from German to English).
Fred Baumgartner, Code Division Multiple Access Beyond the Time Domain, Communications Feb. 1990; pp. 26-32.
Fujii, et al., AAITDMA—Adaptive Satellite Access Method for Mini-Earth Station Networks, Proceedings of the GLOBECOM, 1986, pp.
G. Calhoun, Digital Cellular Radio, Artech House (1988), pp. v-ix, 339-362.
Gardiner, Satellite Services for Mobile Communication Telecommunications, Aug. 1986.
Gardner, W. A. and Chen C. K., Interference-Tolerant Time-Difference-Arrival Estimation for Modulated Signals, IEEE Trans. on Acous., Speech and Sig. Proc., vol. 36, No. 9, Sep. 1988, pp. 1385-1395.
Gardner, W. A. and Chen, C. K., Interference-Tolerant Time-Difference of Arrival Estimation for Modulated Signals, IEEE Trans. on Acous., Speech, and Sig. Proc., vol. 36, No. 9, Sep. 1988, pp. 1385-1395.
Gary D. Ott; Vehicle Location in Cellular Mobile Radio System; Feb. 1977; IE.
Gawler, Frequency Converters and Detectors, Electronics Engineers' Handbook, 2nd ed., (McGraw-Hill, N.Y., 1982), pp. 14-63.
George R. Cooper et al., Cellular Land-Mobile Radio, Why Spread Spectrum?, IEEE Communications Magazine, Mar. 1979, pp. 17-24.
Gilbert E LaVean, Defense Satellite Communications Systems, Progress in Astronomy and Aeronautics, vol. 41, 1970, pp. 309-321.
Globalstar System Application—Parts I-IV, Application of Loral Cellular Systems, Corp. before the Federal Communications Commission, Washington, D.C., Jun. 3, 1991.
Globecom 85, IEEE Global Telecommunications Conference, Dec. 1985, vol. 3, Kriedte et al., pp. 3811-3816.
Goad, C., Visit with P. MacDoran, Aug. 6, 1981U, Memor to Capt. Bossier, sent to Dr. Counselman, Aug. 12, 1981, 3 pages.
GPS Navstar Global Positioning System User's Overview, YEE-83-009B, Space Navigational Systems Navstar GPS Joint Program Office, Los Angeles, California, Sep. 1986.
GPS-Based Vessel Position Monitoring and Display System; Reynolds et al.; EE AES Magazine; Jul. 1990; pp. 16-22.
Graf, Rudolf F., Dictionary of Electronics, Fourth Edition, second printing, 1974, Howard W. Sams & Co., p. 591.
Counselman, Shapiro, Greenspan and Cox, Backpack VLBI Terminal with Subcentimeter Capability, NASA Conference Publication 21 15-Radio Interferometry Techniques for Geodesy, 1980, pp. 409-414.
Counselman, Shapiro, Greenspan and Cox, Backpack VLBI Terminal with Subcentimeter Capability, NASA Conference Publication 21 15—Radio Interferometry Techniques for Geodesy, 1980, pp. 409-414.
Crow, Bletzacker, Najarian, Purcell, Statman & Thomas, Series-X Final Engineering Report, JPL D-1476, Aug. 1984.
Cue Pager Advertisement, Jan. 4, 1979.
D. C. Cox, Universal Digital Portable Radio Communications, Proc. of the IEEE, vol. 75, No. 4, Apr. 1987, pp. 436-477.
D. G. C. Luck, System Organization for General Communication Via Medium Altitude Satellites, RCA Review, Sep. 1963, pp. 293-324.
D. L. Schilling et al., Broadband CDMA for Personal Communications Systems, IEEE Communications Magazine (Nov. 1991), pp. 86-93.
D. L. Schilling et al., Spread Spectrum for Commercial Communications, IEEE Communications Magazine (Apr. 1991), pp. 66-79.
DeRe, Enrico, An Integrated Satellite-Cellular Land Mobile System for Europe. Dimension 1000 Binary GSC Radio Pager TheorylMaintenance Manual Publication No. 68P81025C80-0, copyright 1983, by Motorola, Inc.
Dixon, Spread Spectrum Systems, Wiley and Sons, 1984, pp. 7-8.
Draim, J. E., Three- and Four-Satellite Continuous-Coverage Constellations, J. Guidance, vol. 8, No. 6, pp. 725-730 (1985).
Draim, J. E., Three-and Four-Satellite Continuous-Coverage Constellatons, AIAA, AIAAIAAS Astrodynamics Conference (1984).
Draim, J. E., Three-and Four-Satellite Continuous-Coverage Constellatons, J. Guidance, vol. 8, No. 6, pp. 725-730 (1985).
Dyna T-A-C System Description, Instruction Manual; Motorola; Jun. 1983, pp. 10 and 11, (Manual #68P81150E01-A).
E. Herter, et al., Nachrichtenubertragung uber Satelliten, (Information Transmission via Satellite), Springer-Verlag, 1979, pp. 1-25, (including translationfrom German to English).
E.P. 0059454, Dondl, Sep. 1982.
W. Gardner, C. K. Chen; "Signal-Selective Time-Difference of Arrival Estimation for Passive Location of Man-Made Signal Sources in Highly Corruptive Environments, Pt. I: Theory and Method"; May, 1992; IEEE Transactions on Signal Processing vol. 40.
W. Gardner, C. Spooner; "Signal Interception: Performance Advantages of Cyclic-Feature Detectors"; Jan. 1992; IEEE Transactions on Communications vol. 40, No. 4.
W. Gardner, S. Venkataraman: "Performance of Optimum and Adaptive Frequency-Shift Filters for Cochannel Interference and Fading"; Nov. 1990; 24thAnnual Asilomar Conference on Signals, Systems and Computers.
W. Gardner, W. Brown; "Frequency-Shift Filtering Theory for Adaptive Co-Channel Interference Removal"; Oct. 1989; 23rd Asilomar Conference on Signals, Systems, and Computers vol. 2 of 2.
W. Gardner; "Exploitation of Spectral Reduncancy in Cyclostationary Signals"; Apr. 1991; IEEE SP Magazine.
W. J. Hardy et al., "New AUTOPLEX Cell Site Paves the Way for Digital Cellular Communications", AT&T Technology, vol. 5, No. 4 (1990), pp. 20-25.
W. O. Henry, "Some Developments in Loran", Journal of Geophysical Research, vol. 65, Feb. 1960, pp. 506-513.
W. R. Fried, et al., Integrated Satellite Radio Navigation Surveillance and Communication System, presented at the National Radio Navigation Symposium Nov. 13-15, 1973.
W. Stallings, ISDN An Introduction, MacMillan Pub. Co. (1989), pp. 292-304.
Waddah K. Alem et al., "Spread Spectrum Acquisition and Traching Performance for Shuttle Communication Links", IEEE Transactions on Communications, vol. COM-46, No. 11, Nov. 1978, pp. 1689-1703.
Wadsworth, D., "Longitude-reuse Plan Doubles Communication Satellite Capacity of Communication Satellite Capacity of Geostationary Arc," AIAA 8th Communications Satellite Systems Conference, pp. 198-204 (1980).
Satellite Navigation Systems, McGraw Hill Encyclopedia of Science and Technology, vol. 16, pp. 55-58.
Satellite News Gathering: An Overview, Uyttendaele, IEEE Transactions on Broadcasting, vol. BC-32, No. 4, pp. 74-84, Dec. 1, 1986.
Satellite-Switched TDMA: Transponder Switched or Beam Switched, Prog. In Astronautics & Aeronautics, vol. 41, pp. 139-154, W. G. Schmidt, Apr. 1974, pp. 37.5-32 to 37.5-35.
Selective Signalling for Portable Applications Nelson, 28th IEEE Vehicular Technology Conference, Denver, Colo., Mar. 22-24, 1978.

Shuttle Orbiter Ku-Band . . . Morn, Iwasaki et al., Interim Report, NASA, CR-160316, Aug. 1, 1979.
Sky-hooks, Fish-Warmers . . . Communications, Ri~dgee, t al., IEEE Proc., vol. 132, Pt. F., No. 1, pp. 1-12, Feb. 1, 1985.
Softening of the Arteries, by Bruce Weber, The New York Times Magazine, p. 78, Aug. 26, 1990.
Software Implementation of a PN Spread Spectrum Receiver to Accommodate Dynamics, C. Cahn et al., IEEE Trans. on Communications, vol. COM-25, No. 8, a u ~1.9 88, pp. 832-840.
Solving Cellular Data Transmission Problems Telephony, Dec. 1, 1986, by Greg Fontana, pp. 36-40.
Some Factors that Influence EHF SATCOM Systems, Ricardi, Conference Rec. of Electronics & Aerospace Systems Conf., Arlington, vol. 3, pp. 617-622, Oct. 9, 1979.
SPCS/Customer Premises Equipment Data Interface, Bell Communications Research, Inc., Nov. 1984.
Spectral Reuse in 12 GHz Satellite Communications Systems, Conf. Rec. I.C.C. 77, vol. 3, Jun. 1977.
Spread Spectrum Acquisition and Tracking Performance for Shuttle Communication Links, Alem et al. IEEE Transactions on Comm., No. COM 26, No. I I , Nov. 1, 1978.
Spread Spectrum and the Radio Amateur, Rinaldo, W4RI, QST, Nov. 1, 1980.
Spread Spectrum and Time Division Multiple Access Satellite Communications, Mohanty, IEEE Transactions on Communications, vol. COM-25, No. 8,pp. 810-815, Aug. 1977.
Spread Spectrum Application on State-of-the-Art Equipments, Cohn, Lecture by Assoc. Dir., Advanced Programs, Magnavox Res. Lab, pp. 5-1,5-2.
Spread Spectrum Communication . . . Mobile Service, Ormondroyd et al., IEEE International Conf. on Land Mobile Radio, pp. 273-287, Sep. 4, 1979.
Spread Spectrum Communications—Myths and Realities, Viterbi, IEEE Publ., pp. 11-18, Jan. 1, 1979.
Spread Spectrum Multiple. . . a Satellite, Kochevar, IEEE Transactions on Communications, vol. COM-25, No. 8, pp. 853-856, Aug. 1, 1977.
Spread Spectrum Multiple Access System with Intrasystem Interference Cancellation, by Tatsuro Masamura; The Transactions of the Institute of.
Spread Spectrum Systems, Dixon, First Ed. Wiley-Interscience Publication, pp. 6, 140, 265-269.
Spread Spectrum Techniques for the Space Shuttle, Batson, Nat'l Telecommunications Conference, Nov. 27-29, 1979, vol. 1, pp. 54.4.1-54.4.5.
Spread-Spectrum . . . Allocation, Telecommunication Journal, vol. 45-1, Jan. 1, 1978.
Spread-Spectrum for Multiple Access, Electronics World Wireless World (Jan. 1991), pp. 23-25.
Straw man for automatic roaming electronic industries association TR-45.2 cellular system operation, Jun. 8, 1985.
Subjective Evaluation of . . . and Military Users, Campanella et al., IEEE Transactions on Comm. Technology, vol. Com-18, No. 5, pp. 663-672, Oct. 1, 1970.
Synthetic Speech for Real Time Direction Giving, C. M. Schmandt et al., IEEE Transactions on Consumer Electronics, 35(3):649-653, Aug. 1989.
Synthetic Speech for Real Time Direction-Giving, C. M. Schmandt et al., Digest of Technical Papers, International Conference on Consumer.
System Configuration of Multi-Zone Cordless Telephone, Nation Conference Record, 1986, The Institute of Electronics and Communication.
System Specification for the NAVSTAR Global Positioning System, U.S. Air Force 55-GPS-300B appendix I, pp. 1-1 1, 1-20-123, Mar. 3, 1980.
Systeme integre de . . . SINTAC-C2, Milosevic, Proceedings of the Intern. Confer. on Electronic Navigational Aid Systems for Aircraft, Paris, pp. 253-268, Jan. 1, 1977.
Systems for Telecommunication by Satellite, Pares, et al., Ed. Masson, pp. 78-79 (in French), Jan. 1, 1978.
Takeoff of New CATV, CATV Study Documentation Center, Telecom, 1986.

TATS—A Bandspread Modulation . . . Satellite Communication, Drouilhet et al. IEEE Transactions on Aerospace & Electronic Systems, pp. 126-132, Jan. 1, 1969.
Taxi! Dynamic Cartographic Software for Training Cab Drivers, by M. Bosworth et al., Technical Report, Hunter College Department of Geology and Geography, (212)-772-4000, 1988 paper presented at the Annual Meeting of the Association of American.
TDMA and FDMA: The Different Technologies Explained, Cordless Times, 1990 Issue 0 (Ericsson Radio Systems BV), pp. 10-11.
Technical Considertion of Small Fixed, Mobile and Transportable Satellite System, U.S. Dept. of Commerce/Office of Tellecommunications Report 77-115, pp. 1, 25, 31, 32, 33, 53, Mar. 1, 1977.
Techniques de Modulation par Etalement du Spectre, (Techniques for Modulation by Spreading of the Spectrum), Report 651, CCIR, vol. 1, 1978, pp. 1- 22, (including translation from French to English).
Techniques for Modulation by Spreading of the Spectrum, CCIR 651, Comite Consultatif Int'l des Radiocommunications, Report 651, vol. 1, Jan. 1, 1978.
Technology Considerations for the Use of Multiple Beam Antenna Systems in Communication Satellites by Matthews et al., Conference: 1979 IEEE.
Telecontrol Technology in Astronautics, Hartl, Springer-Verlag, pp. 155-161, Jan. 1, 1977.
Terminal Back Seat Driver, Technology Review, Jul., 1990, p. 10.
The 30120 GHz Mixed User Architecture Development Study: Executive Summary, pp. 0-1 to 0-21, TRW, Inc., Redondo Beach, Calif., Space Systems.
The Back Seat Driver: Real Time Spoken Driving Instructions, J. R. Davis et al., Proceedings of the IEEE Vehicle Navigation and Information Systems Conference, Toronto, Canada, Sep. 1989.
The Effect of Hard Limiting . . . Jamming Environment, Konop, National Telecommunications Conference, Dallas, Conf. Record, vol. III, pp. 41.5-1 to 41.5-5, Jan. 1, 1976.
The Effects of Time Delay and Echoes on Telephone Conversations, by J. W. Emling and D. Mitchell, dated Aug. 9, 1963, pp. 2869-2891, The Bell System Technical Journal, Nov. 1963.
The History & Future of Commercial Satellite Communications, Pritchard, IEEE Communications Magazine, vol. 22, No. 5, pp. 22-37, May 1, 1984.
The Intonational Structuring of Discourse, by J. Hirschberg et al., Proceedings of the Association for Computational Linguistics, 136-144, Jul. 1986.
The Iridium.TM. System—A Revolutionary Satellite Communications System Developed With Innovative Applications of Technology, D. Sterling et al., IEEE Nov. 4-7, 1991.
The Lincoln Experimental Satellites LES-8 and -9, Sarles, et al., IEEE Electronics &Aerospace Systems Convention EASCON-77 Record, pp. 21-1A to 21-1 U, Sep. 26, 1977.
Allan Kirson; ATIS—A Modular Approach; Kirson—ATIS—A Modular Approach.pdf; In: IEEE Plans '92—Position Location and Navigation Symposium, Monterey, CA, Mar. 24-27, 1992, Record; (A93-10976 01-04), p. 528-533).
William G Toperzer; An Advanced Driver Information System Concept and Its Communications Considerations; Toperzer—An Advanced Driver Information.pdf; Position Location and Navigation Symposium, 1990. Record. apos;The 1990apos;s—A Decade of Excellence in the Navigation Sciencesapos;. IEEE Plans apos;90., IEEE, vol. , Issue , Mar. 20-23, 1990 pp. 364-369.
CJ Driscoll and Associates; Survey of Location Technologies to Support Mobile 9-1-1; Driscoll—Survey of Location Technologies.pdf; Survey Conducted for State of California Department of General Services Telecommunications Division, Sacramento, California and for the Association of Public Safety Communications Officials (APCO) Jul. 1994.
Federal Communications Commission; In the Matter of Revision of the Commission's Rules to Ensure Compatibility With Enhanced 911 Emergency Calling Systems; FCC—In the Matter of Revision—1994.pdf; 9 F.C.C.R. 6170,9 FCC Rcd. 6170,3 Communications Reg. (P&F) 2193, 1994 WL 721857 (F.C.C.).
The Low-Cost Low-Capacity Earth Terminal, Cuccia et al., Microwave Syst. News, vol. 5, pp. 19,20,22,26,30,31,36-40,42, Jun. 1, 1975.

The Pseudo-Synchronisation, A Costless Feature to Obtain the Gains of a Synchronised Cellular Network, Nov. 1991, Nice, Valbonne, FR.
The Spread Spectrum Controversy, Buckingham, Electronics & Power, pp. 222,224, Mar. 1, 1980.
The Use of PCM in Satellite Communications, Nymoen, Telektronikk, Nr. 4, pp. 233-239, Jan. 1, 1971.
T-Net Related Inventions Summary of Patent Search, by Martinez; Radio Telecom & Technology Inc., TM 3140-1B.
Towards the Intelligent Bird, Evans, Int. Journal of Satellite Communications, vol. 3, pp. 203-215, Jul. 1, 1985.
TRIMPACK Technical Specifications, Trimble Navigation, May 1989.
Trim pack Technical Specifications, Trimble Navigation, May 1989.
U.S. Broadcast Satellites by Braham, pp. 49-52, 63, Mjcrowave Journal, vol. 21, No. 1, Jan. 1978.
Universal Digital Portable Radio Communications, D. C. Cox, Proceedings of the IEEE, vol. 75, No. 4, Apr. 1987, pp. 436-477 pp. 436-477.
Universal Digital Portable Radio Communications, D. C. Cox, Proceedings of the IEEE, vol. 75, No. 4, Apr. 1987, pp. 436-477.
Article, The Wall Street Journal, Stop! Thief, Guard, Wayward Spouse, Etc., Dec. 7, 1993.
Ashkenazi, Agrotis and Yau, GPS Interferometric Phase Algorithms, Proceedings of the First International Symposium on Precise Positioning with the Global Positioning System—Positioning with GPS, 1985, vol. 1, pp. 299-313, Apr. 15-19, 1985.
AT&T 92 TNT 203-29, Oct. 7, 1992, pp. 17-39, Jun. 1995.
Auer, W., Pointing, Acquisition and Tracking for Intersatellite Optical Data Links, May 1984.
Automobile Electronic News, vol. 1, No. 16., U.K. Picks GEC to Head Navigation Project, by James Fallon, Aug. 28, 1989.
B. Agee, S. Schell, W. Gardner; Spectral Self-coherence Restoral: A New Approach to Blind Adaptive Signal Extraction Using Antenna Arrays; Apr. 1990; Proceedings of the IEEE, vol. 78, No. 4.
K. M. Keen, Method Permits Gain Estimation for Very-Wide-Beam, Satellite-Terminal Antennas, Communications Technology, Oct. 1985, pp. 83-84, 87.
K. W. Strom, on the Road with AUTOPLEX System IOOO, AT&T Technology, vol. 3, No. 3 (1988), pp. 42-51.
Kachmar, Michael, Land-mobile satellite pick up, Microwaves & RF, pp. 33-35, Aug. 1984.
Kachmar, Michael, Land-mobile satellites pick up, Microwaves & RF, pp. 33-35, Aug. 1984.
Kammerlander, C9OO—An Advanced Mobile Radio Telephone System with Optimum Frequency Utilization, IEEE Journal on Selected Areas in ommunications, vol. SAC-2, No. 4 (Jul. 1984), pp. 589-597.
Kenichi Tsukamoto, SSRA Satellite Communications System, Proceedings of the 9th International Symposium on Space Technology & Science, Tokyo, Japan, May 17-22, 1971, pp. 765-774.
Kiesling, John D., Land Mobile Satellite Systems, Proceedings of the IEEE, Jul. 1990, vol. 78, No. 7, pp. 1107-1115.
Kihara, M., Performance Aspects of Reference Clock Distribution for Evolving Digital Networks, IEEE Communications Magazine, Apr. 1989.
King, High Resolution Automatic Vehicle Locating System, GEC Journal, 1978.
Kinoshita, Kota et al., Digital Mobile Radio Telephone System Using TDIFDMA Scheme IEEE International Conference on Communications, (Jun. 14-18, 1981, Denver, Colo.), pp. 23.4.1-23.4.5.
Kreutzer, Peter, Experimental Investigations on a Digital Mobile Radio Telephone System Using TDMA and Spread Spectrum Techniques, Nordic Seminar on Digital Land Mobile Radio Communications (DMRI), Feb. 5-7, 1985, Espoo, Finland), pp. 287-293.
MacDoran, Miller, Buennagel & Whitcomb, Cordless Systems for Positioning with Navstar-GPS, First International Symposium on Precise Positioning with the Global Positioning System, Positioning with GPS—1985, Apr. 15-19, 1985.
MacDoran, Peter F. and Donovan J. Spitzmesser, Series Concept Simplified Block Diagram (terrestrial applications), JPL Drawings, Nov. 1981.
MacDoran, Peter F. and Donovan J. Spitzmesser, Series Concept Simplified Information Flow, JPL Drawings, Nov. 1981.

MacDoran, Peter F., Satellite Emission Radio Interferometric Earth Surveying Series-GPS Geodetic System, Bulletin Geodesique, vol. 53, 1979, pp. 117-138.
MacDoran, Peter F., Satellite Emission Range Inferred Earth Surveying, Series-GPS, JPL, presented at Defense Mapping Agency meeting, Feb. 9, 1981, 13 pages.
MacDoran, Peter F., Series Application to Emergency Locator Beacons, Jet Propulsion Laboratory Interoffice Memorandum 335-81-0428, 2 pp., Oct. 26, 1981.
Radio Shack, 1990 Catalog, p. 64.
Rafferty et al.,RF Development for Mobile-Satellite Systems, MNS & CT, Nov. 1988.
Rafferty, W. et al., RF Development for Mobile-Satellite Systems, MSN & CT, pp. 28-30, 37 (1988).
Rafferty, W. et al., RF Development for Mobile-Satellite Systems, MSN & CT, pp. 38-30, 37 (1988).
Ralph Eschenbach & Roger Helkey, Performance/Cost Ratio Optimized for GPS Receiver Design, Microwave Systems News, Nov. 1984, pp. 43-46.
Rath, Attitude Estimation Using GPS, Texas Instruments Incorporated, paper presented at the National Technical Meeting of the Institute of Navigation, San Mateo, California, Jan. 26, 1989.
RDX 1000, Portable RF Data Terminals; Instruction Manual No. 68P81014C65-A; Motorola, Inc. 1978.
Remondi, Performing Centimeter—level Survey Results in Seconds with GPS Carrier Phase: Initial Results, Proceedings of the Fourth Geodetic Symposium on Satellite Positioning, vol. 2, pp. 1229-1250, Apr. 28-May 2, 1986, Austin, Texas.
Remondi, Using the Global Positioning System (GPS) Phase Observable for Relative Geodesy: Modeling, Processing and Results, Center for Space Research, The University of Texas at Austin, May 1984.
Report 708 of the comite Consultatif International des Radiocommunications (CCIR), Geneve, 1978, vol. IV, 4.2.4, p. 131.
S C. Wu et al., An Optimal GPS Data Processing Technique IEEE Plans '92 Position, Location and Nav. Symp. Record, Jan. 1, 1992.
S Lin, Hybrid Selective-Repeat ARQ with Finite Buffer, vol. 24, No. 6, Nov. 1981, pp. 2883-2885.
S. D. Buckingham, The Spread Spectrum Controversy, Electronics & Power, Mar. 1980, pp. 222 and 224.
S. H. Durrani et al., Communications Satellite System Concepts Based on the AMPA Experiment, 169 Journal of Spacecraft and Rockets, vol. 17, No. 1,Jan.-Feb. 1980, pp. 15-19.
S. J. Campanella et al., Subjective Evaluation of Dedicated Multiple—Hop Satellite Communications for Government and Military User, IEEE Transaction on Communication Technology, vol. 15, No. 5, Oct. 1970, pp. 123-132.
S. Schell, W. Gardner; Estimating the Directions of Arrival of Cyclostationary Signals-Pt. 1: Theory and Methods; Nov. 1991; IEEE Transactions on Signal Processing.
S. Schell; Estimating the Directions of Arrival of Cyclostationary Signals-Pt. II; Performance; Nov. 1991; IEEE Transactions on Signal Processing.
Sang-Bin Rhee, Vehicle Location in Angular Sectors Based on Signal Strength, IEEE Transactions on Vehicular Technology, vol. VT-27, No. 4—Nov. 1978, pp. 244-258.
Satellite Communication Division, Scientific-Atlanta, Inc., Proposal for Digital Audio Satellite Distribution for Network Radio 55TP022A, Nov. 1981.
Satellite Positioning Corporation Geodetic Survey Products, GPS Technology Corporation, Houston, Texas, 1989.
Schmidt, F. et al., Electronically Steered Phased-Array Antenna for MSAT, MSN & CT, pp. 41-43 (1988).
U. Haller et al., "A Forward Error Correction System for Heavily Disturbed Data Transmission Channels", 1972, pp. 523-530.
Uddenfeldt, Jan et al., "A Digital FDrrDMA System for a New Generation Cellular Radio", Second Nordic Seminar on Digital Land Mobile Radiocommunications, (DMR II), (Oct. 14-16, 1986), pp. 99-105.
US. application filed Jun. 3, 1991, U.S. Appl. No. 07/710,197, Lauro et al., Title "Electronic Direction Finder".
USA Today Sports Page article, Jan. 4, 1988, Advertising flier for sports page from Beeper Plus, undated.

Victor J. Young et al., "Beam Loading", Microwave Dictionary, No. 188, pp. 10-11.

W. E. Carter, A. E. E. Rogers, C. C. Counselman III, and I. I. Shapiro, "Comparison of Geodetic and Radio Interferometric Measurements of the Haystack-westford Base Line Vector", J. Geophys. Res., vol. 85, pp. 2685-2687, 1980.

W. F. Ultlaut, "Spread—Spectrum Principles and Possible Application to Spectrum Utilization and Allocation", Telecommunication Journal, vol. 45, Jan. 1978, pp. 20-32.

Japanese Broadcast Satellite by Ohtake et al., Microwave Journal, vol. 20, No. 9, Sep. 1977, pp. 53-55.

Ku-Band Satellite Data Networks Using Very Small Aperture . . . Protocols, Raychaudhuri, et al., Int. Jour. of Satellite Comm., vol. 5, pp. 195-212, Jan. 1, 1987.

Land-Mobile Satellites Pick Up Where Cellular Radio Leaves OW' Michael Kachmar, Microwaves and RF, Aug. 1984, pp. 33-35.

Loran, McGraw Hill Encyclopedia of Science and Technology, vol. 10, pp. 178-181.

Low Cost Satellite Data Transmission Networks Using Demand Assigned TDMA, Husted et al., IEEE Conference Proceedings, pp. 8-15, Oct. 1, 1978.

Map Matching Augmented Dead Reckoning, by W. B. Zavoli et al., Proceedings of the 35th IEEE Vehicular Technology Conference, pp. 359-444, 1986, IEEE CH2308-5.

J. Lenk, Handbook of Microprocessors, Microcomputers, and Minicomputers, (Prentice-Hall, 1979), pp. 51-52 and 280.

J. W. Schwartz et al., Modulation Techniques for Multiple Access to a Hard—Limiting Satellite Repeater, Proceedings of the IEEE, vol. 54, No. 5, May 1966, pp. 763-777.

Jacques Fagot et al., Frequency Modulation Theory; Application to Microwave Links , IEEE Transactions on Communication, vol. COM-25, No. 8, Aug. 1977, pp. 835-855.

James C. Reynolds, et al., GPS-Based Vessel Position Monitoring and Display System, IEEE Plans '90 Position Location and Navigation Symposium, Aug. 1990, pp. 601-607.

James C. Reynolds, et al., GPS-Based Vessel Position Monitoring and Display System, IEEE Plans '90 Position Location and Navigation Symposium, Au~.1, 990, pp. 601-607.

James Collins, GPS Surveying Techniques, ACSM Bulletin, Jun. 1985, pp. 17-20.

James L. Baker, Sailboat Search and Rescue Experiment, IEEE Journal of Oceanic Engineering, vol. OE-2, No. 3, Jul. 1977, pp. 285-287.

James Martin, Communication Satellite Systems, Prentice Hall, Inc., 1978, pp. 22, 53, 142-147, 189, 358-359, 365-367.

Janc, Consideration of Various Error Source in a Practical Automatic Vehicle Location System, IEEE Transaction on Vehicular Technology, Mar. 1984, pp. 277-284.

Javad Ashjaee, GPS Doppler Processing for Precise Positioning in Dynamic Applications, IEEE Oceans '85, Nov. 1985..Jeff Hurn, GPS—A Guide to the Next Utility, 1989.

Jeff Hurn, GPS a Guide to the Next Utility, Trimble Navigation, Sunnyvale, CA 1989.

Jerry D. Holmes, GPSClearlAcquisition Code Sprectral Properties, 1976 National Telecommunications Conference, vol. III, Dallas, Tex., Nov. 29, Dec. 1, 1976, pp. 41.7-.1 to 41.7-5.

John Husted et al., Low Cost Satellite Data Transmission Networks Using Demand Assigned IDMA, pp. 7-14.

John T. Merrifield, Fifth—Generation GPS Receiver Aims at Commercial Market, Aviation Week & Space Technology, Aug. 19, 1985, vol. 123, No. 7, p. 123.

K. Brayer, Packet Switching for mobile earth stations via low-orbit satellite network, Proceedings of the IEEE, right-hand col., lines 3-5, p. 1628, left-hand col., lines 309, p. 1629, left-hand col., lines 18-29, Fig. 1, vol. 72, No. 1, Jan.

K. Gilhousen, Increased Capacity Using CDMA for Modile Satellite Communication, IEEE Journal on Selected Areas in Communications, vol. 8, No. 4, May 1990, pp. 503-514.

A Communications Technique for Multipath Channels, R. Price et al., Proceedings of the IR, Mar. 1958.

A Comparison of Pseudo-Noise and Conventional Modulation for Multiple-Access Satellite Communincations, Blasbalg, IBM Journal of Res. & Dev., vol. 9, No. 4, pp. 241-255, Jul. 1, 1965.

A Complete Interactive Terminal You Can Hold in One Hand, Modern Data; Apr. 1974; pp. 34-36.

A Family of SHF Tactical . . . Terminals, Lawton et al., IEEE Transactions on Aerospace and Electronic Systems, vol. AES-6, No. 2, pp. 137-146, Mar. 1, 1976.

A Guide to the Golay Sequential Code (GSC) Publication No. R8-1-67 copyright 1982, Motorola, Inc.

A Look at the Future of Mobile Telephone Service, Norman A. Adams, Telephony, Feb. 17, 1975, pp. 37-44.

A Major Effort Towards Jam-Resistant Secure Communications, Interavia, 1111978, pp. 1042-1046.

A Novel Concept for a Satellite-Based Maritime Search and Rescue System, Weinburg, et al., IEEE Journal of Oceanic Engineering, vol. OE-2, No. 3, pp. 274-285, Jul. 1, 1977.

A Processing Satellite Transponder . . . Mobile Users, Viterbi, Proceedings of 4th Intern. Confer. on Digital Satellite Comm., Montreal, pp. 116-174, Oct. 23, 1978.

A Satellite-Switched SDMAITDMA System for a Wideband Multibeam Satellite, International Conference on Communications, vol. 1, pp. 12-7, 12-12, W. G. Schmidt, Jun. 1973.

A Scanning Spot Beam Satellite System, BSTJ, vol. 56, No. 8, pp. 1549-1560.

A Spread Spectrum Technique . . . Communications, Cooper et al., 27th Annual Conference IEEE Vehicular Technology Group, pp. 98-103, Mar. 16, 1977.

A Time Compression Multiplex System, by Kirk, Apr. 1978, pp. 22-30, C-ED.

AB3X Cellular Interface-Owner's Manual, Morrison & Dempsey Communications Inc, 1987.

Adaptive Equalization, S. U. H. Qureshi, Proceedings of the IEEE, vol. 73, No. 9 Sep. 1985, pp. 1349-1387.

Adaptive Equalization, S. U. H. Qureshi, Proceedings of the IEEE, vol. 73, No. 9, Sep. 1985, pp. 1349-1387.

Adaptive Maximum Likelihood Receiver for Carrier-Modulated Data Transmission Systems, Gottfried Ungerboeck, IEEE Transactions on Advanced Personal Communicaton System, Kohiyama et al, pp. 161-166, 1990 IEEE.

Air-Ground, Ground-Air . . . A Satellite, Blasbalg, H. et al., IEEE Transactions on Aerospace & Electronic Systems, vol. AES-4, No. 5, pp. 774-791, Sep. 1, 1968.

An Advanced Mixed User Domestic Satellite System Architectureu-pp. 148-153, 8th AIAA Satellite Conf., Orlando, Fla., 1980.

An Analysis of Domestic & Foreign Small Earth Station Markets, Ginty, Office of Telecommunications Report, Apr. 1, 1976.

An Integrated Satellite—Cellular Land Mobile System for Europe by Enrico Del Re University of Florence Dept. of EE, Italy.

Antenna Engineering Handbook, Jasik, Ed., First Edition, McGraw-Hill Book Company, pp. 1-2; 1-3, Jan. 1, 1961.

MacDoran, Peter F., Series-Satellite Emission Radio Interferometric Earth Surveying, Third Annual NASA Geodynamics Program Review, Crustal.

Dynamics Project, Geodynamics Research, Jan. 26-29, 1981, Goddard Space Flight Center, p. 76 (plus) three.

MacDoran, Peter F., Statements made at the 3rd International Geodetic Symposium on Satellite Doppler Positioning, Feb. 1982.

MacDoran, Spitzmesser and Buennagel, Series: Satellite Emission Range Inferred Earth Surveying, Presented at the Third International Geodetic Symposium on Satellite Doppler Positioning, Las Cruces, N.M., Feb. 1982, 23 pages.

MacDoran, Spitzmesser and Buennagel, Series: Satellite Emission Range Inferred Eaith Surveying, Proceedings of the 3rd International Geodetic Symposium on Satellite Doppler Positioning, vol. 2, 1982, pp. 1143-1164.

MacDoran, Whitcomb & Miller, Cordless GPS Positioning Offers Sub-Meter Accuracy, Sea Technology, Oct. 1984.

Magnavox Marine and Survey Systems Division Brochure, After Challenger: Marine Satellite Navigation at the Crossroads.

Marc E. Vaucher, Kelly Robertson, The Space Shuttle Accident Forces Companies to Change Plans, Commercial Space, Fall 1986, vol. 2, No. 3 p. 42.

Mark Weigel and John Ratigan, Using the Satellite Medium, Satellite Communication, Oct. 1991, pp. 37-39.

Marketing a New System Entails Some Trial and Error, and Changes; Charles E. Priddy; Telephony; Aug. 8, 1983.

Mason et al., Improvements in Multicoupler Systems, European Patent Application, Derwent Publications Ltd.; Jan. 1986.

Materials prepared in conjunction with Scientific-Atlanta's Demonstration of a Predecessor Digital Audio Satellite System at the National Association of Broadcasters' Dallas Convention in Apr. 1982.

Mathwich et al., The Effect of Tandem Band and Amplitude Limiting on the Eb/No Performance of Minimum (Frequency) Shift Keying (MSK), IEEE.

McClannan et al, A Satellite System for CAW, Proceedings of the IEEE, vol. 58, No. 7, Jul. 1970, pp. 987-1001.

Meeks, M. L., Editor, Methods of Experimental Physics, vol. 12 (Astrophysics), Part C (Radio Observations), 1976, pp. v-ix and as follows: Chapter 5.3: J.

M. Moran, Very Long Baseline Interferometer Systems, pp. 174-197.

Metro—p. 200, Automatic Radio Paging Exchange, System Manager Guide; Motorola; 1983; pp. 1-3 and 1-6.

METS, Inc. (Indianapolis, Ind.) Public Safety Police, Fire and Emergency Medical Services, 1989, 4 pages.

METS, Inc. (Indianapolis, Ind.) Trucking National & Regional Fleet Control, 1989, 4 pages.

Mikami et al., Comprehensive Automobile Control System, NEC Research & Development, No. 52, Jan. 1979, pp. 1-10.

Millicom Inc., Prospectus; pp. 12-19; Landenburg, Thalmann & Co., Inc.; Reinheimer Nordberg, Inc.

Mitsuo Yokoyama, et al., SSRA Communication Experiment Via ATS-1, Journal of the Radio Research Laboratories, vol. 21, No. 104, Japan, 1974, pp. 93-160.

Modax Plus, Metro Page, Modax 500A Radio Paging Terminals, Publication No. R3-5-110A, published 1986 by ~otorolal,n. c., Schaumburg, Ill.

Motorola publication, DYNAT.multidot.A.multidot.C 6000x Universal Mobile Telephone, 1984, pp. 1-6.

Motorola, Inc., Display GSC Radio Pagers, Sensar Series pp. 1-12, published Feb. 1987 by Motorola Paging Division, Boynton Beach Fla.

Motorola, Inc.; Advanced 800 MHz Trunked Radio Systems Sales Brochure; Nov. 1982, p. 4.

Mozhaev, G. V., The Problem of Continuous Earth Coverage and Kinematically Regular Satellite Networks,ll, pp. 52-61 (1973).

Muto et al. Designing a 10 Bit, 20 MsISecond Analog-to-Digital Converter System, Hewlett Packard Journey, vol. 33, No. 11, pp. 9-29, Nov. 1982.

N. S. Jayant et al., Coding of Speech and Wideband Audio, AT&T Technical Journal, vol. 69, No.'5 (Sep./Oct. 1990), pp. 25-41.

NAB (National Association of Broadcasters) Engineering Handbook, Sixth Edition, p. 688.

NAB Convention-Satellite Planning.

National Institute of Justice, Update on NIJ-Sponsored Research: Six New Reports, D. P. Rosenbaum, NCJ 145945, Apr. 1994, pp. 1-5.

National Telecommunications Conference (NTC); vol. 4, 1981, New Orleans; IEEE; Drioli et al.; Access Technique for the ITALSAT SS-TDMA.

National Telecommunications Conference, Dec. 1-3, 1975, Aldrich, pp. 25-13 to 25-16, An Operational Single-Channel per-Carrier, Demand-Assigned-Multiple-Access Satellite Telephone Network Using Centralized Control.

Nauck et al, The Loopus Concept and its postions, Z. Flugwiss Umfurech Dec. 1988 191-196.

Nauck et al, The Lospuc Concept and it positions 2. Flugwiss, weltrumforsch, 12 (1988) 191-196.

Nauslar Global Positioning Sys, Brochure by Space and Missile Sys Organization, 1973.

Navigation: Journal of the Institute of Navigation, vol. 13, No. 4, Winter 1966-1967, pp. 353-366, The Potential Use of Satellites in.

Navstar Global Positioning System Fact Sheet, United States Air Force Systems Command, Space Division, Office of Public Affairs, Los Angeles AFB, California, Aug. 1990.

Neyret, P. et al., The Intelsat VII Spacecraft, AIAA 13th Communications, Satellite Systems Conference, Los Angeles, Calif., pp. 1-16, Mar. 1990.

Neyret, P. et al., The Intelsat VII Spacecraft, AIAA 13th Communications, Satellite Systems Conference, Los Angeles, California, pp. 1-16, Mar. 1990.

Nirode C. Mohanty, Spread Spectrum and Time Division Multiple Access Satellite Communications, IEEE Transactions on Communications, vol. COM-25, No. 8, A u~1.9 77, pp. 853-855.

Noe et al, A position Fixing Algorithm for the Low Cost GPS Receiver, IEEE Transactions on Aerospace and Electronic System AES-12, vol. No. 2, pp. 295-297.

Norbert B. Hemesath et al., Anti-Jamming Characteristics of GPSIGDM, 1976 National Telecommunications Conference, vol. III, Dallas, Tex., Nov. 29-Dec. 1, 1976, pp. 41.6-1 to 41.6-5.

Nordic System Description, Instruction Manual; Motorola; Apr. 1983; pp. 10 and 13, Fig. 10, (Manual #68P81150E03).

Optrx Visual Display Pager; Radio Communications Report; Feb. 13, 1984.

Ould, Peter C., and Robert J. Van Wechel, All-Digital GPS Receiver Mechanization, Navigation, vol. 28, No. 3 (Fall 1981), pp. 178-188.

Overview of Digital Networking Products; Digital Equipment Corp; 1983; pp. 3-4 thru 3-10; 3-20 thru 3-23, 4-6 thru 4-9.

P J. Lautier; Time Division Duplex Radio Telephone Network, Technical Revue Thomson-CSF, vol. 10, No. 3, Sep. 1978.

P. Binney, Signal-Processing Chip Boasts Design Breakthroughs, Bell Labs News, Apr. 15, 1991, p. 5.

\* cited by examiner

LOCATION REPORTING SATELLITE PAGING SYSTEM WITH OPTIONAL BLOCKING OF LOCATION REPORTING

CONTINUING DATA

This application is a continuation of U.S. application Ser. No. 09/265,236, filed Mar. 8, 1999, now U.S. Pat. No. 6,560,461 which in turn is a continuation-in-part of U.S. application Ser. No. 08/905,674, filed Aug. 4, 1997 issued as U.S. Pat. No. 5,918,159. These related applications are incorporated herein by reference.

BACKGROUND OF THE INVENTION

The field of the invention is telecommunication services and systems, specifically such services and systems that have the ability to locate a remote unit using a telecommunication network.

Today, portable mobile telecommunication devices such as cellular telephones, pagers and other handheld information receiving devices are utilized by a greater cross section of the population since they are relatively inexpensive to acquire. Normally information from a communication source is transmitted to a subscriber in possession of a handheld communication information receiving device at a remote global location. The caller or source of information dials a number and a communication channel is set up for communication with a remote receiving unit such as a handheld communication device. Currently there is no infrastructure in place whereby a caller may request the location of the remote receiving unit from the network. The caller or communication source cannot determine where a message is sent.

SUMMARY OF THE INVENTION

The present invention is directed to a communication system using a network of signal transmitting and receiving units and remote receiving units. Information about the location of the remote receiving units is employed by the system.

In a first separate aspect of the present invention, a network of signal transmitting and receiving units and at least one positioning transmitter for transmitting positioning information communicate with a remote receiving unit. The remote receiving unit is capable of selectively providing secured and accessible remote receiving unit position information to the network of signal transmitting and receiving units.

In a second separate aspect of the present invention, the foregoing aspect further includes a terrestrial control station and terrestrial signal transmitting and receiving stations and/or satellite signal transmitting and receiving stations.

In a third separate aspect of the present invention, a network of signal transmitting and receiving units includes means for determining that the location of a remote receiving unit is requested. A means for locating the signal transmitting and receiving unit in the network which is able to communicate with the remote receiving unit is employed with a means for reporting the location of that unit.

In a fourth separate aspect of the present invention, the positioning information of a remote receiving unit is provided to a network of signal transmitting and receiving units with the information selectively secured by the remote receiving unit from inquiry to the network. The remote receiving unit may be capable of communication with at least one positioning transmitter and capable of two way communication with the network of signal transmitting and receiving units to disclose a global location to the network. The network may include satellite units and terrestrial units.

In a fifth separate aspect of the present invention, a method for divulging or blocking the location of a remote receiving unit associated with a network is contemplated. The method includes receiving authorization at the network to block or divulge the location from the remote receiving unit, receiving a request at the network for the location of a remote receiving unit, identifying the source of the request if required, transmitting the request and the identification of the source of the request by the network to the remote receiving unit for authorization and responding to the request according to the authorization. A sensory signal may be transmitted from the remote receiving unit until transmitting the positional information is successfully completed.

In a sixth separate aspect of the present invention, a method for updating a network of signal transmitting and receiving units about the positional information for a remote receiving unit includes providing positional information about the remote receiving unit to the remote receiving unit, comparing the positional information with pre-selected active areas stored in the remote receiving unit and generating a sensory signal at the remote receiving unit if the comparison is negative. The network may be updated with the positional information of the remote receiving unit.

In a seventh separate aspect of the present invention a method for transmitting a message to a remote receiving unit by a network of signal transmitting and receiving units includes configuring the message to include the addresses of at least selected signal transmitting and receiving units of the network and transmitting the message to a series of signal transmitting and receiving units of the network in series. The units with a selected address beams the message to the corresponding coverage areas. The message is then reconfigured to eliminate the address of the receiving signal transmitting and receiving unit before it is re-transmitted to a subsequent signal transmitting and receiving unit.

In an eighth separate aspect of the present invention, any of the foregoing aspects are contemplated to be combined.

Thus, it is an object of the present invention to provide an improved communication network. Other and further objects and advantages will appear hereafter.

DETAILED DESCRIPTION OF THE PREFERRED EMBODIMENT

Figure 1:
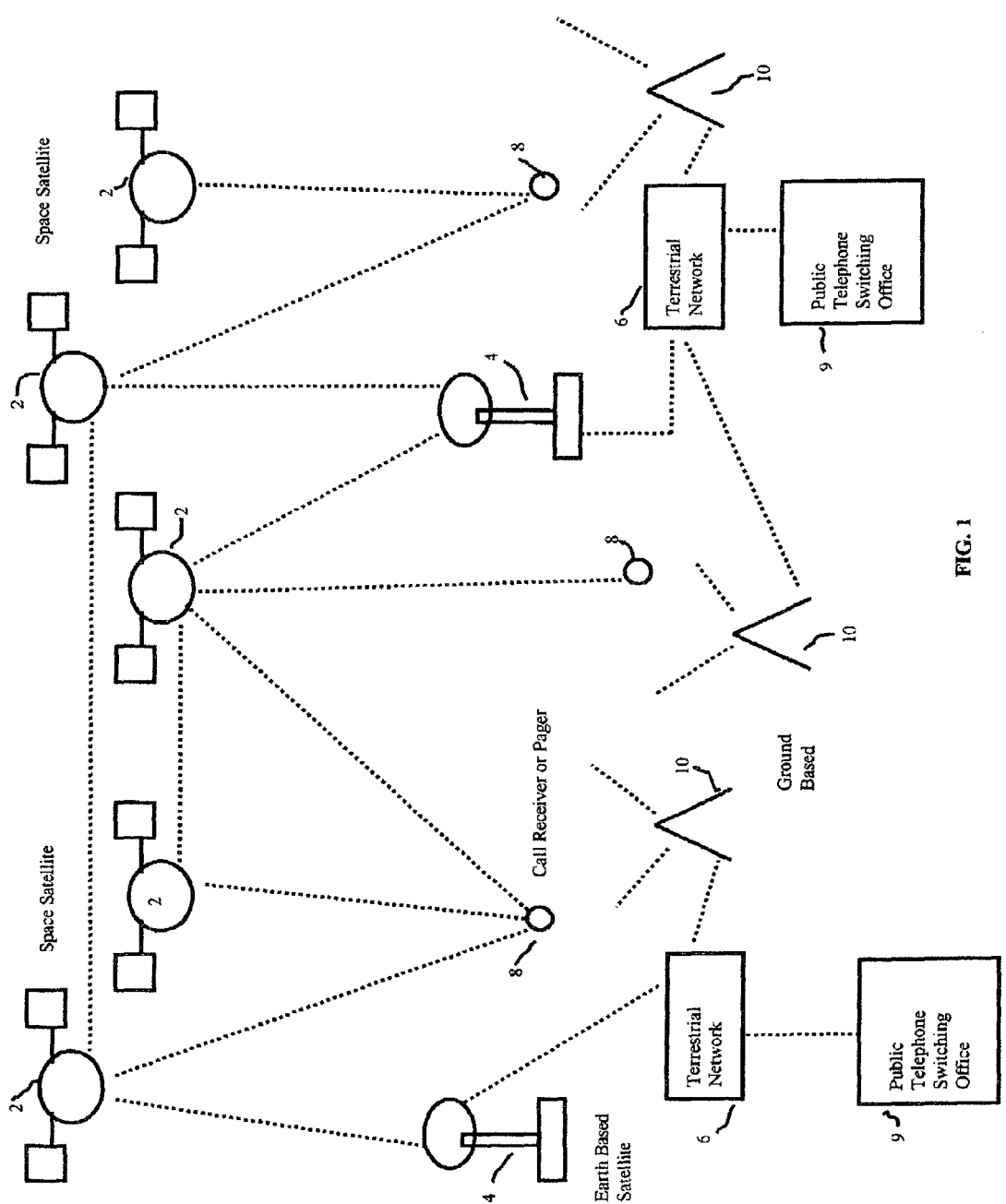
FIG. 1 shows a global satellite paging network.

The present system will consist of satellites [2] in space, communicating with earth based stations [4] and the remote receiving unit [8] which may variously be referred to as a call receiver or pager. Ground based transmitters [10] will be employed to transmit pages to the remote receiving unit [8]. Terrestrial network control stations [6], will be employed to effectively control the activities of the entire global paging network. The system will be developed such that a remote receiving unit operating under an existing paging systems will work. Thus, a network of signal transmitting and receiving unit is developed.

Upon subscribing to a paging network a subscriber selects global areas (pre-selected paging areas) where they wish to receive paging messages. The pre-selected areas, pager ID, paging protocol and other relevant information of the remote receiving unit are stored in the data library of a paging control station [6] for all pagers utilizing the paging network. The remote receiving unit [8], will periodically resolve a global position from signals transmitted from satellites and earth based communication means. The resolved global position will be periodically utilized to update the network each time a user is out of their paging area or each time the paging network requests a remote receiving unit to disclose their global position. This will enable the paging network to know the exact global location of a remote receiving unit whenever the need arises. Messages received for a remote receiving unit are processed by the network and transmitted to the global or active area of the remote receiving unit.

To initiate a page, a caller or communication source may use any regular communication device such as a telephone, personal computer to access the paging network. The caller may add specific codes to a paging message to enable the paging network to disclose the global position of the remote receiving unit after the message is transmitted. The caller's message is firstly processed by the local telephone switching office [9] before transmission to the paging control station [6]. The paging control station [6] will be employed to control all the activities of the network. Upon receiving a paging message, a paging control station decodes the message for relevant information such as pager ID and determines if a caller requires the global position of the pager. Other relevant information such as the paging protocol of the remote receiving unit, pre-selected or preferred worldwide areas to receive pages and the current active area of the remote receiving unit are retrieved from the paging control station's data library. The paging control station [6] validates the current active area of the remote receiving unit with the pre-selected areas to receive pages. If the current active area of the remote receiving unit is valid and within a pre-defined time interval the message is transmitted to the remote receiving unit. If the current active area is invalid (remote receiving unit is out of pre-selected paging area) the message is not transmitted to the remote receiving unit and the caller is notified. In instances where the current active area of the remote receiving unit is valid but the remote receiving unit has not updated the network with its current position over a pre-defined time period, the paging control station will encode the message such that a request will be placed for the remote receiving unit to update its current active global position. As each subscriber of the paging network can only travel a limited distance by air, land or sea within a pre-defined time interval, the paging network, based upon when a remote receiving unit last updated their global location will select appropriate earth based stations and space satellites to transmit the message to the remote receiving unit at specified worldwide locations. The remote receiving unit upon receiving this signal will disclose their global location.

As a user travels from city to city or country to country, the remote receiving unit will periodically resolve a global position from signals transmitted from satellites and earth based communication means. This information will be utilized by the remote receiving unit or user in possession of the remote receiving unit to update the current active area held by the paging network for that remote receiving unit. Also, the remote receiving unit will store this information in its memory such that future resolved global positions could be validated against this information to ensure that the active area currently held and utilized by the paging network to transmit pages to the remote receiving unit is not outdated.

Once a control station determines where a message will be sent, the control station determines the best possible way to transmit the message. With a knowledge of the geographical distribution of all earth based satellite transmitters [4], ground base transmitter stations [10] and space satellites [2], the paging control station [6] will encode a message such that the sequence of transmission of the message will be included. The ID of all the ground stations or space satellites that will be employed in the message transmission chain will be encoded in a chronological order and the message will be routed to the first ground station. This station could be an earth station that transmits directly to satellite [4], or a ground based transmitter [10]. For example, after a paging control station encodes a message and determines which stations (earth or satellite) should transmit the message, the message is routed to the first earth station. The first earth station could either transmit the message directly to satellite or beam the message to their coverage area. Subsequent stations that receive the message decode the message and determine if other stations are required to transmit the message. If other stations are required to transmit the message the current station re-encodes the message so as to eliminate itself from the message transmission chain before retransmitting the message to the next station. By re-encoding the message an earth station or satellite station will prevent subsequent stations involved in the message transmission chain to retransmit the message back to that station. If an earth station or satellite determines it is required to broadcast a message, the message is beamed to the area covered by that station. The transmission chain continues until the last station broadcasts the message and acknowledges with a status signal which is sent back to the paging control station. Upon receiving this signal, the ground control station can alert the caller that the message was successfully sent. Therefore, with a knowledge of the geographical distribution of the paging network's earth and satellite transmitters, and a knowledge of the current active area of a remote receiving unit, a ground control paging station could effectively encode a caller's message to include all satellite and earth based stations that will be employed in the message transmission chain. This will eventually minimize the risk of a satellite or earth based transmitter from being overloaded.

Once a paging control station [6] receives a message from a caller, the control station, determines if the caller requested the global position of the remote receiving unit. The control station then verifies from its data library if the positioning disclosure feature for that remote receiving unit has not been blocked by the subscriber. Each remote receiving unit will have a special code whereby if identified in a caller's paging information, will allow the paging control station to disclose the remote receiving unit global position. If such a code is not detected in a callers message and the caller requested the global location of a remote receiving unit, the caller will be immediately notified that their request was not authorized by the subscriber using the remote receiving unit. A subscriber may change their positioning disclosure code at anytime and reveal such information only to individuals who could acquire information regarding their global whereabouts from the paging network. The paging network will only override the users request and disclose a subscribers global position only in an emergency circumstance. Also the network operation could be such that a network might disclose all locations whenever a call is placed to a subscriber and subscribers may opt not to have their location disclosed.

Figure 3:
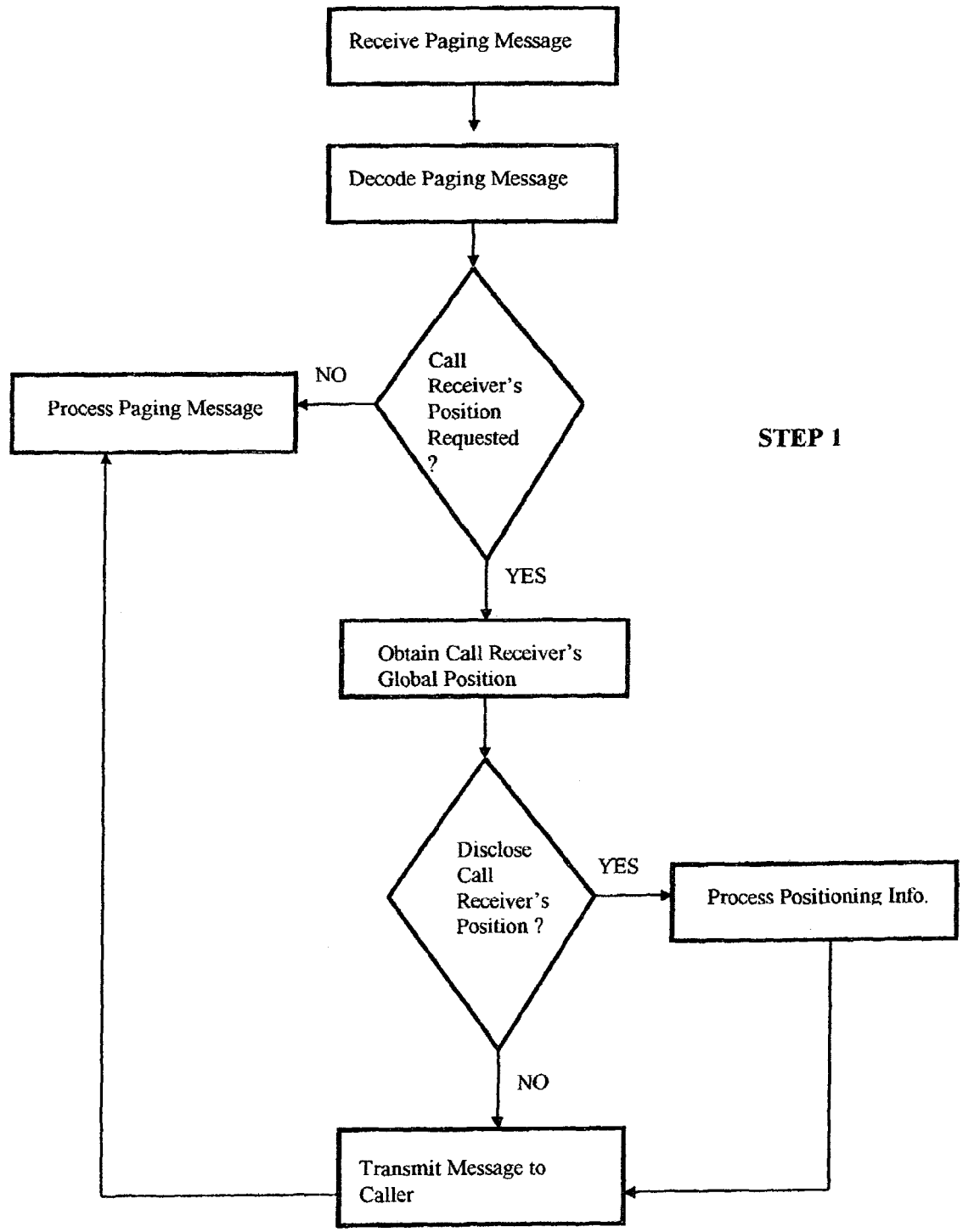
FIG. 3 shows a flow chart illustrating the operation of a paging network control station each time a caller request for the global position of a remote receiving unit.

If the positioning disclosure feature is blocked for any call, a message is sent to the caller indicating that the subscriber does not wish their current global position disclosed. If the positioning disclosure feature is active, the control station retrieves the coordinates of the remote receiving unit global position and encodes that information before transmission to the caller. Such information may describe the latitude and longitude of the subscriber including a more simplified information such as the country, city or town were the message was sent. The steps carried out by the control station during this process are best illustrated in step 1, FIG. 3. In this illustration, the paging control station upon receiving a paging message decodes the message and checks if the message includes a request for the remote receiving unit global position. If such information is not required the message is processed normally. If the remote receiving unit global position is required and the positioning disclosure code is detected, the remote receiving unit positioning information is retrieved from the data bank of the paging control station. If the information retrieved from the paging control station's databank is unavailable or out of date, a request could be made that the remote receiving unit disclose its current position. If the control station establishes that the positioning disclosure feature is blocked for that message, the caller is immediately notified with the appropriate message. If the remote receiving unit positioning disclosure feature for the message in process is active, the positioning information of the remote receiving unit is processed and transmitted to the caller and the caller's message is processed for dispatch to the remote receiving unit as previously disclosed.

A communication source may request the unit to disclose its position to one or more communication targets. Upon receiving this signal the caller may be alerted and location information of the unit may be selectively or fully relayed to the respective communication targets. In instances where a communication source does not have direct access to obtain a subscriber's location from the communication network, the source may poll for the location of a remote unit by including specific information which when received by the remote receiving unit will reveal the identity of the source and a request for the location of the remote unit. The remote unit may either accept or decline to this request by transmitting specific information back to the paging network which will reveal or block the location to the caller.

In another scenario a remote unit may disclose location information to a communication target such as a remote computer or terminal via the network. In this situation a user selects or specifies the destination ID of the communication target, which may be a computer or terminal address. The location of the remote unit is resolved and transmitted to the communication target via the network with the appropriate information if available. In a distress situation a subscriber may use this feature to alert the network with location and relevant distress information which when received by the network could enable the dispatch of an emergency team to that location. Other service industries may utilize the network to allow for certain types of information that are location dependent disclosed to their site. For instance a caller driving on a highway and in full view of an accident may simply disclose that information through the input panel and the appropriate authority could be notified of such an event happening at that location. In a rainy, foggy or highly congested traffic area a subscriber in possession of this unit may relay such an event to the appropriate authority. Furthermore, subscribers may use this feature at any time to log their locations at their home computer or any relevant Internet site by selecting or specifying the appropriate ID or address for location information dispatch.

For positioning, the remote receiving unit will be pre-programmed to periodically resolve a position from signals transmitted from satellites and earth based communication means. At least the remote receiving unit should have the means to provide the paging network with positioning information. Some of the satellites and earth based transmitters used to transmit paging information could be employed to transmit referenced positioning signals to the remote receiving unit. Alternatively the Global Positioning System well known in the art as GPS could also be utilized by the remote receiving unit to resolve a global position. However the remote receiving unit should have a means to resolve a global position from L-band signals transmitted from at least one satellite, depending on the resolving technique employed. GPS is currently being used to provide worldwide positioning information to mobile users around the globe. Such positioning information has an accuracy of about one hundred meters and could further be improved to an accuracy of five meters if referenced signals from ground based transmitters are utilized in the resolving process. A fully operational Global Positioning System includes up to 24 satellites dispersed around six circular orbits. The dispersion and inclination of the satellites is such that at least three or more satellites are readily visible from most parts on the earth surface. In a typical example, for a remote receiving unit to resolve a global position, the remote receiving unit need to solve for two variables of position, latitude and longitude. The satellites, equipped with atomic clocks act as a beacon and transmit signals that tell the remote receiving unit where it is and what time the signal was sent. From this information, a remote receiving unit can determine how far it is from the satellite by comparing the time sent with the time received and multiplying by the speed of light (distance=velocity*time). Since there is a bias between the GPS time and the user's time, a third variable time will be required. Having three satellites in view at any point in time, a remote receiving unit will be able to solve for latitude, longitude and time. For three dimensional positioning a fourth variable and satellite will be required. Upon resolving a global position the remote receiving unit could update the network with its present global location or the remote receiving unit could alert a user when they are out of their active or preselected global areas to receive pages.

Figure 2:
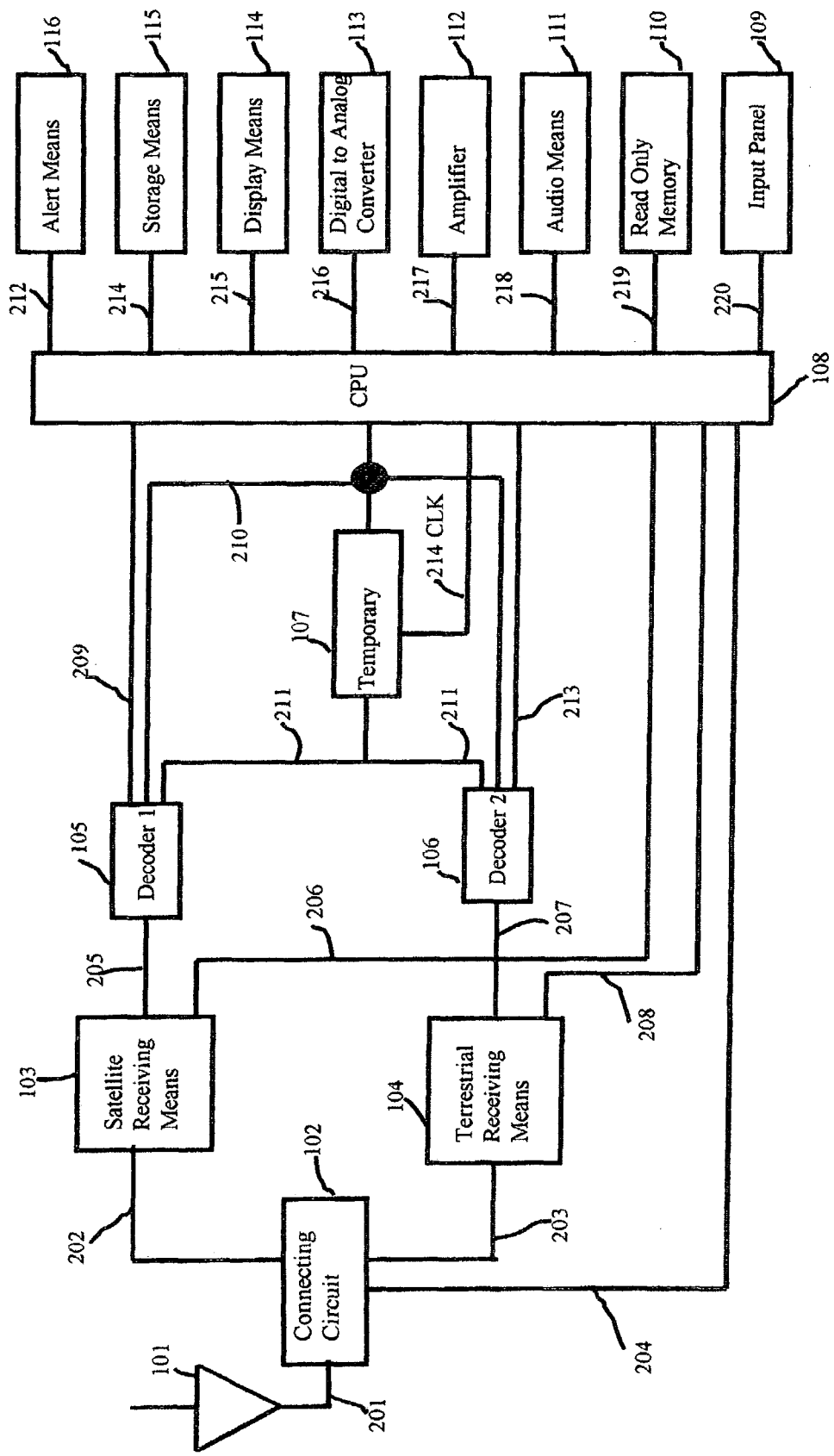
FIG. 2 shows a block diagram of the remote receiving unit, or pager.

The remote receiving unit (FIG. 2) will receive messages transmitted from satellites and terrestrial based transmitters through the transceiver [101]. The connecting circuitry [102] of the remote receiving unit, controlled by the CPU [108], will route satellite based signals via 202 to the satellite receiving means [103] and terrestrial based signals via 203 to the terrestrial receiving means [104]. The connecting circuitry may include a filter arrangement and a switch that will allow L-band or satellite frequencies to pass via 202 and terrestrial or Ultra High Frequencies to pass via 203. This signals could either be paging message signals or global positioning signals. Therefore depending on the pre-loaded protocols and initialization data, the CPU will drive the connecting circuitry [102], satellite receiving means [103], terrestrial receiving means [104] to scan and process specific frequencies.

Satellite signals are processed by the satellite receiving means [103]. This unit will process global positioning satellite signals and satellite message signals. The satellite receiving unit will include satellite signal amplifiers, mixers and filters that will convert the L band global positioning and message signals received from the connecting circuit [102] to an appropriate level for efficient processing by the decoding circuit [105]. The satellite receiving means circuitry is well known by any one well skilled in the art. The operation of this unit is controlled by the microprocessor or CPU [108] via 206.

The CPU determines the appropriate intermediate frequencies and output signals that will be generated by the satellite receiving unit [103]. This is based on the initialization parameters pre-loaded in the ROM [110] of the remote receiving unit. The CPU controls the satellite receiving unit via 206, and the output signals produced by the satellite receiving unit [103] are routed via 205 to the decoder [105] for intelligence extraction and error correction. Decoder [105] is controlled by the CPU [108] via 209. Transmission of data directly by Decoder [105] or Decoder [106] to the CPU input port via 210 is determined by the CPU. If the CPU determines satellite messages are of high priority Decoder [105] is signaled via 209 to transmit data directly to the CPU via 210 and Decoder [106] is signaled via 213 to temporary hold its data. Decoder [106] will store its data in the Temporary Store [107] via 211 for later retrieval by the CPU. If terrestrial based signals are of a higher priority Decoder [105] is signaled to temporary hold its data. Again each decoder could be equipped with a store eliminating the use of the Temporary Store [107]. If a decoder is not equipped with storage means, the decoder could download its data via 211 to the temporary data storage while the other decoder will transmit directly to the CPU via 210. If multiple decoders are required to decode multiple satellite and earth based signals (message and positioning signals), the CPU could again determine when each decoder should transmit it's data to the CPU's input port, with each decoder equipped with the appropriate storage means to temporarily hold it's data until such transmit instruction is received from the CPU.

Terrestrial based signals will be processed by the terrestrial receiving means [104]. This UHF or VHF signals will be routed by the connecting circuitry [102] via 203 to the terrestrial receiver [104]. Again, the terrestrial receiving unit will include Ultra High Frequency (UHF) or Very High Frequency (VHF) amplifiers, filters and down converting circuitry to process the signal from 203 to an appropriate level for efficient processing by decoder [106]. Direct transmission of data from decoder 2 [106] to the CPU via 210 will be controlled by the CPU. The operation of this part of the receiver will be similar to the satellite receiving end. Therefore, the CPU [108] will control the operation of the connecting circuitry, the satellite and terrestrial receiving means. The CPU [108] will have the ability to determine exactly when a satellite or terrestrial message or positioning signal is received and processed.

Once the CPU completes processing data from a decoder [106,107], the CPU retrieves data from the temporary data storage [107] for processing. As previously stated multiple decoders could be employed. In this situation each decoder will have the ability to store or hold its data temporarily or use the temporary storage [107] until signaled by the CPU to transmit data directly via 210. Relevant communication links will be added to interface the newly added decoders to the CPU [108], satellite receiving unit [103], and the terrestrial receiving unit [104]. With this technique all message and positioning signals transmitted from either satellite or earth based communication means will be eventually decoded and processed by the CPU, with rarely any message being lost or corrupted in this process.

To conserve receiver power, the CPU could be preprogrammed so as to control the connecting circuitry [102], the satellite receiving module [103], and the terrestrial receiving module [104], to process positioning signals periodically. In this situation only paging messages (voice and alphanumeric) will be allowed to pass, while positioning information signals will be periodically blocked. If a paging message received requires the remote receiving unit to disclose its current global location, the CPU [108] upon detecting this request will allow the remote receiving unit to resolve a global position from satellite and earth based referenced signals before resuming operation normally.

If a decoded message received by the CPU via 210 is voice or alphanumeric, the CPU alerts the user either through the display [114], alert means [116] or audio means [111] as to the presence of a new message. Alphanumeric messages are displayed through the display while voice messages are routed to the digital to analog (D/A) converter [113], so that they are converted to their analog format by the D/A converter. The analog signal is amplified by the amplifier [112], and the amplified signal is used to drive the audio means [111] (speaker or earphone). The memory means [115] is used to store messages for future replay by the user. These messages are first compressed by the CPU before storage in memory. Prior to replay or redisplay the messages are decompressed.

Once a user subscribes to the global paging network, the remote receiving unit is initialized. Relevant data such as the paging protocols, frequencies, preferred paging locations and other relevant data are down loaded into the ROM [110] of the remote receiving unit. As the user travels from one global location to another, this information will be used by the CPU to control the actions of all modules of the remote receiving unit.

Figure 4:
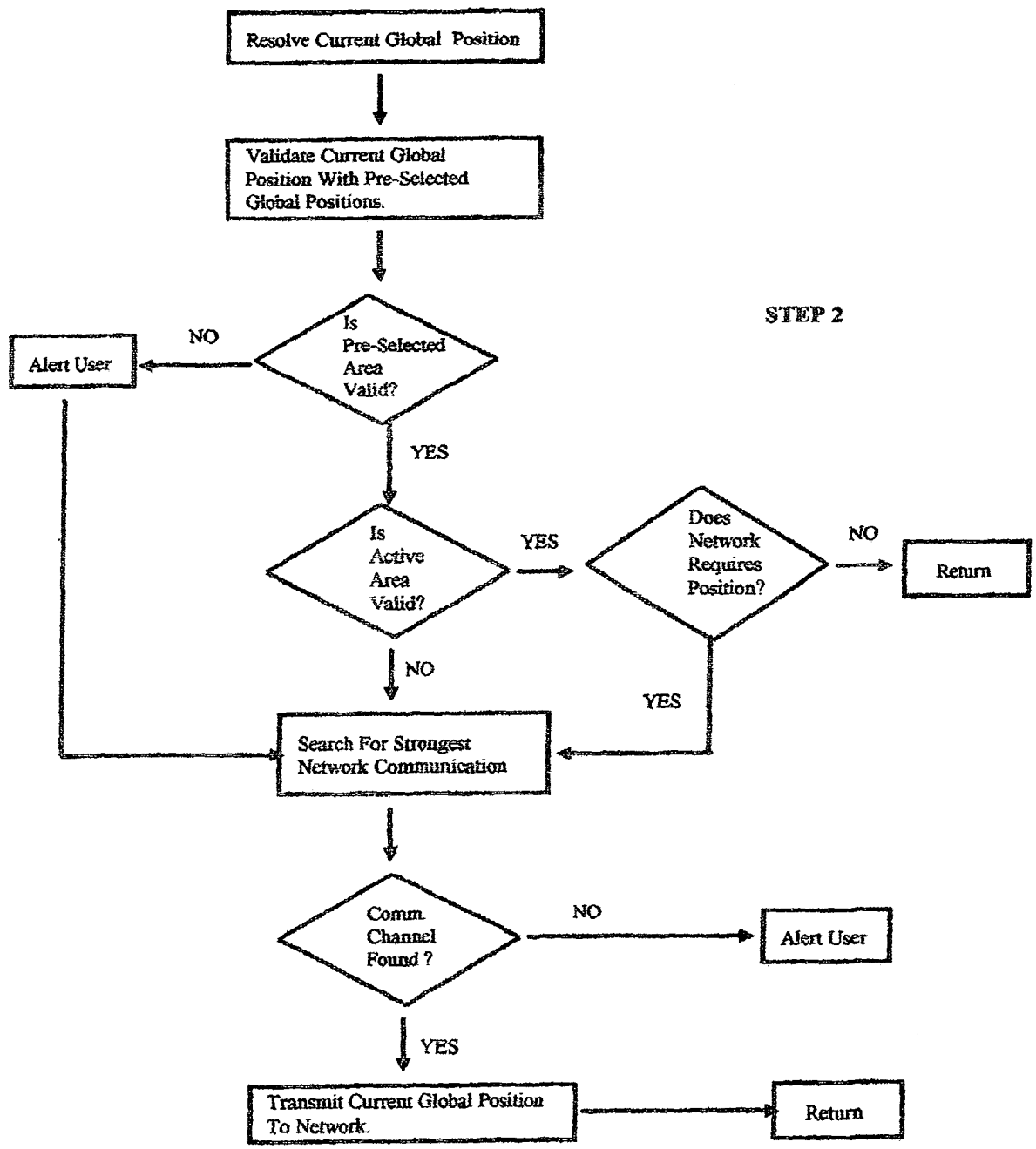
FIG. 4 is a flow chart illustrating the operation of a remote receiving unit when a global position is resolved in an attempt to determine if the remote receiving unit is out of their paging area.

A remote receiving unit will have the ability to resolve a global position from signals transmitted from satellites and earth based communication means. Periodically, the remote receiving unit will resolve a global position from these signals and compare it to reference encoded global position coordinates pre-loaded in its ROM [110]. If the CPU [108] establishes that the current global position of the remote receiving unit is not within the user's preferred location to receive pages, the user is immediately alerted that they are out of their paging area and no paging messages will be received. If the remote receiving unit current active area to receive pages is not within the previously stored active areas, the user is alerted to update the paging network with their current active area. The network may also request the remote receiving unit for its current global position. If such a message is received the subscriber in possession of the remote receiving unit is notified that an update of the network is required. The remote receiving unit will scan for the strongest network communicating channel via transceiver [101]. If such a link is established, the remote receiving unit will automatically update the network with its current global positioning coordinates. In circumstances where the remote receiving unit does not find a suitable network channel for direct communication, the remote receiving unit will alert the user that no RF communicating channel was found for automatic update of its current global position. In this situation a user could update the network by calling in and disclosing their current global coordinates resolved by the remote receiving unit. If the user is required to update the network, the remote receiving unit will periodically alert the user to update the network until an input is received from the user through input panel [109] via 220 indicating that the action has taken place. The CPU [108] will store in its memory the current resolved global position of the remote receiving unit as the current active area of the remote receiving unit held by the paging network. This will enable the CPU to determine when an active area update of the paging network is required without waiting for the network to request for such information. The actions undertaken by the remote receiving unit during this processes are best illustrated in Step 2, FIG. 4. In this illustration, the remote receiving unit first resolves a global position. Such a request might have been initiated from the user through input panel [109], the paging network or from within the remote receiving unit CPU. Upon resolving a global position, the remote receiving unit validates this position with the pre-selected areas to receive pages usually stored in the ROM. If the pre-selected areas are valid, the remote receiving unit further checks if its current active area to receive pages is valid. If the remote receiving unit current active area to receive pages is valid, the CPU checks if the paging network requires the current global coordinates of the pager. If the network does not require the remote receiving unit to update its position, the remote receiving unit resumes operation normally. If the current active area of the remote receiving unit is invalid or the pre-selected area to receive pages is invalid or the network had requested for the remote receiving unit global location, the remote receiving unit searches for the strongest network communication channel to transmit its current global position. If such a channel is found the network is automatically updated. If no such channel is found the user is alerted to update the network with the current global coordinates resolved by the remote receiving unit.

At any point in time a subscriber could use the remote receiving unit or any relevant terrestrial communication device to activate or deactivate their positioning disclosure feature from the network. In the deactivated mode the network will not disclose a subscriber's global location to a caller requesting that information. A user may override the periodic global positioning resolving feature of the remote receiving unit to obtain a current global position through the input panel [109] at any time. Once the CPU [108] resolves and makes this information available to the user, the terrestrial receiving means [104], satellite receiving means [103] and the connecting circuit [102] will be signaled to resume operation normally. With the aid of the input panel [109] and the display [114] relevant information such as current active paging area, pre-selected areas, and the remote receiving unit current global position will always be made available to a user such that an update of the paging network could be done by a user in possession of the remote receiving unit at any point in time and at any global location without a request from the network.

What is claimed is:

1. A communication system comprising:
   (a) a mobile remote unit;
   (b) a controller for receiving a location of said mobile remote unit;
   (c) a network of communication resources some of which are identified as preauthorized to access the location of the mobile remote unit when permission given in advance to access the location of the mobile remote unit is received from the resource and matched against permission required to access the location of the mobile remote unit;
   (c1) a privacy profile indicating whether the owner of said mobile remote unit has opted to divulge the location of said mobile remote unit to a preauthorized communication resource;
   (d) the communication system able to use the privacy profile to selectively deny access to the location of said mobile remote unit among said network of preauthorized communication resources;
   wherein said privacy profile of said mobile remote unit can be used to selectively allow access to the location of said mobile remote unit to one or more resources among the pre-authorized communication resources even though said privacy profile can also be used to selectively deny access to the location of said mobile remote unit to one or more resources among the pre-authorized communication resources identified as submitting valid permission required to access the location of the mobile remote unit.

2. A communication system for controlling access to authorized communication resources for location information of a call receiver, comprising;
   (a) a controller receiving the location information of the call receiver and establishing recognition of communication resources authorized to access the location information of the call receiver; and
   (a1) privacy profile indicating whether the owner of said call receiver has opted to divulge said location information to an authorized communication resource;
   (b) an override feature using the privacy profile to selectively grant or selectively deny access to location information amongst individual authorized communication resources;
   wherein said privacy profile of said call receiver can be used to selectively grant access to the location of said call receiver to one or more resources among the authorized communication resources even though said privacy profile can also be used to selectively deny access to the location of the call receiver to one or more resources among the authorized communication resources recognized as submitting valid authorization information required to access the location of the call receiver.

3. The communication system of claim 2 further comprising means for determining the location information of the call receiver.

4. The communication system of claim 3, wherein the call receiver utilizes GPS technology for determining the location information of the call receiver.

5. The communication system of claim 2, wherein the controller and the override feature are remote from the call receiver.

6. The communication system of claim 2, the controller updating the location information of the call receiver through communication with the call receiver.

7. The communication system of claim 2 said authorized communication resources obtaining the location of the call receiver depending on the access status of said privacy profile received by the override feature.

8. A method for controlling access by a communication resource to location information for a call receiver comprising
   (a) preauthorizing communication resources;
   (b) retaining an identity of said preauthorized communication resources;
   (c) selectively enabling privacy profile status for a subset of said preauthorized communication resources;
   (d) determining the location information of the call receiver;
   (e) identifying one of said preauthorized communication resources;
   (f) determining the privacy profile status of the identified preauthorized communication resources;
   (g) granting or denying access to the location information of the call receiver based on said privacy profile status;
   wherein said privacy profile of said call receiver can be used to selectively grant access to the location of said call receiver unit to one or more resources among the preauthorized communication resources even though said privacy profile can also be used to selectively deny access to the location of the call receiver to one or more resources among the preauthorized communication resources identified as submitting valid authorization information required to access the location of the call receiver.

9. The method of claim 8, said enabling privacy profile status including a request by the call receiver.

10. The method of claim 8, determining the location information of the call receiver including downloading information from GPS associated resources to the call receiver.

11. A call receiver capable of communicating with a pool of authorized communication resources, comprising:
   a control unit acquiring and providing information regarding a position of the the call receiver to the pool of authorized communication resources, the call receiver including an input and a privacy profile command to selectively deny or selectively accept to provide access to the position of the call receiver to less than all authorized communication resources.

12. The call receiver of claim 11 including means for determining its position.

13. The call receiver of claim 11, the privacy profile command selectively denying or selectively accepting access to the information regarding the position of the call receiver to certain communication resources that were authorized in advanced to receive the location of the call receiver.

14. The call receiver of claim 13, the privacy profile command being unable to selectively deny said access to emergency related communication resources.

15. A communication system comprising:
   (a) a network of signal transmitting and/or receiving communication resources;
   (b) a mobile remote unit able to communicate with the network to provide the mobile remote unit location information to the network;
   (c) a plurality of the communication resources in the network being preauthorized to access said mobile remote unit location information from the network;
   (d) a controller that retain and provides the location information of the mobile remote unit to preauthorized communication resources in the network, wherein said preauthorized communication resources are identified as having submitted in a request, valid authorization information given to them in advance and required from the resource to access said mobile remote unit location information at the time the request is authenticated;
   (d1) a privacy profile indicating whether said mobile remote unit location information should be divulged to a preauthorized communication resource;
   (e) an override feature associated with the controller for using said privacy profile to deny access to the location information of the mobile remote unit selectively to one and to more than one selected identifiable preauthorized communication resource;
   wherein said privacy profile of said mobile remote unit can be used to selectively allow access to the location of said mobile remote unit to one or more resources among the preauthorized communication resources even though said privacy profile can also be used to selectively deny access to the location of the mobile remote unit to one or more resources among the preauthorized communication resources identified as submitting valid authorization information required to access the location of the call receiver.

16. The communication system of claim 15, the override feature being controlled by the mobile remote unit.

17. The communication system of claim 16, the network including at least one or more terrestrial control stations or satellite stations.

18. A communication system comprising:
   (a) one or more communication resources;
   (b) a component that is able to communicate with said one or more communication resources to establish a location of a portable mobile handset;
   (c) an override to verify whether a location privacy profile that is used for accepting or denying access to the location information of said portable mobile handset permits the disclosure of said location information to at least a location requestor amongst said one or more communication resources submitting valid permission that are matched and required from said location requestor to access said location information;
   (d) the communication system able to use said override to selectively accept or deny access to said location information of said portable mobile handset to said location requestor submitting valid permission(s), wherein operation of said override is independent of whether said component can transmit the location of said mobile handset;
   wherein said privacy profile of said portable mobile handset can be used to selectively accept access to the location of said portable mobile handset to one or more resources among the communication resources submitting valid permission even though said privacy profile can also be used to selectively deny access to the location of the portable mobile handset to one or more resources among the communication resources submitting valid permission required to access the location of the portable mobile handset.

19. The communication system of claim 18, wherein said override is not disabling transmission of positioning information from said portable mobile handset to a controller of said network.

20. The communication system of claim 19, wherein said override is controlled by the portable mobile handset owner and/or network operator and not divulged to said location requestor.

21. The communication system of claim 18 said location requestor being a location application or relevant communication resource with valid permission(s) to request for the location information of said portable mobile handset.

22. The communication system of claim 21, said portable mobile handset able to resolve a geographic position from signals transmitted from GPS satellites and/or earth based communication resources and further able to process voice alphanumeric messages.

23. The communication system of claim 18, said permission(s) submitted by said location requestor including PINS and/or ID combination given to said requestor in advanced of submitting the location request.

24. A method for selectively providing access to a location of a mobile handset in a wireless communication system comprising:
   (a) providing advanced authorization information to at least a source to submit said authorization information when requesting for the location of said mobile handset;
   (b) receiving a request for the location of a mobile handset from said source;
   (c) verifying that the authorization information submitted by said source during said request matches the authorization information required from said source to access the location of the mobile handset;

(d) further checking a privacy profile of said mobile handset, said profile containing information indicating whether the owner of said handset has opted to provide the location information of said handset to said source;

(e) using said privacy profile to allow or deny access to the location information of said handset to said source submitting said authorization information required and matched by the communication system from said source to access said location information;

wherein said privacy profile of said handset can be used to allow access to the location information of said handset to said source submitting valid authorization information even though said privacy profile can also be used to deny access to another also source submitting valid authorization information.

25. The method of claim 24 said advanced authorization information provided to said source including PINS and/or ID combination.

26. The method of claim 24 wherein the step of using said privacy profile to deny access to the location of said mobile handset to said source is independent of whether said system is able to transmit the location of said handset.

27. A communication system for selectively granting access to a location information of a mobile remote unit comprising:

(a) a controller for establishing or receiving the location information of said mobile remote unit;

(b) a plurality of pre-authorized resources or requestors that are recognized as submitting valid authorization information given to them in advance and required from the plurality of pre-authorized resources to access location information from the communication system;

(c) a privacy profile indicating whether said location information of said mobile remote unit should be divulged to a pre-authorized resource;

(d) a response generator selectively granting access to said location information to one or more resources amongst said plurality of pre-authorized resources and selectively denying access to one or more resources amongst said plurality of said pre-authorized resources based on the status of each in the privacy profile;

wherein said privacy profile of said mobile remote unit can be used to selectively accept access to the location of said mobile remote unit to one or more resources among the plurality of pre-authorized resources even though said privacy profile can also be used to selectively deny access to the location of the mobile remote unit to one or more resources among the plurality of pre-authorized resources identified as submitting valid authorization information required to access the location of the mobile remote unit.

28. The system of claim 27 said privacy profile status that is used to indicate whether the location of said mobile remote unit should be granted to a pre-authorized resource not submitted as advanced authorization information by the pre-authorized resource.

29. The system of claim 27 said privacy profile status that is used to indicate whether the location of said mobile remote unit should be granted to a pre-authorized resource updated by the owner of said mobile remote unit.

* * * * *